(12) United States Patent
Crosby et al.

(10) Patent No.: US 12,440,672 B2
(45) Date of Patent: Oct. 14, 2025

(54) SYSTEMS AND METHODS FOR SUSTAINED RELIEF OF CHRONIC PAIN

(71) Applicant: SPR THERAPEUTICS, INC., Cleveland, OH (US)

(72) Inventors: Nathan D. Crosby, Cleveland, OH (US); Isaac R. Cassar, Cleveland, OH (US); Joseph W. Boggs, II, Chapel Hill, NC (US)

(73) Assignee: SPR THERAPEUTICS, INC., Cleveland, OH (US)

( * ) Notice: Subject to any disclaimer, the term of this patent is extended or adjusted under 35 U.S.C. 154(b) by 602 days.

(21) Appl. No.: 17/629,428

(22) PCT Filed: Jul. 27, 2020

(86) PCT No.: PCT/US2020/043709
§ 371 (c)(1),
(2) Date: Jan. 24, 2022

(87) PCT Pub. No.: WO2021/016616
PCT Pub. Date: Jan. 28, 2021

(65) Prior Publication Data
US 2022/0241589 A1 Aug. 4, 2022

Related U.S. Application Data

(60) Provisional application No. 63/050,265, filed on Jul. 10, 2020, provisional application No. 62/944,711, (Continued)

(51) Int. Cl.
*A61N 1/36* (2006.01)
*A61N 1/05* (2006.01)

(52) U.S. Cl.
CPC ....... *A61N 1/36021* (2013.01); *A61N 1/0502* (2013.01); *A61N 1/0551* (2013.01); (Continued)

(58) Field of Classification Search
CPC ............ A61N 1/36071; A61N 1/36021; A61N 1/36017
See application file for complete search history.

(56) References Cited

U.S. PATENT DOCUMENTS 5,702,429 A * 12/1997 King ................... A61N 1/0553
607/116
6,208,902 B1 3/2001 Bovega
(Continued)

OTHER PUBLICATIONS

Patent Cooperation Treaty (PCT), International Search Report and Written Opinion for Application PCT/US2020/043709 filed on Jul. 27, 2020 , mailed Jan. 19, 2021, International Searching Authority, US.
Extended European Search Report in EP20843742.6, mailed Jul. 21, 2023, 8 pages.

*Primary Examiner* — Alyssa M Alter
(74) *Attorney, Agent, or Firm* — McDonald Hopkins LLC

(57) ABSTRACT

Systems and methods of applying electrical stimulation to achieve sustained relief of chronic pain that comprise a coiled wire percutaneous lead configured for insertion into a portion of a body that is proximal to a region of pain and an electrode formed integrally on the coiled wire percutaneous lead, wherein the electrode is configured to be positioned inside the body and at a therapeutically effective distance from a portion of at least one peripheral nerve that innervates the region of pain. The systems and method may also include an electrical stimulation device operatively coupled to the lead to apply electrical stimulation through the at least one electrode to at least one peripheral nerve that innervates the region of pain, to activate target peripheral nerve fibers while preventing activation of non-target peripheral nerve fibers and avoiding changing or blocking neural activity in off-target peripheral nerve fibers in the at least one peripheral nerve to create comfortable sensations in the region of (Continued)

pain and produce pain relief by modulating central nervous system plasticity associated with the pain.

14 Claims, 48 Drawing Sheets

Related U.S. Application Data filed on Dec. 6, 2019, provisional application No. 62/935,207, filed on Nov. 14, 2019, provisional application No. 62/878,522, filed on Jul. 25, 2019.

(52) U.S. Cl.
CPC ..... *A61N 1/36017* (2013.01); *A61N 1/36031* (2017.08); *A61N 1/36034* (2017.08)

(56) References Cited

U.S. PATENT DOCUMENTS

| | | |
|---|---|---|
| 2006/0149333 A1 | 7/2006 | Tanagho et al. |
| 2012/0277621 A1* | 11/2012 | Gerber ................... A61B 5/686 |
| | | 600/554 |
| 2013/0253605 A1* | 9/2013 | Bennett .............. A61B 17/3468 |
| | | 607/46 |
| 2016/0213927 A1 | 7/2016 | McGee et al. |
| 2017/0312523 A1 | 11/2017 | Bennett et al. |
| 2017/0361089 A1 | 12/2017 | Boggs, II et al. |
| 2018/0193645 A1 | 7/2018 | Boggs, II et al. |
| 2018/0236222 A1 | 8/2018 | Boggs et al. |

* cited by examiner

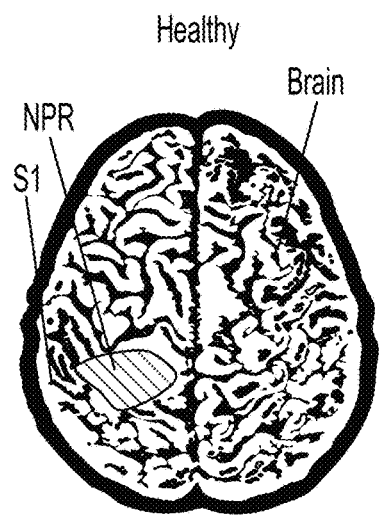
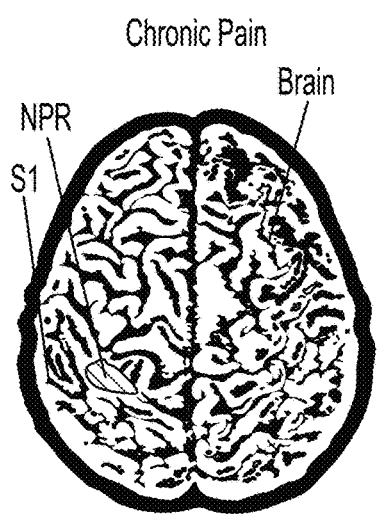
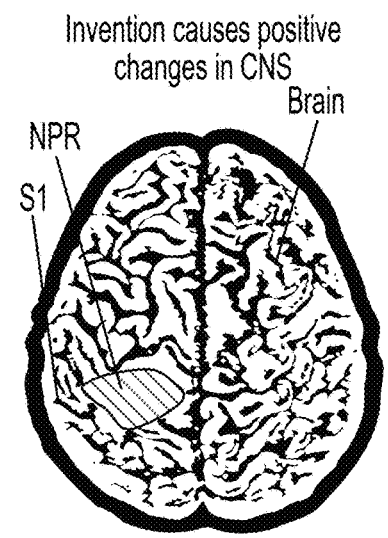
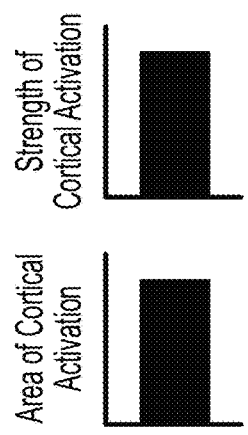
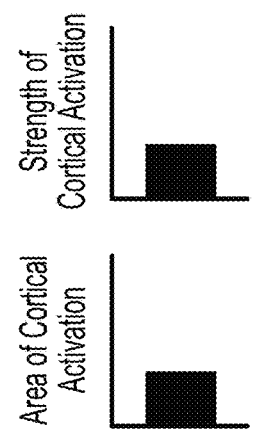
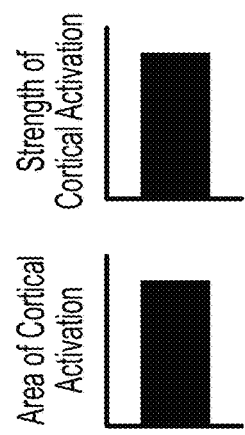
FIG. 10A　　　　　　FIG. 10B　　　　　　FIG. 10C

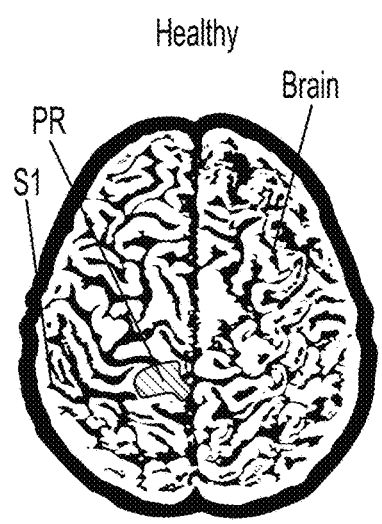
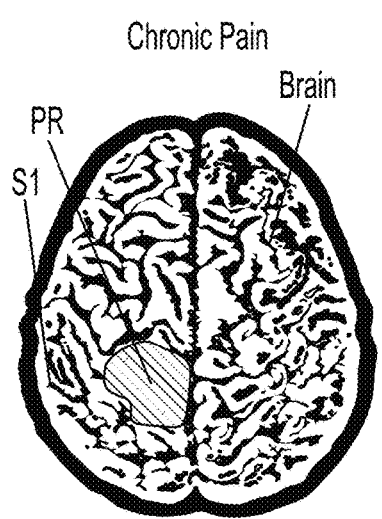
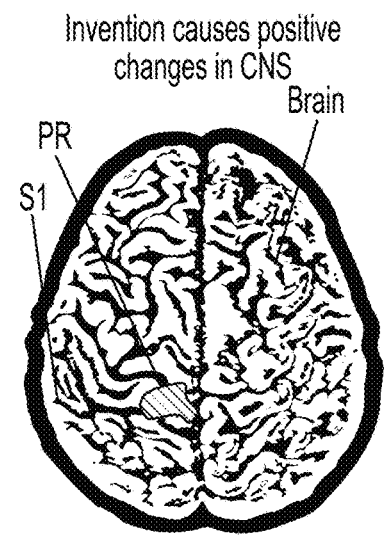
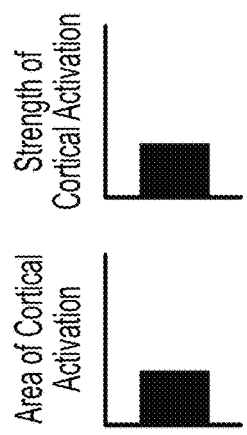
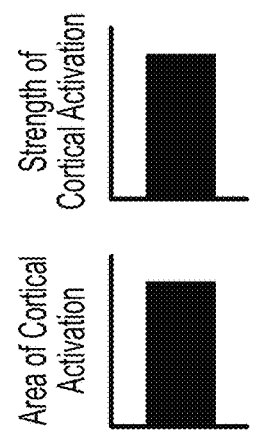
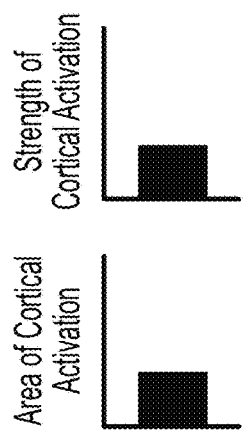
FIG. 11A  FIG. 11B  FIG. 11C

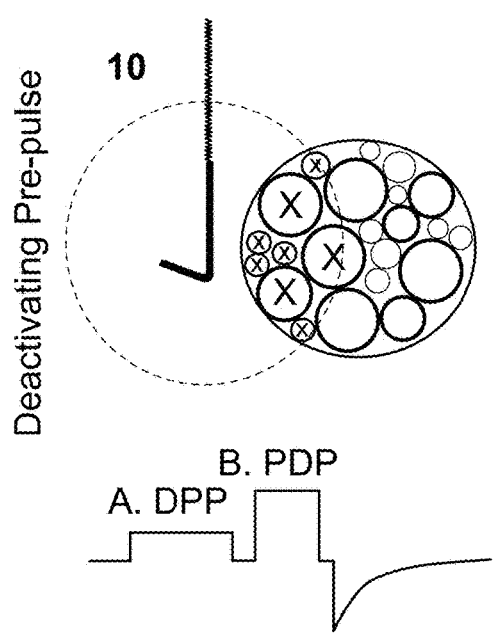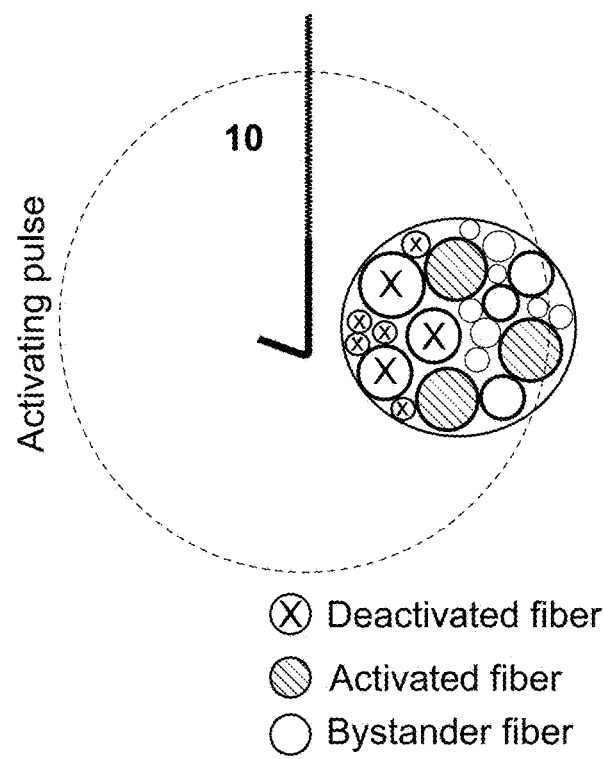
FIG. 21A
FIG. 21B
⊗ Deactivated fiber
▨ Activated fiber
○ Bystander fiber

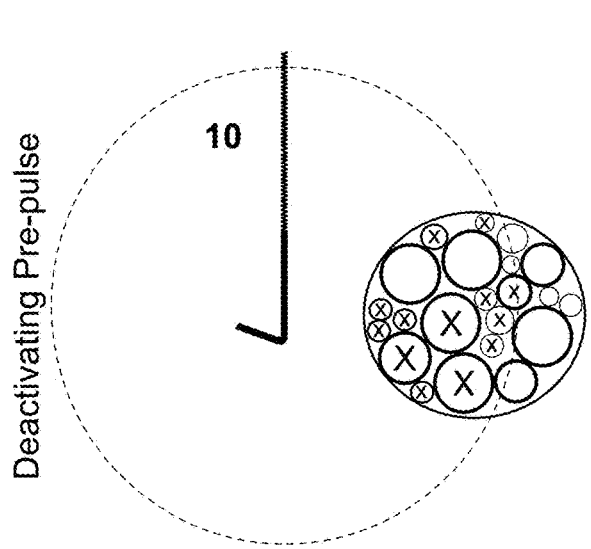
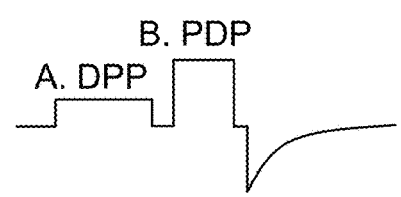
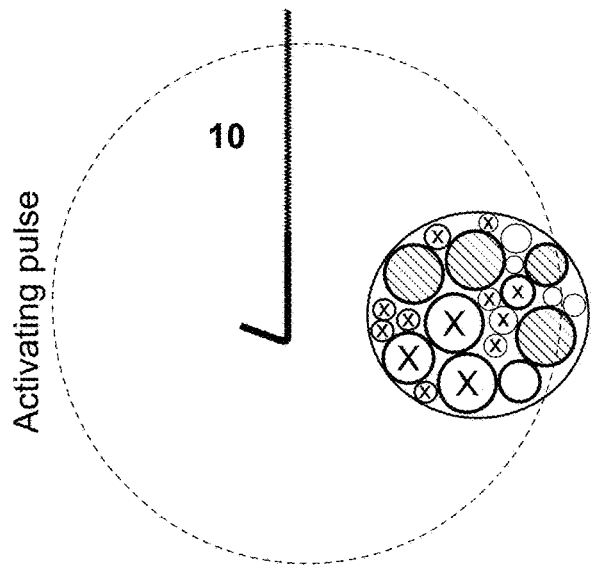
⊗ Deactivated fiber
▨ Activated fiber
○ Bystander fiber
FIG. 23A　　　　　　　　　　FIG. 23B

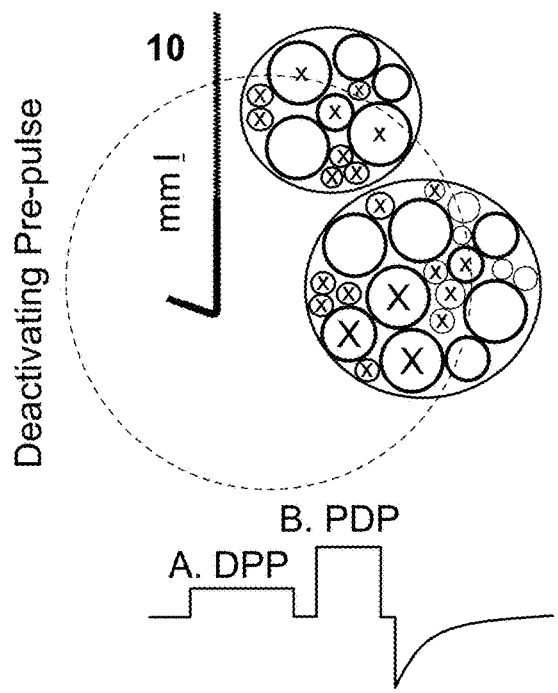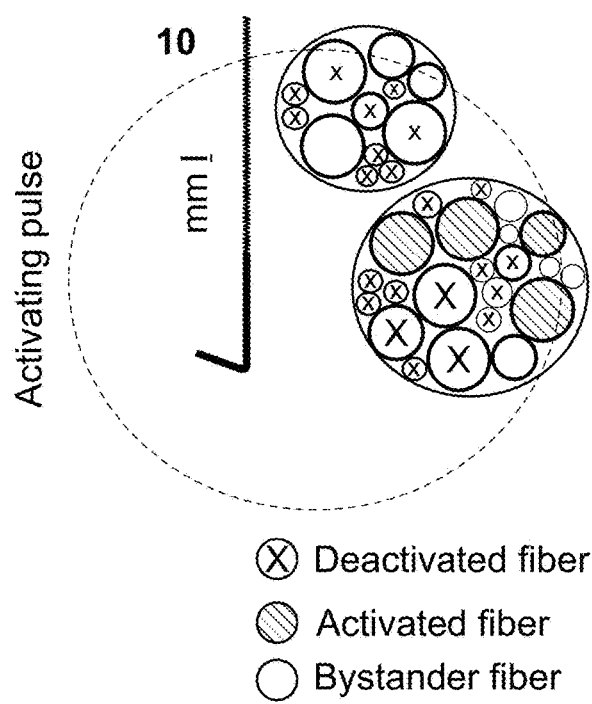
FIG. 24A                    FIG. 24B

SYSTEMS AND METHODS FOR SUSTAINED RELIEF OF CHRONIC PAIN

CROSS-REFERENCE TO RELATED APPLICATION

This application is a 35 U.S.C. § 371 national stage application of PCT Application No. PCT/US2020/043709 filed on Jul. 27, 2020 entitled "SYSTEMS AND METHODS FOR SUSTAINED RELIEF OF CHRONIC PAIN," which claims priority to U.S. Patent Application No. 62/878,522, filed Jul. 25, 2019, U.S. Patent Application No. 62/935,207, filed, Nov. 14, 2019, U.S. Patent Application No. 62/944,711, filed on Dec. 6, 2019, U.S. Patent Application No. 63/050,265, filed on Jul. 10, 2020, all of which are hereby incorporated by reference.

TECHNICAL FIELD

The present teachings relate to systems and methods for sustained relief of chronic pain, and more particularly, to systems and methods of applying electrical stimulation to achieve sustained relief of chronic pain.

BACKGROUND

Chronic pain is a prevalent and costly condition estimated to occur in over 30% of the population. Chronic pain frequently causes disability and depression and has a strong negative correlation with qualify of life. Peripheral nerve stimulation (PNS) has been successful in treating many chronic pain conditions, including nerve injury, complex regional pain syndrome (CRPS), occipital neuralgia, and post-surgical pain, but conventional PNS has historically been limited by invasiveness and complications.

While existing systems and techniques offer some relief and ancillary benefits to individuals requiring therapeutic relief, many issues with such systems exist. For example, conventional neurostimulation systems, including PNS, dorsal root ganglion (DRG) stimulation, and spinal cord stimulation (SCS), have been found to produce sustained pain relief when implanted and used long-term, which is invasive and costly to implant and maintain, however such systems have not produced sustained relief of chronic, intractable pain following limited (e.g., 30-60 day) durations of stimulation. These conventional systems typically use relatively small (e.g., 3 mm) electrode contacts placed in close contact with neural targets, which limits the intensity of stimulation that can be delivered due to the close proximity to and activation of non-target fibers that cause discomfort. Such limitations on stimulation intensity prevent the generation of a robust response in target fibers such that the neuroplastic effects that could produce long-term sustained pain relief are not produced by conventional systems and methods. Some conventional systems are also targeted at neural structures (e.g., spinal cord, DRG) that are not specific and focal to the region of pain, limiting the focality of the produced sensory signals and preventing the neuroplastic effects that could produce long-term pain relief. Therefore, there is a need for an improved system and method to provide sustained relief of chronic pain that effectively produces both focal and robust sensory signals in target fibers, is easy to implement, and is cost effective for a patient.

SUMMARY

A system to provide relief of pain may include a coiled wire percutaneous lead configured for insertion into a portion of a body that is proximal to a region of pain and an electrode formed integrally on the coiled wire percutaneous lead, wherein the electrode is configured to be positioned inside the body and at a therapeutically effective distance from a portion of at least one peripheral nerve that innervates the region of pain. The system may also include an electrical stimulation device operatively coupled to the lead to apply electrical stimulation through the at least one electrode to at least one peripheral nerve that innervates the region of pain, to activate target peripheral nerve fibers while preventing activation of non-target peripheral nerve fibers and avoiding changing or blocking neural activity in off-target peripheral nerve fibers in the at least one peripheral nerve to create comfortable sensations in the region of pain and produce pain relief by modulating central nervous system plasticity associated with the pain.

The system may also include any of the foregoing, which may be combined in any manner without departing from the present teachings.

The electrical stimulation of the system occurs proximal to the region of pain.

The electrode of the system is positionable outside of the central nervous system.

The electrode of the system is positionable proximal to a point on the at least one nerve at which one or more nerve fibers branch off from the nerve to innervate distal structures in the region of pain.

The electrode of the system is positionable distal along the one or more nerves such that the comfortable sensations are generated only in the region of pain or the area immediately surrounding the region of pain.

The electrical stimulation of the system includes a first parameter selected from a group consisting of frequency, pulse duration, amplitude, duty cycle, pattern of stimulus pulses, polarity, a predetermined number of phases, and waveform shape.

The electrical stimulation of the system includes a second parameter selected from a group consisting of frequency, pulse duration, amplitude, duty cycle, pattern of stimulus pulses, polarity, a predetermined number of phases, and waveform shape.

The first parameter of the system is amplitude and the second parameter is pulse duration.

The amplitude and pulse duration of the system are selected by increasing the amplitude until discomfort is produced, then decreasing the amplitude and correspondingly increasing the pulse duration to maximize activation of target fibers innervating the region of pain without activating non-target fibers.

A method to provide relief of pain may include inserting or instruction of inserting of a coiled wire lead percutaneously into a portion of a body that is proximal to a region of pain and stimulating at least one nerve that innervates the region of pain through an electrode formed integrally on the lead, wherein the electrode is positioned inside the body at a therapeutically effective distance from a portion of at least one nerve that innervates the region of pain, and proximal from the region of pain. The method may also include activating a sufficient number of target large diameter fibers in the at least one nerve, wherein the activating of the sufficient number of target fibers produces sustained pain relief following removal of the lead by reversing aberrant plasticity in the brain.

The method may also include any of the foregoing, which may be combined in any manner without departing from the present teachings.

The sufficient number of large diameter fibers in the target nerve is a majority of large diameter fibers in the target nerve that innervate the region of pain such that the non-painful sensory information reaching a brain from the region of pain exceeds the painful sensory information.

The pain relief is sustained and/or pain is eliminated for a period of time after withdrawal of the stimulating electrodes.

The activated large diameter fibers in the target nerve innervate skin, muscle, bone, tendon, ligament, or other tissues in the region of pain.

The activation of the sufficient number of large diameter fibers that innervate the region of pain provides non-painful, physiologic sensory information sent to a brain that is greater, higher frequency, higher volume, more intense, and/or outweighs the painful sensory information from the region of pain.

The sensory information sent to the brain is sent to the somatosensory cortex.

The activation of the sufficient number of large diameter fibers that innervate the region of pain reverses spatial and functional plasticity in the brain that contributed to chronic pain.

Non-painful representations in the somatosensory cortex are expanded and/or are more responsive to non-painful stimuli.

Painful representations in the somatosensory cortex are reduced or contracted and/or are less excitable or responsive to painful stimuli.

The activation of the sufficient number of large diameter fibers innervating the region of pain provides sensory feedback to a central nervous system to promote beneficial functional plasticity that counteracts previous plastic changes that promoted a chronic pain state.

The activation of the sufficient number or proportion of large diameter fibers innervating the region of pain produces robust non-painful somatosensory signals that reverse the expansion of nociceptive representations in a somatosensory cortex.

The activation of the sufficient number or proportion of large diameter fibers innervating the region of pain produces robust non-painful somatosensory signals that reverse the contraction of non-nociceptive representations in a somatosensory cortex.

The at least one nerve consists of at least one peripheral nerve, a nerve trunk located in a nerve plexus, or a division and/or a cord of a nerve trunk, or a nerve branch, or a nerve plexus.

The at least one nerve is selected from a group consisting of: Sciatic nerve, Iliohypogastric nerve, Ilioinguinal nerve, Lateral femoral cutaneous nerve, Obturator nerve, Femoral nerve, Common peroneal nerve, Tibial nerve, Saphenous nerve, Sural nerve, Median nerve, Ulnar nerve, Radial nerve, Musculocutaneous nerve, Axillary nerve, Intercostal nerve, Intercostobrachial nerve, Brachial plexus, Lumbar plexus, Sacral plexus, Medial branch of dorsal ramus, Intercostal nerve, Trigeminal nerve, Occipital nerves, Cranial nerves.

The at least one nerve selected from the group includes at least one distal branch of the selected nerve or nerves.

The target fibers are large diameter afferent sensory fibers, such as A alpha and/or A beta fibers.

The target fibers are large diameter efferent motor fibers.

The non-target fibers are small diameter afferent pain fibers.

A system to provide relief of neuropathic, nociceptive, musculoskeletal, post-trauma, post-surgical, or nociplastic pain may include a coiled wire percutaneous lead configured for percutaneous insertion into a portion of a body that is proximal to a region of pain and at least one electrode formed integrally on the lead, wherein the electrode is configured to be positioned inside the body, and at a therapeutically effective distance from a portion of at least one nerve that innervates the region of pain. The system may also include an electrical stimulation device operatively coupled to the lead to apply electrical stimulation through the at least one electrode to at least one peripheral nerve that innervates the region of pain, to create comfortable sensations in the region of pain and an electrical recording device operatively coupled to the lead to record nerve and/or muscle activity in response to the electrical stimulation through the at least one electrode from at least the peripheral nerve.

The system may also include any of the foregoing, which may be combined in any manner without departing from the present teachings.

The electrode comprises at least one stimulating electrode and at least one recording electrode.

At least one recording electrode and wherein the electrode comprises at least one stimulating electrode wherein the at least one stimulating and recording electrodes are formed integrally on the lead.

A second lead comprising at least one recording electrode and wherein the electrode comprises at least one stimulating electrode.

The electrical recording device comprises at least one recording electrode placed within electrical distance of a nerve to record neural activity.

The neural activity is a compound action potential.

The at least one recording electrode is placed within electrical distance of a muscle or muscle group in the region of pain to record muscle activity.

The muscle activity is an electromyogram (EMG).

The electrical stimulation includes a first parameter selected from a group consisting of: frequency, pulse duration, amplitude, duty cycle, pattern of stimulus pulses, polarity, a predetermined number of phases, and waveform shape.

The electrical stimulation comprises a second parameter selected from a group consisting of: frequency, pulse duration, amplitude, duty cycle, pattern of stimulus pulses, polarity, a predetermined number of phases, and waveform shape.

The first and second parameters are modified to elicit a predetermined recorded nerve and/or muscle response.

The predetermined recorded nerve and/or muscle response is activation of a sufficient number of large diameter fibers innervating the region of pain without activation of small diameter fibers.

The sufficient number of large diameter fibers in the target nerve is a majority of large diameter fibers in the target nerve that innervate the region of pain such that the non-painful sensory information reaching a brain from the region of pain exceeds the painful sensory information.

The predetermined recorded nerve and/or muscle response is produced independent of the distance of the electrode from the portion of the at least one nerve.

The first and second parameters are modified by an automated algorithm that tests each combination of parameters to elicit the predetermined recorded nerve and/or muscle response.

A method to provide relief of pain may include inserting at least one percutaneous lead having at least one stimulating electrode and at least one recording electrode formed integrally on the lead and stimulating at least one peripheral nerve that innervates the region of pain using an electrical stimulation device operatively coupled to the lead to create comfortable sensations in the region of pain. The method may also include positioning the stimulating electrode to within a therapeutically effective distance from at least one target peripheral nerve independent of a distance from a nerve using analysis of recorded neural and/or muscle feedback and applying stimulation parameters to optimize activation of a sufficient number of target peripheral nerve fibers to produce relief of pain, wherein the stimulation parameters are informed by analysis of recorded peripheral neural and/or muscle feedback.

The method may also include any of the foregoing, which may be combined in any manner without departing from the present teachings.

- The at least one target peripheral nerve is a peripheral nerve, or a nerve trunk located in a nerve plexus, or a division and/or a cord of a nerve trunk, or a nerve branch, or a nerve plexus, that innervates some or all of a region of pain.
- The at least one target peripheral nerve is selected from a group consisting of: Sciatic nerve, Iliohypogastric nerve, Ilioinguinal nerve, Lateral femoral cutaneous nerve, Obturator nerve, Femoral nerve, Common peroneal nerve, Tibial nerve, Saphenous nerve, Sural nerve, Median nerve, Ulnar nerve, Radial nerve, Musculocutaneous nerve, Axillary nerve, Intercostal nerve, Intercostobrachial nerve, Brachial plexus, Lumbar plexus, Sacral plexus, Medial branch of dorsal ramus, Intercostal nerve, Trigeminal nerve, Occipital nerves, Cranial nerves.
- The stimulation parameters are selected from one or more of the following: amplitude, pulse duration, frequency, waveform shape, waveform polarity, pulse shape, pulse polarity, or pattern of stimulus pulses.
- The recorded neural and/or muscle activity indicates an optimal or non-optimal response to stimulation.
- The neural activity is a compound action potential and the optimal response is a compound action potential of magnitude that indicates activation of a sufficient number of large diameter sensory afferent fibers.
- The muscle activity is an electromyogram (EMG) and the optimal response is an EMG of magnitude that indicates activation of a muscle or muscles innervated by the at least one target nerve.
- The positioning of the at least one stimulating electrode is adjusted based on analysis of the recorded neural and/or muscle activity to enable stimulation from the at least one stimulating electrode to produce an optimal neural and/or muscle response.
- The electrode is placed adjacent to the at least one target nerve to produce the optimal neural and/or muscle response.
- The electrode is placed remote from the at least one target nerve to produce the optimal neural and/or muscle response.
- The stimulation parameters are modified to elicit the optimal recorded nerve and/or muscle response.
- The optimal recorded nerve and/or muscle response is the activation of the sufficient number of large diameter sensory afferent fibers innervating the region of pain while avoiding activation of small diameter pain afferent fibers.
- The sufficient number of large diameter fibers in the target nerve is a majority of large diameter fibers in the target nerve that innervate the region of pain such that a non-painful sensory information reaching the brain causes expansion of non-painful representations in the somatosensory cortex, contraction of painful representations in a somatosensory cortex, and/or functional remapping of the somatosensory cortex that reduces chronic pain.

A peripheral nerve stimulation system to provide relief of pain may include at least one electrode placed within a therapeutically effective distance from a peripheral nerve innervating a targeted region of pain and an electrical stimulation device delivering electrical stimulation through the at least one electrode, wherein the electrical stimulation comprises a waveform activating large diameter fibers in the peripheral nerve while avoiding activating large diameter peripheral nerve fibers that do not innervate the region of pain.

The peripheral nerve stimulation system may also include any of the foregoing, which may be combined in any manner without departing from the present teachings.

- The waveform is multiphasic.
- One or more cathodic depolarizing and/or anodic hyperpolarizing pre-pulses precede a primary cathodic depolarizing pulse.
- The one or more pre-pulses deactivates or decreases the likelihood of activation of fibers that do not innervate the region of pain.
- The one or more pre-pulses increases the likelihood of activation of fibers that innervate the region of pain.
- The electrical stimulation device comprises a pulse generator.
- The pulse generator delivers the electrical stimulation to the peripheral nerve by way of a percutaneous lead attached to the electrode.
- The peripheral nerve, inclusive of any distal branch thereof, is selected from a group consisting of Sciatic nerve, Iliohypogastric nerve, Ilioinguinal nerve, Lateral femoral cutaneous nerve, Obturator nerve, Femoral nerve, Common peroneal nerve, Tibial nerve, Saphenous nerve, Sural nerve, Median nerve, Ulnar nerve, Radial nerve, Musculocutaneous nerve, Axillary nerve, Intercostal nerve, Intercostobrachial nerve, Brachial plexus, Lumbar plexus, Sacral plexus, Medial branch of dorsal ramus, Intercostal nerve, Trigeminal nerve, Occipital nerves, Cranial nerves.
- The electrical stimulation does not block motor or sensory function of a limb.

A method to provide relief of pain may include inserting at least one percutaneous lead having at least one stimulating electrode, wherein the at least one stimulating electrode is positioned within a therapeutically effective distance from at least one target peripheral nerve and stimulating at least one peripheral nerve that innervates the region of pain using an electrical stimulation device operatively coupled to the at least one percutaneous lead to create comfortable sensations in the region of pain. The method may also include applying stimulation parameters to activate a sufficient number of the at least one target peripheral nerve fibers to produce relief of pain, wherein the stimulation parameters are selected such that the activation of the at least one target peripheral nerve fibers can be achieved independent of positioning of the stimulating electrode relative to the peripheral nerve.

The method may also include any of the foregoing, which may be combined in any manner without departing from the present teachings.

The at least one target peripheral nerve is a peripheral nerve, or a nerve trunk located in a nerve plexus, or a division and/or a cord of a nerve trunk, or a nerve branch, or a nerve plexus that innervates some or all of a region of pain.

The at least one target peripheral nerve is selected from a group consisting of: Sciatic nerve, Iliohypogastric nerve, Ilioinguinal nerve, Lateral femoral cutaneous nerve, Obturator nerve, Femoral nerve, Common peroneal nerve, Tibial nerve, Saphenous nerve, Sural nerve, Median nerve, Ulnar nerve, Radial nerve, Musculocutaneous nerve, Axillary nerve, Intercostal nerve, Intercostobrachial nerve, Brachial plexus, Lumbar plexus, Sacral plexus, Medial branch of dorsal ramus, Intercostal nerve, Trigeminal nerve, Occipital nerves, Cranial nerves.

The stimulation parameters are selected from one or more of the following: amplitude, pulse duration, frequency, waveform shape, waveform polarity, pulse shape, pulse polarity, or pulse repetition pattern.

The selection of optimal stimulation parameters enables the therapeutically effective distance to be any distance from the at least one target nerve.

The optimal stimulation parameters are a combination of one or more stimulation parameters that produce activation of a sufficient number of target fibers while avoiding activation of non-target fibers.

The target fibers are large diameter sensory fibers that innervate the region of pain.

The non-target fibers are small diameter pain fibers that innervate the region of pain.

The non-target fibers are fibers that do not innervate the region of pain.

The sufficient number of large diameter fibers in the target nerve comprises a majority of large diameter fibers in the target nerve that innervate the region of pain such that the non-painful sensory information reaching a brain from the region of pain exceeds the painful sensory information.

The therapeutically effective distance is adjacent to the nerve.

The therapeutically effective distance is remote from the nerve.

The waveform comprises of one or more cathodic depolarizing and/or anodic hyperpolarizing pre-pulses preceding a primary cathodic depolarizing pulse and/or post-pulses following a primary cathodic depolarizing pulse.

The one or more pre-pulses and/or post-pulses deactivates or decreases the likelihood of activation of non-target fibers.

The one or more pre-pulses and/or post-pulses increases the likelihood of activation of target fibers.

The electrical stimulation device comprises a pulse generator.

The pulse generator delivers the electrical stimulation to the peripheral nerve by way of a percutaneous lead attached to the electrode.

DESCRIPTION OF THE DRAWINGS

The present teachings may be better understood by reference to the following detailed description taken in connection with the following illustrations, wherein:

In FIGS. 6A and 6B, the present system causes subthreshold depolarization or hyperpolarization, such as from a depolarizing or hyperpolarizing pre-pulse of Amplitude A1, pulse width PW1. A depolarizing prepulse may inactivate the H gate such that further depolarization, such as from a primary depolarizing/activating pulse of amplitude A2, pulse width PW2, and preceded by an interpulse interval IP1, or a charge balancing pulse of amplitude A3, pulse width PW3, and preceded by an interpulse interval of IP2, does not result in an action potential. A hyperpolarizing prepulse may activate the H gate such that an action potential is more likely to occur in a target subset of fibers. In FIG. 6C, the present system causes subthreshold depolarization, such as from a depolarizing post-pulse, that may maintain opening of the M gate for a longer period of time such that repeated activation of the axon is more likely to occur. The present system may also cause hyperpolarization, such as from a hyperpolarizing post-pulse (HPoP) in FIG. 6C, such that closure and/or inactivation of the M gate prevents or prematurely ends initiation of an action potential.

FIGS. 10A to 10C are representations of non-limiting examples of maladaptive cortical plasticity in chronic pain that are reversed by the present system disclosed herein. In the healthy cortex, non-painful stimulation of a certain region of the body evokes activation in the somatosensory cortex (S1). In chronic pain, non-painful stimulation evokes a smaller or less widespread response in the cortex. The present invention reverses the weakening and/or contraction of non-painful cortical representations (NPR), restoring them to or closer to the healthy state.

FIGS. 11A to 11C are representations of non-limiting examples of maladaptive cortical plasticity in chronic pain that are reversed by the present system disclosed herein. In the healthy cortex, painful stimulation of a certain region of the body evokes activation in a region of the somatosensory cortex (S1). In chronic pain, painful stimulation evokes a larger and/or more widespread response in the cortex. The present system reverses the strengthening and/or expansion of painful cortical representations (PR), restoring them to or closer to the healthy state.

In FIG. 20A, the optimal response to stimulation is shown, with the A-fiber activation maximized indicating activation of a sufficient number of target fibers to produce sustained pain relief. In FIGS. 20B and 20C, the compound action potentials show non-optimal responses (solid lines) because of the activation of an insufficient number of target fibers (FIG. 20B) or the activation of non-target C fibers (FIG. 20C), overlaid for comparison with the optimal response (dotted lines).

FIGS. 21A and 21B are representations of a target nerve undergoing stimulation with a waveform consisting of a subthreshold depolarizing pre-pulse (DPP) that deactivates fibers that are nearest to the electrode, followed by a primary depolarizing stimulation pulse (PDP) that activates fibers in the target nerve farther away from the electrode without activating the fibers nearest to the electrode.

FIGS. 23A and 23B are representations of a target nerve undergoing stimulation with a waveform consisting of a subthreshold depolarizing pre-pulse (DPP) that deactivate non-target fibers, followed by a primary depolarizing stimulation pulse (PDP) that activates target fibers in the target nerve without activating bystander fibers.

FIGS. 24A and 24B are representations of a target nerve undergoing stimulation with a waveform consisting of a subthreshold depolarizing pre-pulse (DPP) that deactivate non-target fibers, followed by a primary depolarizing stimulation pulse (PDP) that activates target fibers in the target nerve without activating bystander fibers in a different nerve.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings, e.g., features of each embodiment disclosed herein may be combined or replaced with features of the other embodiments disclosed herein. As such, the following description is presented by way of illustration only and should not limit in any way the various alternatives and modifications that may be made to the illustrated embodiments and still be within the spirit and scope of the present teachings.

I. The Peripheral Nervous System—Anatomic and Physiologic Overview

Figure 1A:
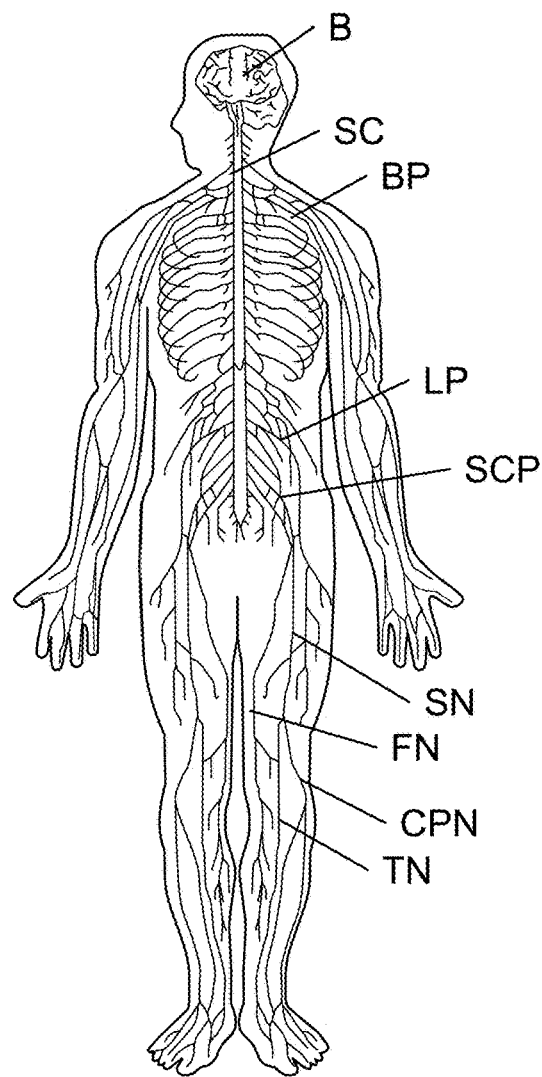
FIGS. 1A and 1B are schematic anatomic views, respectively anterior and lateral, of a human peripheral nervous system.
Figure 1B:
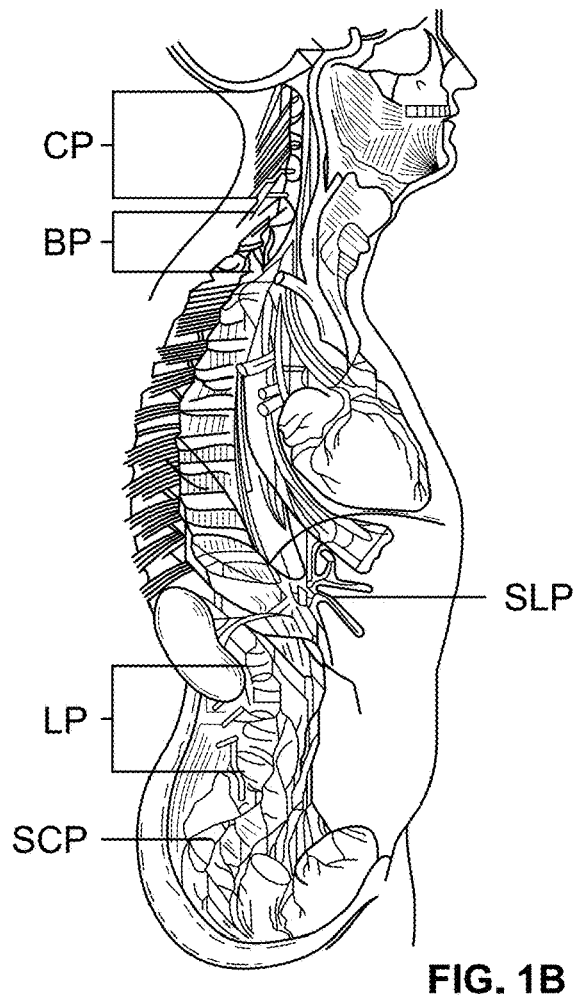

The peripheral nervous system consists of nerve fibers and cell bodies outside the central nervous system (i.e., outside the brain and the spinal column) that conduct impulses to or away from the central nervous system (FIG. 1). The peripheral nervous system is made up of nerves that connect the central nervous system with peripheral structures and does not include the brain and spinal cord. The nerves of the peripheral nervous system arise from but do not include the spinal column and exit through intervertebral foramina in the vertebral column (spine). The afferent, or sensory, fibers of the peripheral nervous system convey neural impulses to the central nervous system from the sense organs (e.g., the eyes) and from sensory receptors in various parts of the body (e.g., the skin, muscles, bones, ligaments, tendons, etc.). The efferent, or motor, fibers convey neural impulses from the central nervous system to the effector organs (e.g., muscles and glands).

The somatic nervous system (SNS) is the part of the peripheral nervous system associated with the voluntary control of body movements through the action of skeletal muscles, and with reception of external stimuli, which helps keep the body in touch with its surroundings (e.g., touch, proprioception, hearing, and sight). A somatic nerve is a nerve of the somatic nervous system. A somatic nerve is a peripheral nerve, and it is part of the peripheral nervous system. The system includes all the neurons connected with skeletal muscles, skin and sense organs. The somatic nervous system consists of efferent nerves responsible for sending signals from the central nervous system through the peripheral nervous system and into the periphery (e.g., for muscle contraction). The somatic nervous system also consists of afferent (i.e., sensory) nerves responsible for sending signals to the central nervous system through the peripheral nervous system and from the periphery (e.g., from sensation from the skin, muscles, tendons, ligaments, bone, and from receptors throughout the body, including for example, receptors that sense touch, pressure, activation and/or contraction of muscle, movement, and/or body, body part, or limb movement).

a. Peripheral Nerves

A typical peripheral nerve arises from the spinal cord by rootlets that converge to form two nerve roots, the dorsal (sensory) root and the ventral (motor) root. The dorsal and ventral roots unite into a mixed nerve trunk that divides into a smaller dorsal (posterior) primary ramus and a much larger ventral (anterior) primary ramus. The posterior primary rami serve a column of muscles on either side of the vertebral column, and a narrow strip of overlying skin. All of the other muscle and skin in the periphery is supplied by the anterior primary rami.

Figure 2:
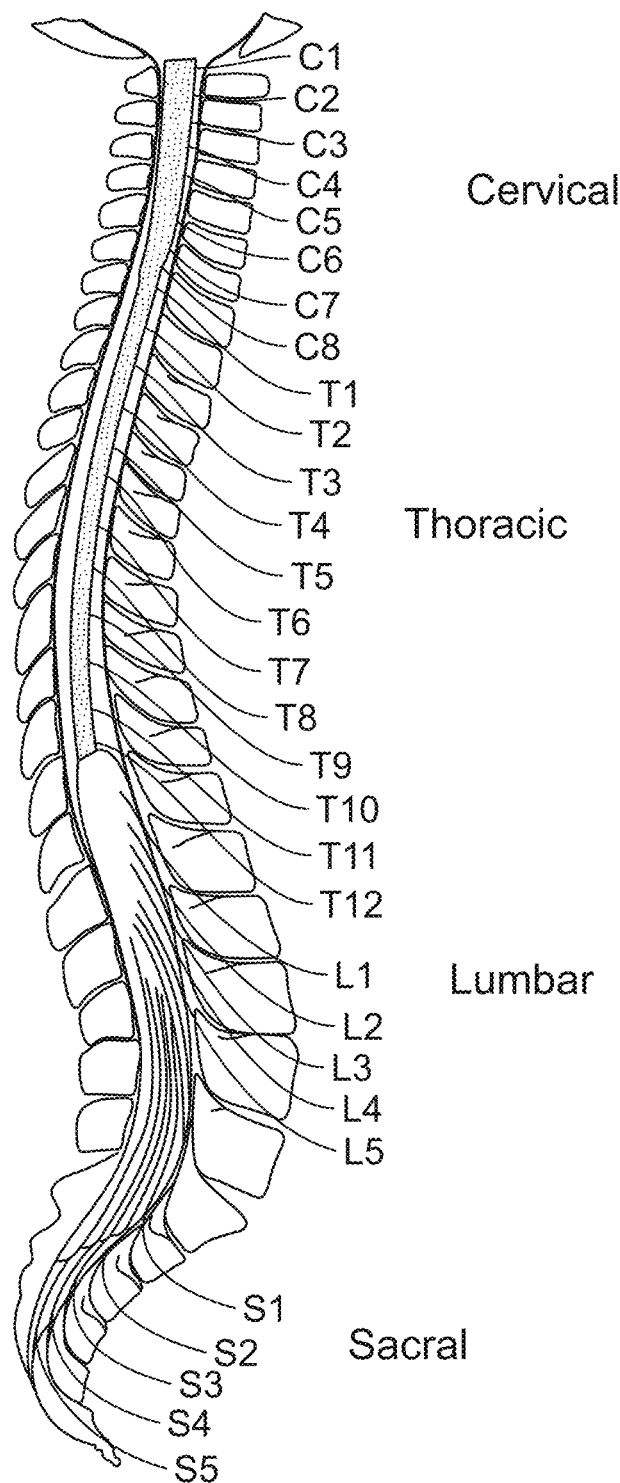
FIG. 2 is a schematic anatomic view of a human spine, showing the various regions and the vertebrae comprising the regions.

The nerve roots that supply or turn into peripheral nerves can be generally categorized by the location on the spine where the roots exit the spinal cord, i.e., cervical (generally in the head/neck, designated C1 to C8), thoracic (generally in chest/upper back, designated T1 to T12), lumbar (generally in lower back, designated L1 to L5); and sacral (generally in the pelvis, designated S1 to S5) (FIG. 2). All peripheral nerves can be traced back (proximally toward the spinal column) to one or more of the nerve roots in either the cervical, thoracic, lumbar, or sacral regions of the spine. While the nerve roots (also called peripheral nerve roots or roots of the peripheral nerve(s)) may also be termed spinal nerve roots (e.g., because they can be considered to connect the peripheral nerve to the central nervous system at the level of the spine), it is to be appreciated that the nerve roots are outside of (or peripheral to) the central nervous system and are part of the peripheral nervous system. The neural impulses comprising pain felt in a given muscle or cutaneous region of the body pass through peripheral nerves (i.e., on afferent fibers of the somatic nervous system) and (usually) one or more nerve plexuses (FIG. 3). The peripheral nerves begin at the spine, and can form trunks that divide by divisions or cords into branches that innervate skin and muscles. The following descriptions are non-limiting examples of peripheral nerves that may be targeted or affected by the present system disclosed herein. This is not an exhaustive list, and it should be recognized that there are other peripheral nerves that are not listed that can be targeted by the present system disclosed herein.

B. Nerves of the Sacral Plexus

Figure 3A:
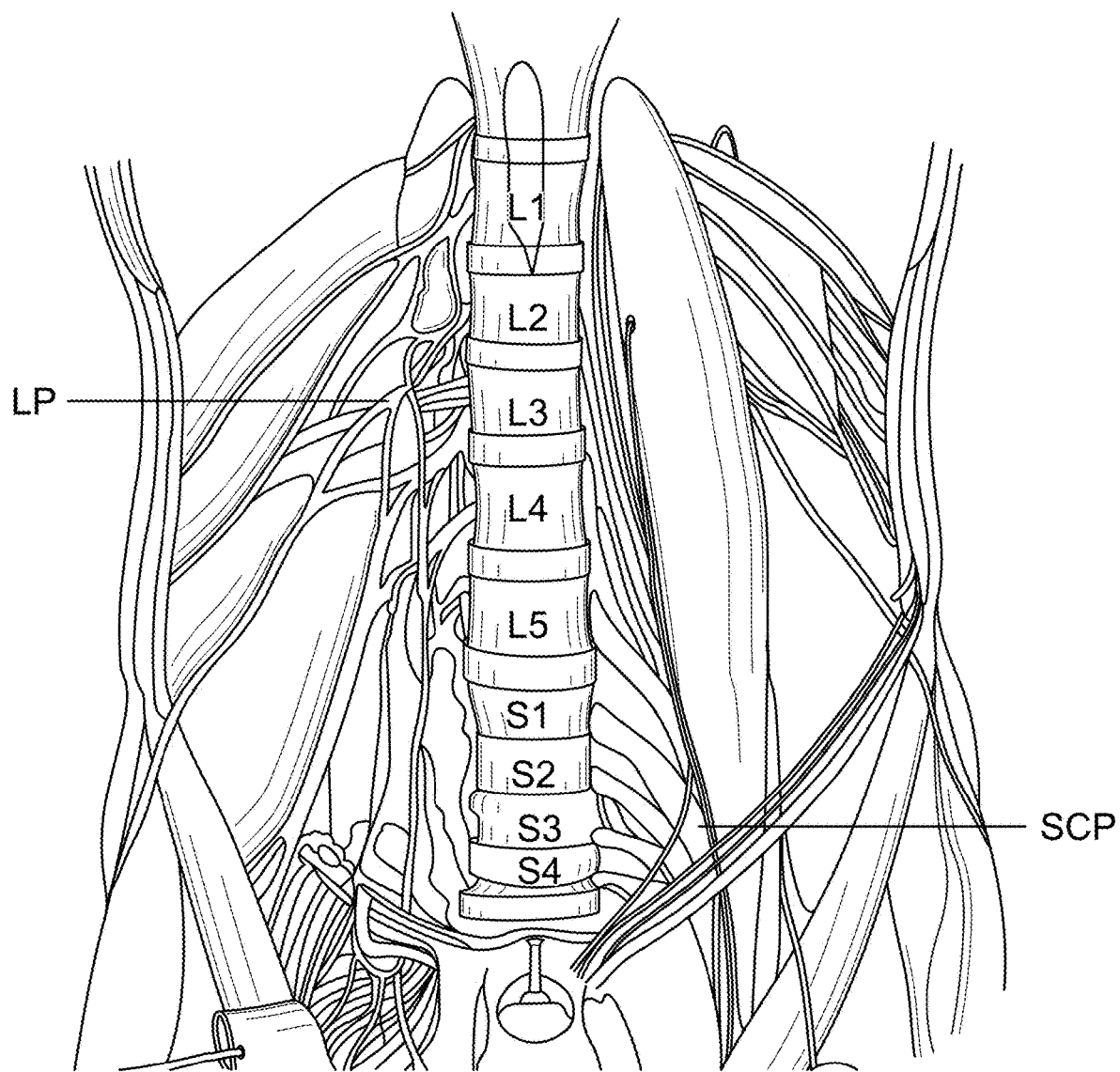
FIGS. 3A-3D are anatomic views of the spinal nerves of the extremities, including lumbar plexus and the sacral plexus and the lower extremities, and the brachial plexus and upper extremities. BP=brachial plexus, AN=axillary nerve, MN=median nerve, MCN=musculocutaneous nerve, RN=radial nerve, UN=ulnar nerve

The sacral plexus is a structure in the peripheral nervous system consisting of peripheral nerve fibers distal to the spine and before the peripheral nerves branch off to innervate more distal structures (e.g., muscle, skin, ligament, tendon, bone, etc.) primarily in the lower extremities (FIG. 3A). The sacral plexus provides motor and sensory nerves for the posterior thigh, most of the lower leg, and the entire foot.

1. The Sciatic Nerve

Figure 3B:
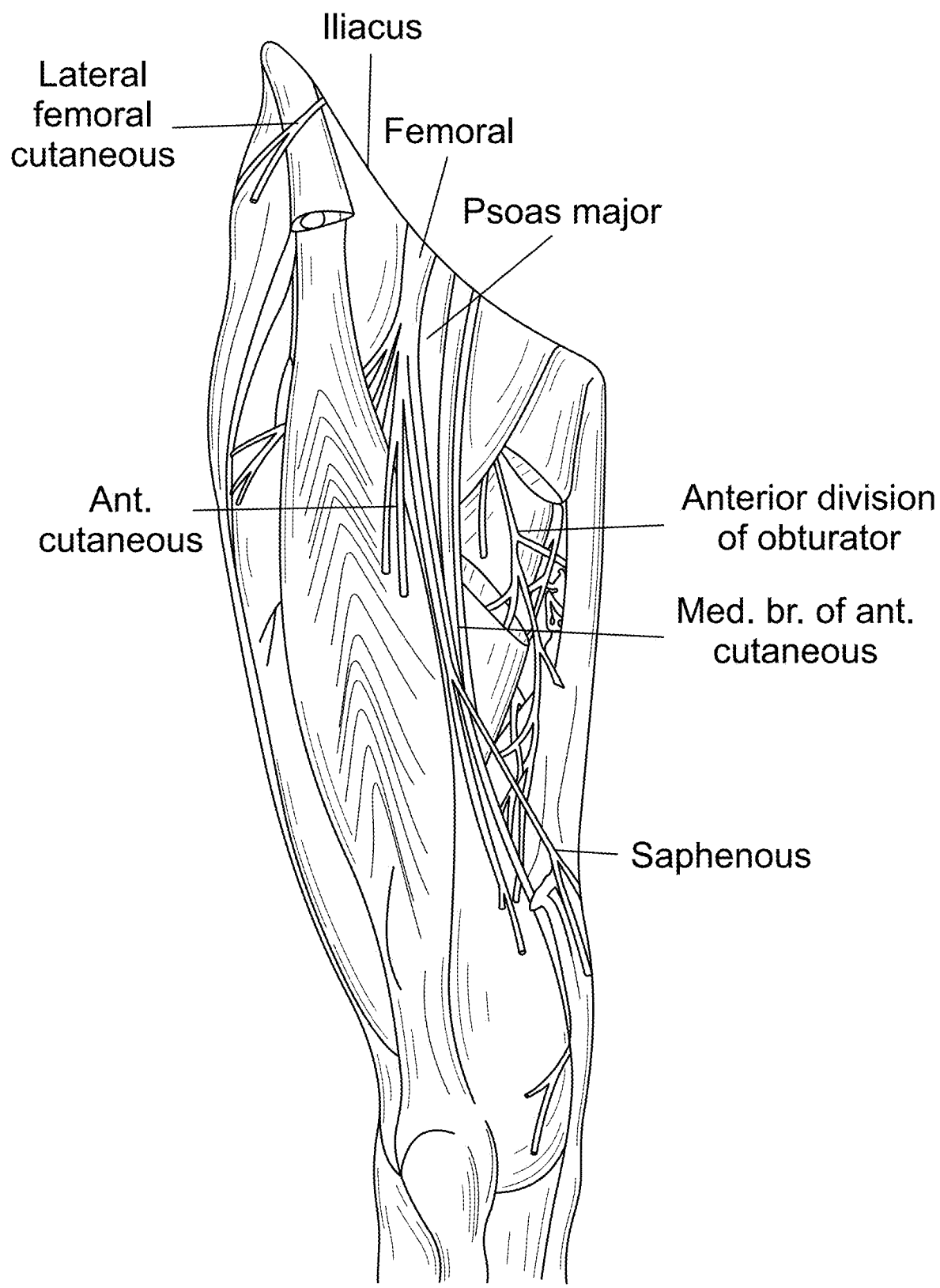
Figure 3C:
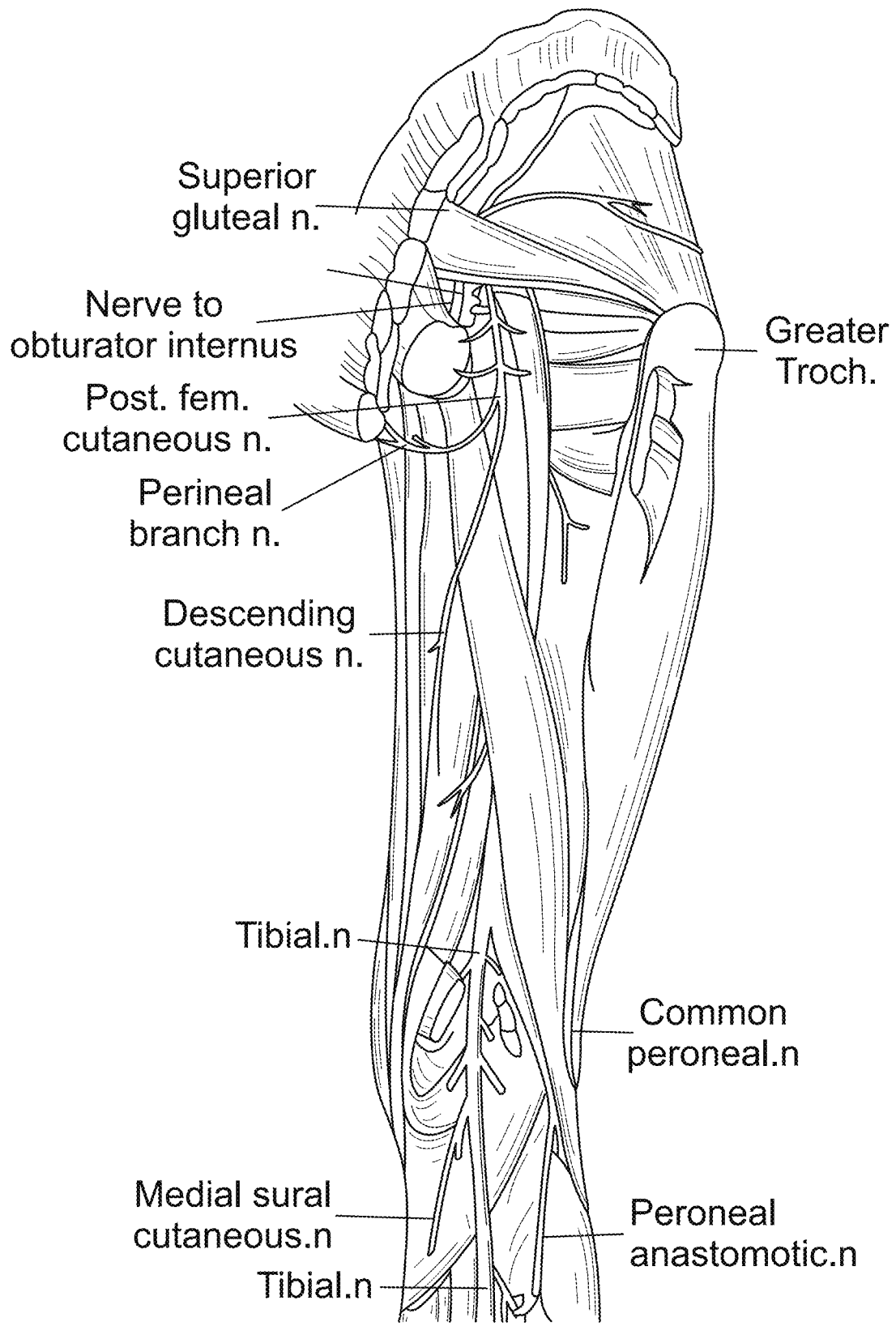

The sciatic nerve (also known as the ischiatic nerve) is a peripheral nerve that arises from the sacral plexus (FIG. 3B).

It begins in the lower back and runs through the buttock and down the lower limb. The sciatic nerve supplies nearly the whole of the skin of the leg, the muscles of the back of the thigh and those of the leg and foot, and bone, tendon, ligaments, joints, and other structures in the lower extremity. It is derived from peripheral nerves exiting the spine at L4 through S3. It contains fibers from both the anterior and posterior divisions of the lumbosacral plexus.

The sciatic nerve gives off articular and muscular branches. The articular branches (rami articulares) arise from the upper part of the nerve and supply the hip-joint, perforating the posterior part of its capsule; they are sometimes derived from the sacral plexus. The muscular branches (rami musculares) innervate the following muscles of the lower limb: biceps femoris, semitendinosus, semimembranosus, and adductor magnus. The nerve to the short head of the biceps femoris comes from the common peroneal part of the sciatic, while the other muscular branches arise from the tibial portion, as may be seen in those cases where there is a high division of the sciatic nerve.

The muscular branch of the sciatic nerve eventually gives off the tibial nerve and common peroneal nerve, which are peripheral nerves that innervate the muscles of the (lower) leg. The tibial nerve innervates the gastrocnemius, popliteus, soleus and plantaris muscles and the knee joint. It also goes on to innervate all muscles of the foot except the extensor digitorum brevis (which is innervated by the peroneal nerve).

C. Nerves of the Lumbar Plexus

The lumbar plexus (FIG. 3A) is a structure in the peripheral nervous system that is made up of peripheral nerve fibers distal to the spine and before the peripheral nerves branch off to innervate more distal structures (e.g., muscle, skin, ligament, tendon, bone, etc.), primarily in the lower abdomen, groin, and lower extremities. It provides motor, sensory, and autonomic fibers to gluteal and inguinal regions and to the lower extremities. The gluteal muscles are the three muscles that make up the buttocks: the gluteus maximus muscle, gluteus medius muscle and gluteus minimus muscle. The inguinal region is situated in the groin or in either of the lowest lateral regions of the abdomen.

1. The Iliohypogastric Nerve

Figure 5A:
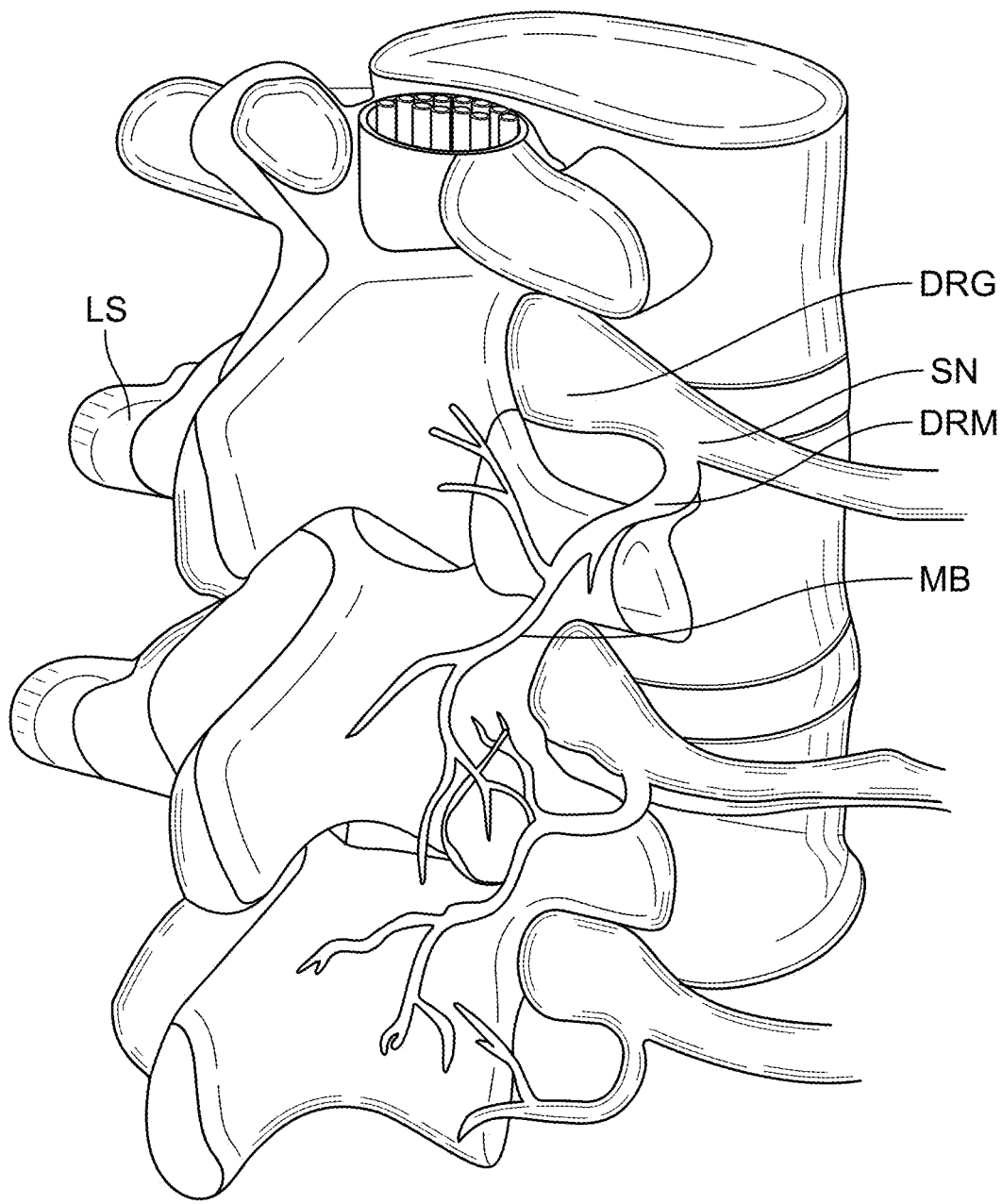
FIGS. 5A and 5B are anatomic views of the nerves of the lumbar spine (LS) and peripheral nerves that are formed distal to the dorsal root ganglia (DRG), including in FIG. 5A the medial branch (MB) of the dorsal ramus (DRM) and peripheral nerves (also known as spinal nerves (SN)), and in FIG. 5B the intercostal nerves (ICN), ilioinguinal nerve (IIN), and iliohypogastric nerve (IHN).
Figure 5B:
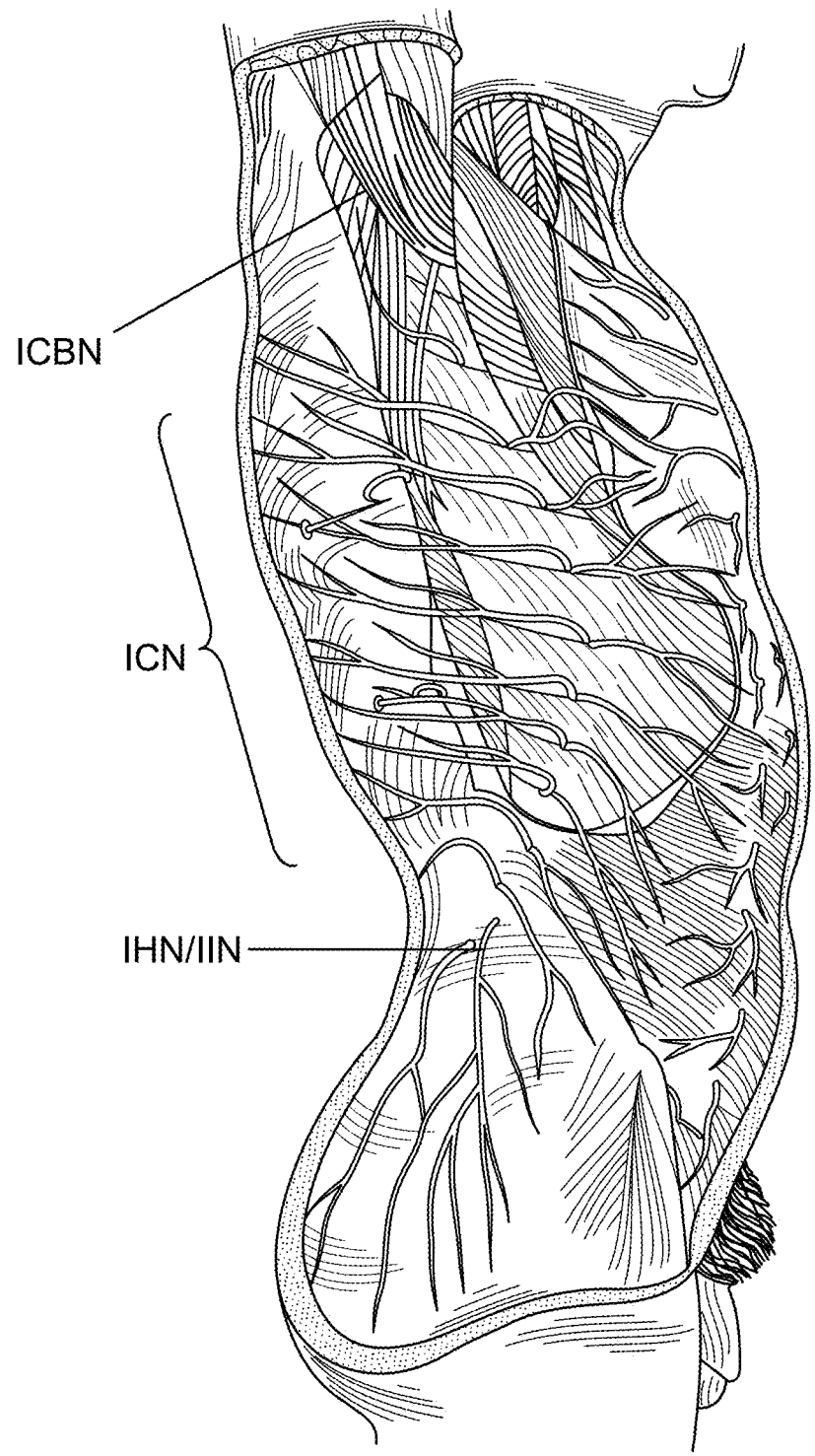

The iliohypogastric nerve is a peripheral nerve that runs anterior to the psoas major on its proximal lateral border to run laterally and obliquely on the anterior side of quadratus lumborum (FIG. 5B). Lateral to this muscle, it pierces the transversus abdominis to run above the iliac crest between that muscle and abdominal internal oblique. It gives off several motor branches to these muscles and a sensory branch to the skin of the lateral hip. Its terminal branch then runs parallel to the inguinal ligament to exit the aponeurosis of the abdominal external oblique above the external inguinal ring where it supplies the skin above the inguinal ligament (i.e. the hypogastric region) with the anterior cutaneous branch.

2. The Ilioinguinal Nerve

The ilioinguinal nerve is a peripheral nerve that closely follows the iliohypogastric nerve on the quadratus lumborum, but then passes below it to run at the level of the iliac crest (FIG. 5B). It pierces the lateral abdominal wall and runs medially at the level of the inguinal ligament where it supplies motor branches to both transversus abdominis and sensory branches through the external inguinal ring to the skin over the pubic symphysis and the lateral aspect of the labia majora or scrotum.

3. The Lateral Cutaneous Femoral Nerve

The lateral cutaneous femoral nerve is a peripheral nerve that pierces psoas major on its lateral side and runs obliquely downward below the iliac fascia (FIG. 3B). Medial to the anterior superior iliac spine it leaves the pelvic area through the lateral muscular lacuna. In the thigh, it briefly passes under the fascia lata before it breaches the fascia and supplies the skin of the anterior thigh.

4. The Obturator Nerve

The obturator nerve is a peripheral nerve that leaves the lumbar plexus and descends behind psoas major on its medial side, then follows the linea terminalis and exits through the obturator canal. In the thigh, it sends motor branches to obturator externus before dividing into an anterior and a posterior branch, both of which continue distally. These branches are separated by adductor brevis and supply all thigh adductors with motor innervation: pectineus, adductor longus, adductor brevis, adductor magnus, adductor minimus, and gracilis. The anterior branch contributes a terminal, sensory branch that passes along the anterior border of gracilis and supplies the skin on the medial, distal part of the thigh.

5. The Femoral Nerve

The femoral nerve is a peripheral nerve that is the largest and longest nerve of the lumbar plexus (FIG. 3B). It gives motor innervation to iliopsoas, pectineus, sartorius, and quadriceps femoris; and sensory innervation to the anterior thigh, posterior lower leg, and hindfoot. It runs in a groove between psoas major and iliacus giving off branches to both muscles. In the thigh, it divides into numerous sensory and muscular branches and the saphenous nerve, its long sensory terminal branch which continues down to the foot.

The femoral nerve has anterior branches (intermediate cutaneous nerve and medial cutaneous nerve) and posterior branches. The saphenous nerve (branch of the femoral nerve) provides cutaneous (skin) sensation in the medial leg. Other branches of the femoral nerve innervate structures (such as muscles, joints, tendons, ligaments, and other tissues) in the thigh and around the hip and knee joints. As an example, branches of the femoral nerve innervate the hip joint, knee joint, and the four parts of the Quadriceps femoris (muscle): Rectus femoris (in the middle of the thigh) originates on the ilium and covers most of the other three quadriceps muscles. Under (or deep to) the rectus femoris are the other three of the quadriceps muscles, which originate from the body of the femur. Vastus lateralis (on the outer side of the thigh) is on the lateral side of the femur. Vastus medialis (on the inner part thigh) is on the medial side of the femur. Vastus intermedius (on the top or front of the thigh) lies between vastus lateralis and vastus medialis on the front of the femur. Branches of the femoral nerve often innervate the pectineus and sartorius muscles.

D. Nerves of the Brachial Plexus

Figure 3D:
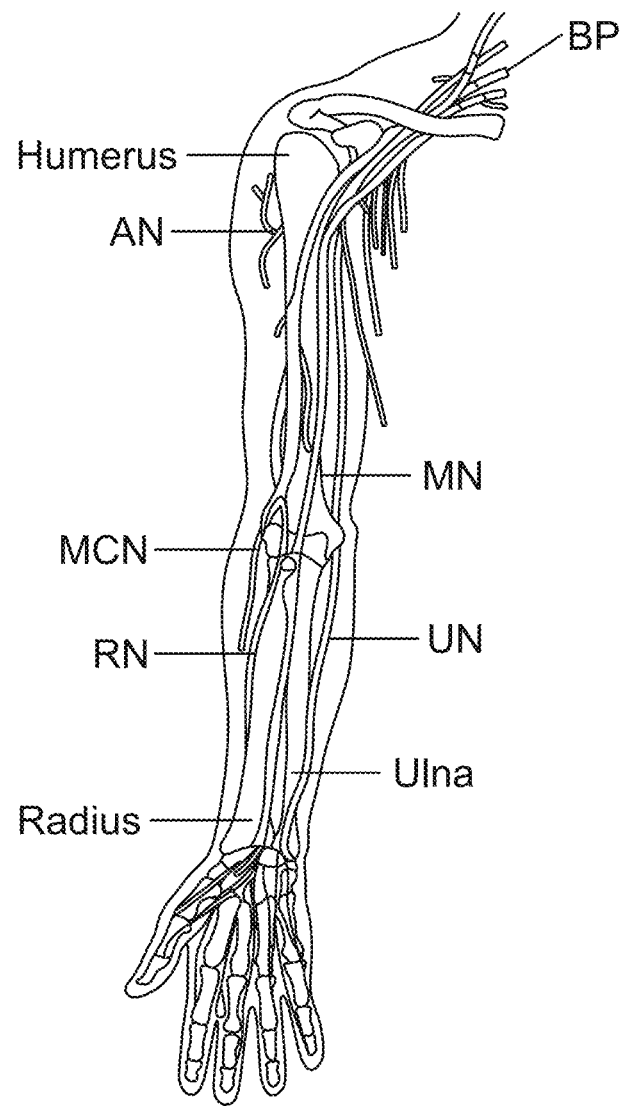

The brachial plexus is a structure in the peripheral nervous system consisting of peripheral nerve fibers distal to the spine and before the peripheral nerves branch off to innervate more distal structures (e.g., muscle, skin, ligament, tendon, bone, etc.) primarily in the upper extremities and upper back and trunk (FIG. 3D).

1. Median Nerve

The median nerve is a peripheral nerve that originates from the lateral and medial cords of the brachial plexus (FIG. 3D). The nerve enters the arm from the axilla (below the shoulder) and runs alongside the brachial artery between the biceps brachii and brachialis muscles. The median nerve gives off an articular branch in the upper arm that supplies the elbow joint. As it courses through the forearm, the anterior interosseous branch and palmar cutaneous branch split off, then the median nerve itself enters the hand through the carpal tunnel, where it branches several times to supply sensory and motor innervation of various compartments of the hand and fingers. The median nerve innervates the flexors in the forearm, with the exception of two flexors that supply the fourth and fifth digits, and supplies motor innervation and cutaneous sensory innervation of much of the hand.

2. Radial Nerve

While the median nerve supplies the anterior portion of the arm, the radial nerve is a peripheral nerve that supplies the posterior portion of the limb (FIG. 3D). It originates from the posterior cord of the brachial plexus, dividing ultimately into a deep branch and a superficial branch. The nerve supplies branches that innervate the medial and lateral heads of the triceps brachii, and then courses down the arm before piercing the lateral intermuscular septum and entering the anterior compartment of the arm. In the forearm, the superficial and deep branches of the radial nerve serve primarily sensory and motor roles, respectively. The superficial, sensory branch supplies parts of the thumb, index, middle, and part of the ring fingers. The deep branch supplies the supinator muscle and other forearm muscles, mostly including extensor muscles.

3. Ulnar Nerve

The ulnar nerve is a peripheral nerve that originates from part of the medial cord of the brachial plexus and descends on the posteromedial side of the humerus (FIG. 3D). It is exposed for several centimeters as it passes behind the medial epicondyle in the cubital tunnel at the elbow, and is commonly injured, entrapped, or bumped at that site, creating the tingling sensation commonly known as "hitting the funny bone." The ulnar nerve supplies the flexor carpi ulnaris and part of the flexor digitorum profundus in the forearm, and travels down the ulna to enter the palm of the hand through Guyon's canal. The ulnar nerve has sensory function, supplying the fifth digit and medial fourth digit and palm. It also has motor function, innervating muscles in the forearm and the hand via its muscular, deep, and superficial branches.

4. Axillary Nerve

The axillary nerve is a peripheral nerve that originates from the posterior cord of the brachial plexus below the shoulder in the axilla (or armpit) (FIG. 3D). It passes downward anterior to the subscapularis muscle, and then moves posteriorly between teres major and teres minor, lateral to the triceps brachii and medial to the neck of the humerus. The nerve branches then into an anterior branch, posterior branch, and a motor branch that supplies the triceps brachii. The anterior branch innervates the deltoid muscle and provides cutaneous branches, and the posterior branch supplies teres minor and the posterior deltoid. The nerve has mixed function, with motor innervation of the deltoid, teres minor, and triceps brachii, and sensory innervation of the shoulder joint and overlying skin, especially over the inferior portion of the deltoid.

5. Musculocutaneous Nerve

The musculocutaneous nerve is a peripheral nerve that is derived from the lateral cord of the brachial plexus. The nerve typically courses between the biceps brachii and brachialis muscles (FIG. 3D), innervating both muscles along with the coracobrachialis muscle. The actual course of this nerve relative to the coracobrachialis, brachialis, and biceps brachii may vary in some individuals. A small branch may innervate the pronator teres, and the nerve may supply sensory innervation of the dorsal surface of the thumb in some individuals with aberrations in the radial nerve (which typically innervates the dorsal surface of the thumb).

E. Trunk nerves, including peripheral nerves of the anterior (front) and posterior (back) of the trunk (i.e., torso).

1. Intercostal Nerve

The intercostal nerves are peripheral nerves that arise from the thoracic spinal levels T1 to T11 (FIG. 5B). The intercostal nerves generally innervate the walls of the thorax on the posterior and anterior sides of the trunk and the thoracic pleura, and nerves arising from lower thoracic levels (level 7-11) also supply the abdominal wall and abdominal peritoneum. The exact function, location and course, and structures innervated vary depending on the thoracic level of the nerve, but the intercostal nerves are mixed nerves, with both motor and sensory function.

2. Intercostobrachial Nerve

The intercostobrachial nerves are cutaneous branches of the intercostal nerves (FIG. 5B). Two levels in particular are likely to have intercostobrachial nerves. The second intercostobrachial nerve arises from the lateral cutaneous branch of the second intercostal nerve, crossing the axilla and supplying skin on the upper half of the medial and posterior arm. This nerve is often the source of the referred cardiac pain. The third intercostobrachial nerve arises from the lateral cutaneous branch of the third intercostal nerve, supplying filaments to the axilla and medial side of the arm.

3. Posterior or Dorsal Rami

The posterior or dorsal ramus is a peripheral nerve formed from the posterior division or branch of a peripheral nerve after it emerges from the spinal cord (FIG. 5A). At the thoracic and lumbar spinal levels, the dorsal ramus innervates the skin and deep muscles in the back, including the multifidus, iliocostalis, and longissimus muscles. The dorsal ramus also branches to innervate the facet joints along the vertebral column.

F. Peripheral Nerves of the Neck and Head

1. Trigeminal Nerve

Figure 4:
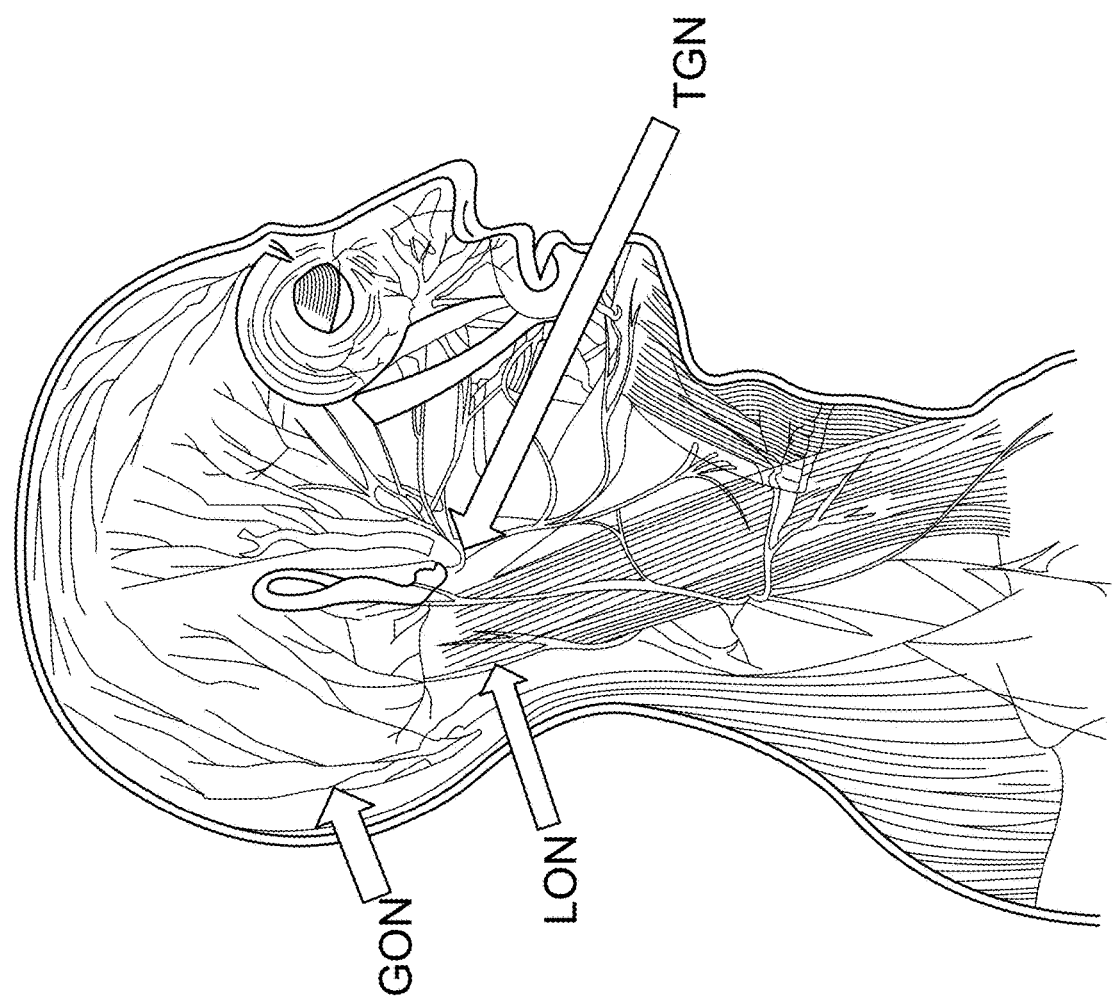
FIG. 4 is an anatomic view of the nerves of the head and neck, including the greater occipital nerve (GON), lesser occipital nerve (LON), and trigeminal nerve (TGN)

The trigeminal nerve is a peripheral nerve formed by the fifth cranial nerve and innervates the face (FIG. 4). It is a mixed nerve responsible for sensation in the face and motor functions of the jaw (i.e., muscles of mastication). The trigeminal nerve has three major sensory branches (ophthalmic, maxillary, and mandibular nerves) that exit the skull through three separate foramina before innervating various structures. The ophthalmic branch innervates the scalp, forehead, eyelid, eye structures, nose, nasal mucosa, sinuses, and meninges. The maxillary branch innervates the eyelid, cheek, upper lip, upper gums, nasal mucosa, palate, maxillary and other sinuses, and meninges. The mandibular branch innervates the lower lip and gums, the chin and jaw, parts of the ear, and meninges.

2. Occipital Nerves

The greater and lesser occipital nerves are peripheral nerves that innervate parts of the head (FIG. 4). The greater occipital nerve arises from the C2 nerve. It passes through the semispinalis muscle and ascends to innervate the skin along the posterior scalp, top of the head, and over the ear. The lesser occipital nerve arises between the $2^{nd}$ and $3^{rd}$ cervical vertebrae with the greater occipital nerve. It innervates the lateral scalp posterior to the ear.

F. Nerve Fiber Classifications and Function

Types of neural cells, axons, nerve fibers, or physiological structures that may be affected by the invention include, but are not limited to, functional afferent types A and C axons and efferent type A axons. The afferent axons may be classified as Aα (Type Ia or Ib), Aβ (Type II), Aδ (Type III), or C (Type IV). Afferent A fibers therefore refer to Type Ia, Ib, II, and/or III.

The term "large diameter A fibers" or "large diameter sensory fibers" or "large diameter fibers" refers to Aα and/or Aβ fibers, or Type Ia, Ib, and/or II. Aα (Type Ia) fibers are associated with the primary sensory receptors of the muscle spindle, such as for transducing muscle length and speed. These fibers are myelinated, usually having a diameter from about 9 to about 22 micrometers (μm), although other diameters have been observed and may be included, and a conduction velocity of about 50 to about 120 meters per second (m/s), which is proportional to the diameter of the fiber for both this type and other types of myelinated fibers. Aα (Type Ib) fibers are associated with Golgi tendon organs, such as for sensing and transducing muscle contraction. These fibers are myelinated, having a diameter from about 9 to about 22 micrometers (μm) and a conduction velocity of about 50 to about 120 meters per second (m/s). Aβ (Type II) fibers are associated with the secondary sensory receptors of the muscle spindle, such as for sensing and transducing muscle stretch. These fibers are also associated with joint capsule mechanoreceptors (as senses and transduces joint angle) and all cutaneous mechanoreceptors. The cutaneous mechanoreceptors may include, but are not limited to, Meissner's corpuscles, Merkel's discs, Pacinian corpuscles, Ruffini corpuscles, hair-tylotrich (for sensing stroking/fluttering on the skin or hair), and the field receptor (for sensing skin stretch). The AR fibers are myelinated, usually having a diameter from about 6 to about 12 micrometers (μm), although other diameters have been observed and may be included, and a conduction velocity of about 33 to about 75 meters per second (m/s).

The term "small diameter fibers" or "small diameter sensory fibers" or "small diameter pain fibers" or "pain fibers" refers to A-delta and/or C fibers, or Type III and/or Type IV fibers. Aδ (Type III) fibers are associated with free nerve endings of touch and pressure (for sensing excess stretch or force), hair-down receptors (for sensing soft, or light, stroking), nociceptors of the neospinothalamic tract, and cold thermoreceptors. These fibers are thinly myelinated, having a diameter from about 1 to about 5 micrometers (μm) and a conduction velocity of about 3 to about 30 meters per second (m/s). C (type IV) fibers are associated with nociceptors of the paleospinothalamic tract, and warmth thermoreceptors. These fibers are unmyelinated, having a diameter from about 0.2 to about 1.5 micrometers (μm) and a conduction velocity of about 0.5 to about 2.0 meters per second (m/s).

Many nerve bundles include both afferent and efferent fibers. The efferent axons may be classified as Aα or Aγ. Aα efferent fibers are associated with extrafusal muscle fibers. These fibers are myelinated, having a diameter from about 13 to about 20 micrometers (μm) and a conduction velocity of about 50 to about 120 meters per second (m/s). Aγ efferent fibers are associated with intrafusal muscle fibers. These fibers are myelinated, having a diameter from about 5 to about 8 micrometers (μm) and a conduction velocity of about 20 to about 40 meters per second (m/s).

Nerves of the peripheral nervous system consist of many fascicles, which are small bundles of nerve fibers grouped together within a sheath called the perineurium. A nerve may consist of many fascicles that are themselves grouped together within the nerve's outer sheath called the epineurium. Fascicles are made up of individual fibers that are often grouped together functionally, meaning fibers that innervate certain anatomic structures, such as a muscle, muscle group, region of skin, bone, tendon, ligament, or other structure, are grouped together in a fascicle or fascicles. A region of pain may be innervated by fibers grouped together in one or more fascicles within the nerve, while other fascicles may innervate regions that are not in the region of pain.

Figure 6A:
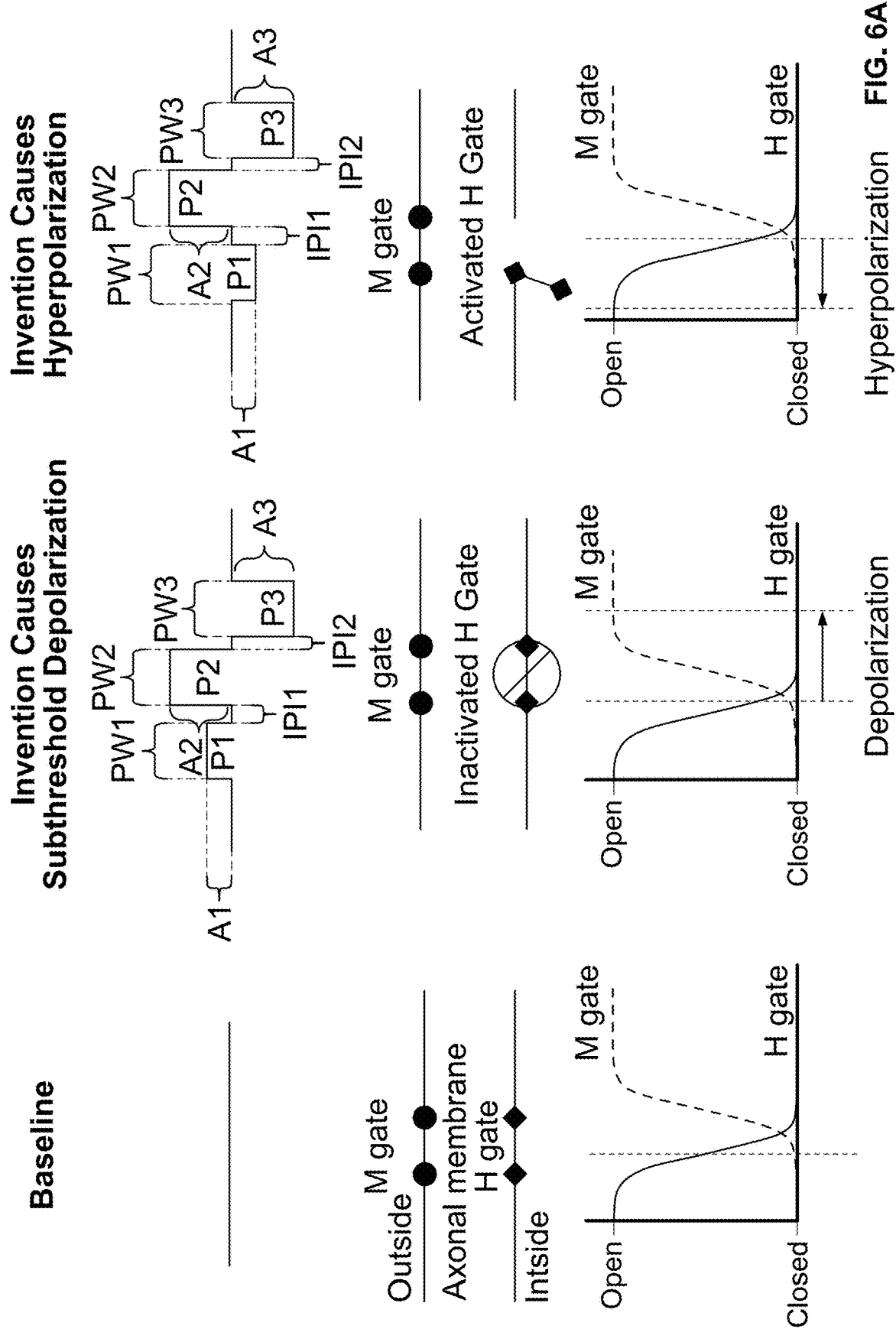
FIG. 6A-C are non-limiting examples of schematic views of opening, closing, and deactivation of the M and H gates of sodium channels on the axonal membranes of nerve fibers caused by stimulation pulses from the present system to enable selective activation and/or inactivation of target fibers. At baseline, the M and H gates are closed and are able to be activated. Opening of the H gate followed by depolarization of the membrane and opening of the M gate while the H gate is still open can result in an action potential.
Figure 6B:
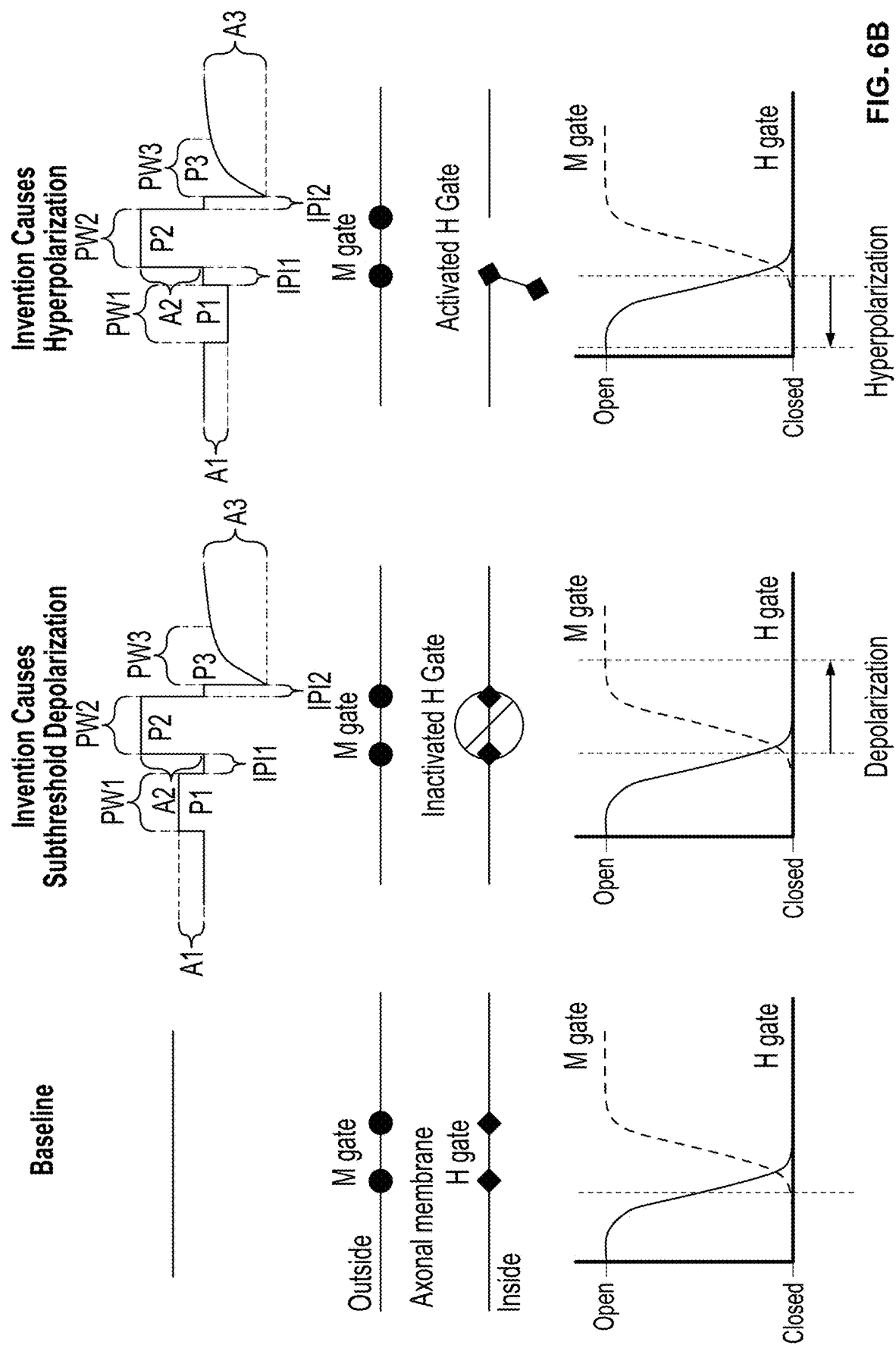
Figure 6C:
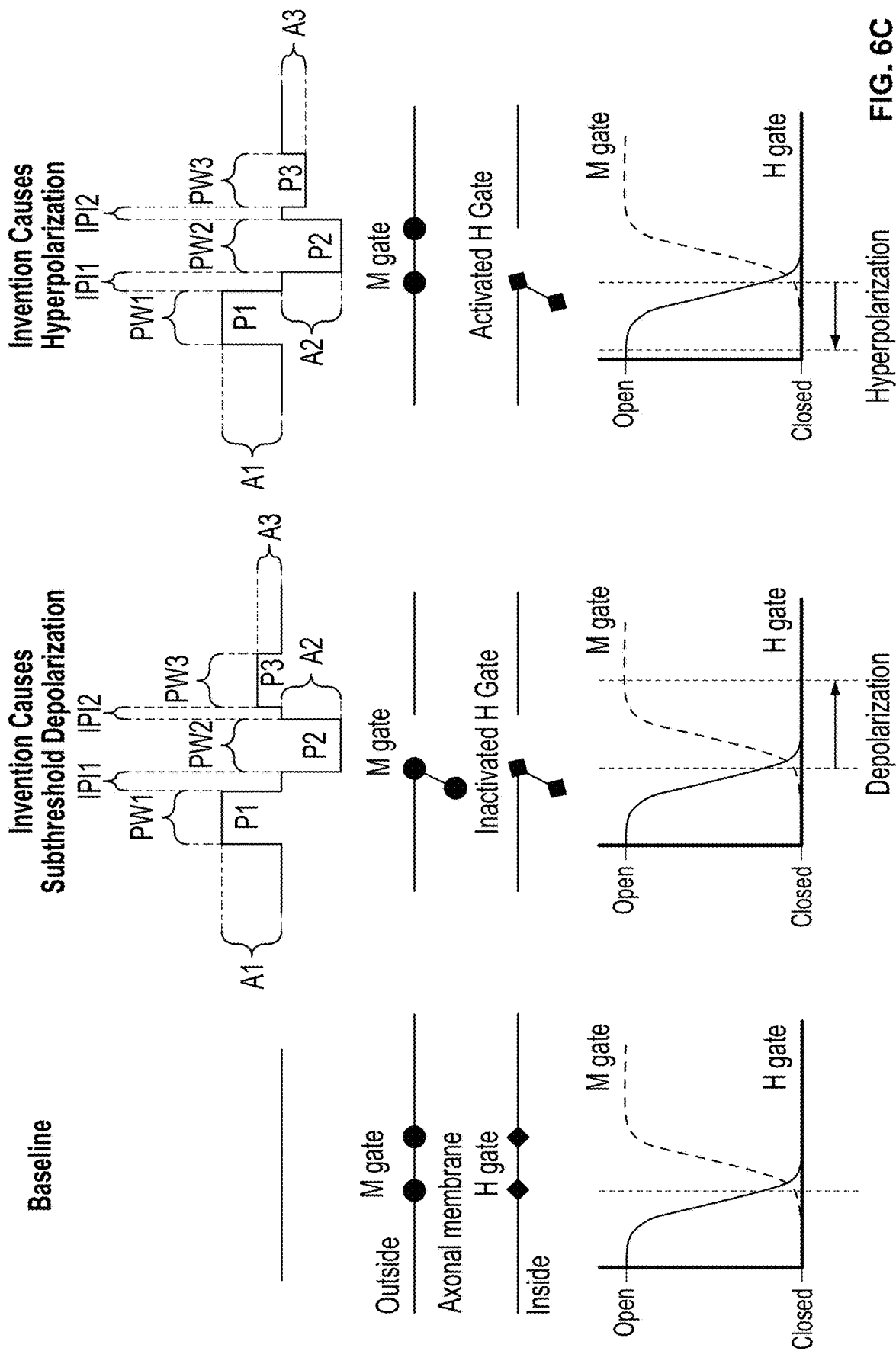

The firing of action potentials in nerve fibers is based in part on the opening and closing of sodium channels that permit ionic flow into or out of the cell membrane (FIG. 6). FIG. 6A-C are non-limiting examples of schematic views of opening, closing, and deactivation of the M and H gates of sodium channels on the axonal membranes of nerve fibers caused by stimulation pulses from the present system to enable selective activation and/or inactivation of target fibers. At baseline, the M and H gates are closed and are able to be activated. Opening of the H gate followed by depolarization of the membrane and opening of the M gate while the H gate is still open can result in an action potential. In FIGS. 6A and 6B, the present system causes subthreshold depolarization or hyperpolarization, such as from a depolarizing or hyperpolarizing pre-pulse of Amplitude A1, pulse width PW1. A depolarizing prepulse may inactivate the H gate such that further depolarization, such as from a primary depolarizing/activating pulse of amplitude A2, pulse width PW2, and preceded by an interpulse interval IP1, or a charge balancing pulse of amplitude A3, pulse width PW3, and preceded by an interpulse interval of IP2, does not result in an action potential. A hyperpolarizing prepulse may activate the H gate such that an action potential is more likely to occur in a target subset of fibers. In FIG. 6C, the present system causes subthreshold depolarization, such as from a depolarizing post-pulse, that may maintain opening of the M gate for a longer period of time such that repeated activation of the axon is more likely to occur. The present system may also cause hyperpolarization, such as from a hyperpolarizing post-pulse (HPoP) in FIG. 6C, such that closure and/or inactivation of the M gate prevents or prematurely ends initiation of an action potential. Sodium channels in peripheral nerves have multiple subunits (including h-gates and m-gates) that must be open simultaneously to enable sodium ion flow and the possibility of action potential initiation and/or conduction. The present system inactivates (or increases probability of inactivation) either the h- or m-gates to decrease excitability of an axon, and/or opens (or increases probability of opening) either the h- or m-gates to increase excitability of an axon. H- and m-gate opening can be determined, influenced, or controlled by the present system by affecting transmembrane voltage such that membrane depolarization, for example from a depolarizing cathodic stimulation pulse, closes (or increases probability of closing, e.g., from 20% to 50% probability of being closed, 50% to 100%, 50% to 90%, 10% to 100%, 25% to 80%, etc.) h-gates and opens (or increases probability of opening, e.g., from 10% to 70% probability of being open, 10% to 30%, 1% to 70%, 20% to 100%, 30% to 80%, etc.), while membrane hyperpolarization, such as a hyperpolarizing anodic stimulation pulse, opens (or increases probability of opening, e.g., from 50% to 100% probability of being open, 30% to 90%, 40% to 95%, 25% to 80%, 1% to 100%, etc.) h-gates and closes (or increases probability of closing, e.g. from 50% to 1% probability of being open, 40% to 0%, 50% to 5%, 5% to 1%, 80% to 20%, etc.). H-gates have slower time constants than m-gates, so they return to their baseline state and/or recover from depolarizing or hyperpolarizing stimulation pulses slower than m-gates.

II. The Central Nervous System

1. Spinal Cord

The spinal cord may be used as the first processing center for sensory information sent from the periphery through the peripheral nervous system. Signals sent from the periphery through a peripheral nerve may include non-painful and/or painful sensations (e.g., tactile, proprioceptive, temperature, nociceptive, etc.). Most peripheral nerve fibers synapse in the dorsal horn of the spinal cord, with a smaller number of fibers (mostly large diameter sensory fibers, and/or Type Ia, Type Ib, and/or Type II fibers) projecting, or bifurcating and partially projecting, directly to the brainstem without synapsing in the spinal cord. The dorsal horn contains excitatory and inhibitory interneuron networks that the present system may use, activate, deactivate, and/or change with a goal of modulating sensory signals (e.g., increasing or decreasing, upwards or downwards, amplifying or attenuating, etc.) depending on a variety of factors, including descending controls from the brain and the types and intensities of information created in, sent in, or coming from the periphery. The present system may use, create, induce, or cause incoming non-painful information on afferent fibers of peripheral nerves, such as electrical stimulation-evoked activation of large diameter fibers (e.g., Type Ia, Ib, and II fibers, or A-alpha, A-beta fibers) and/or other fibers, to inhibit, reduce, or attenuate the projection of pain signals to the brain.

2. Brain

The brain contains multiple regions that may be used in the processing of sensory information. The activation of peripheral nerves by the present system may subsequently activate brain regions involved in pain processing that are collectively termed the "pain matrix", and include the primary (S1) and secondary (S2) somatosensory cortex, insula, anterior cingulate cortex, posterior parietal cortex, and prefrontal cortex. Of note, both tactile (non-painful) and nociceptive (painful) somatosensory inputs are spatially mapped in the S1 and S2 cortices. Some regions of the cortex are dedicated to painful or non-painful sensation, while a majority of the cortex is multimodal, meaning the spatial maps for painful and non-painful sensations overlap.

Figure 8A:
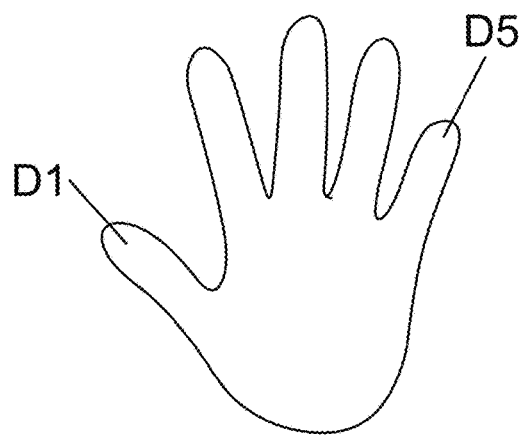
FIGS. 8A to 8D are representations of non-limiting examples of maladaptive cortical plasticity in chronic pain that are reversed by the system disclosed herein. In the health cortex, non-painful sensations from regions of the body (such as the first and fifth digits of the hand, D1 and D5, FIG. 8A) are mapped onto the cortex (FIG. 8B). In chronic pain, contraction of the representation of the hand is represented by the closer distance between the mapping of D1 and D5 during application of non-painful stimuli (FIG. 8C). The present system reverses the contraction of non-painful cortical representations, restoring them to or closer to the healthy state (FIG. 8D).
Figure 8B:
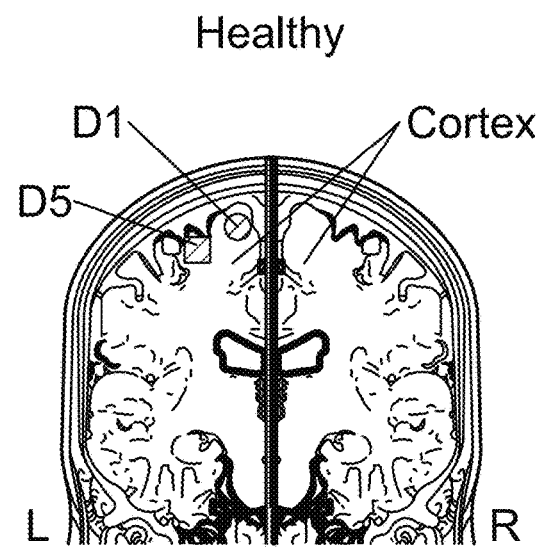
Figure 8C:
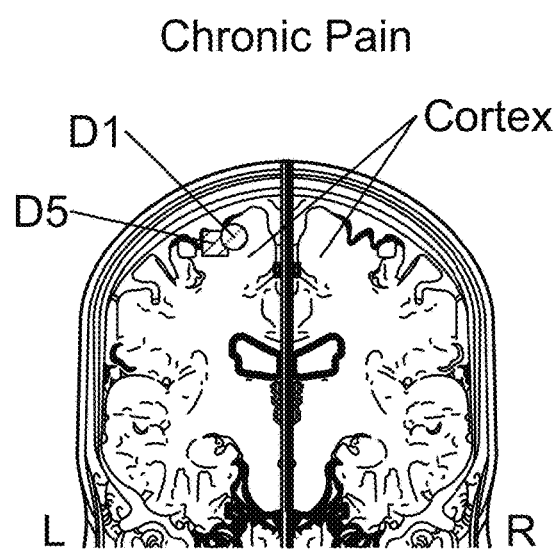
Figure 8D:
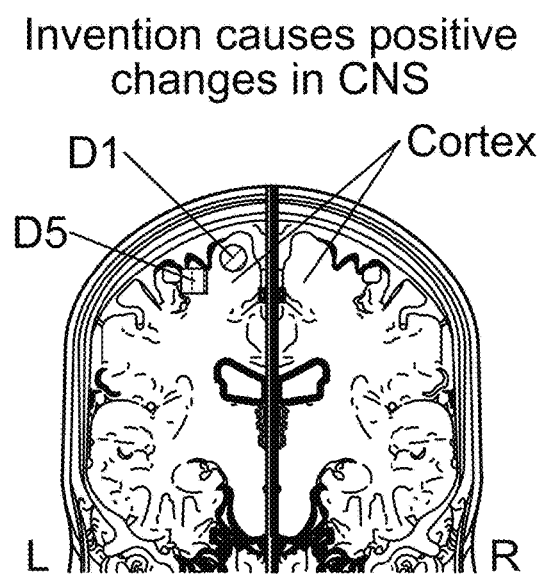
Figure 9A:
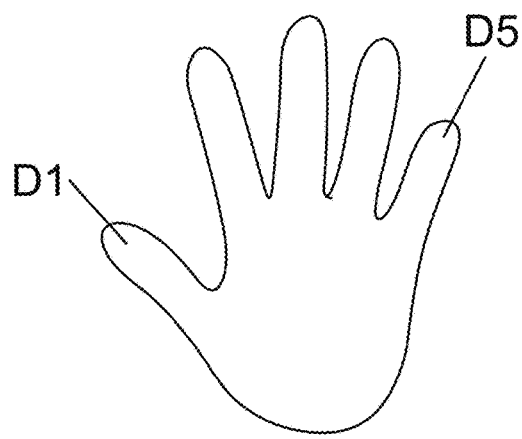
FIGS. 9A to 9D are representations of non-limiting examples of maladaptive cortical plasticity in chronic pain that are reversed by the present system disclosed herein. In the healthy cortex, painful sensations from regions of the body (such as the first and fifth digits of the hand, D1 and D5 (FIG. 9A) are mapped onto the cortex (FIG. 9B). In chronic pain, expansion of the representation of the hand is represented by the wider distance between the mapping of D1 and D5 during application of painful stimuli (FIG. 9C). The present system reverses the expansion of painful cortical representations, restoring them to or closer to the healthy state (FIG. 9D).
Figure 9B:
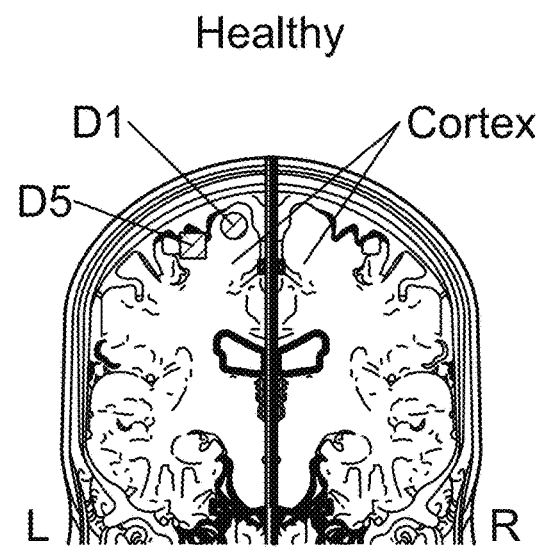
Figure 9C:
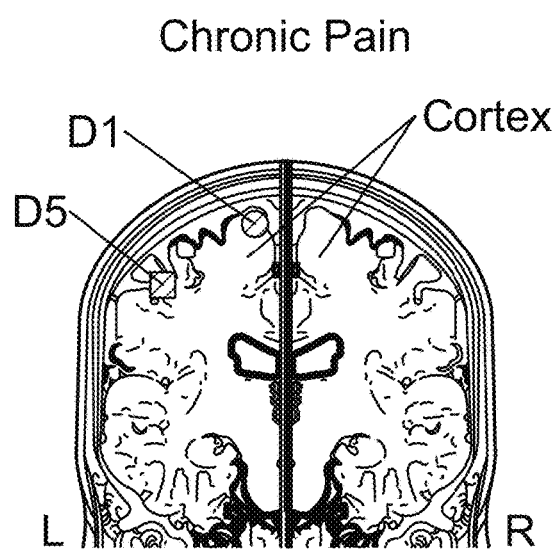
Figure 9D:
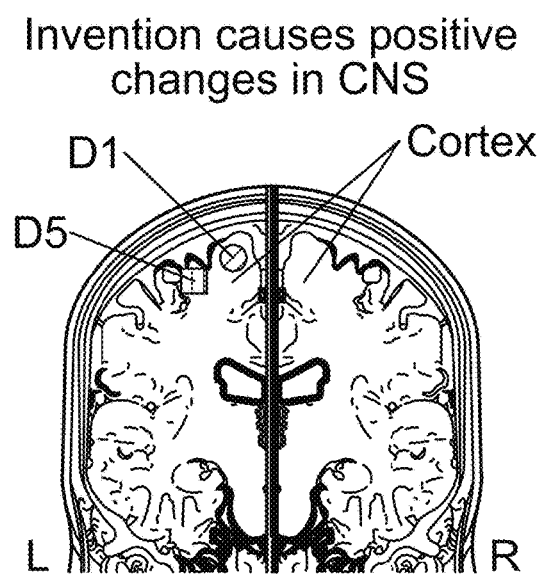

Under basal, typical, or healthy conditions, the cortical regions dedicated to non-painful and painful somatosensation exist in balance. But increased nociceptive signals from the periphery (e.g., in the setting of or history of (or following) musculoskeletal injury, post-surgery, trauma or nerve lesion, and certain disease states or conditions, such as herpes zoster infection, fibromyalgia, diabetes, and/or neurological disorders or conditions) can trigger plasticity that chronically sensitizes the pain matrix, leading to chronic pain (e.g., chronic neuropathic pain, nociplastic pain, chronic musculoskeletal pain, etc.) and/or background pain. Background pain is pain that exists continuously, semi-continuously, regularly, semi-regularly, and/or is unprovoked, spontaneous, provoked or caused by movement (e.g., normal, physiological movement), and/or provoked or caused or worsened by non-painful sensory signals. Background pain may exist as a baseline state (e.g., a patient is always in pain) that is higher than the baseline pain state of a normal, healthy individual, and/or may be the result of an injury (e.g., musculoskeletal injury, surgery, trauma or nerve lesion, etc.), disease state (e.g., herpes zoster, fibromyalgia, chronic regional pain syndrome, causalgia, etc.), or central sensitization state or process. Background pain is distinct and separate from acute, nociceptive, normal, or healthy pain (e.g., acute, transient, and/or nociceptive pain that may relate to or indicate real, perceived, or potential tissue damage or danger). Because of the shift in balance towards more painful signals and less non-painful signals, tactile (non-painful) representations in the somatosensory cortex tend to shrink or contract and display or exhibit less intense activation in response to peripheral tactile stimulation (FIGS. 8 & 10). FIGS. 8A to 8D are representations of non-limiting examples of maladaptive cortical plasticity in chronic pain that are reversed by the system disclosed herein. In the health cortex, non-painful sensations from regions of the body (such as the first and fifth digits of the hand, D1 and D5, FIG. 8A) are mapped onto the cortex (FIG. 8B). In chronic pain, contraction of the representation of the hand is represented by the closer distance between the mapping of D1 and D5 during application of non-painful stimuli (FIG. 8C). The present system reverses the contraction of non-painful cortical representations, restoring them to or closer to the healthy state (FIG. 8D). FIGS. 10A to 10C are representations of non-limiting examples of maladaptive cortical plasticity in chronic pain that are reversed by the present system disclosed herein. In the healthy cortex, non-painful stimulation of a certain region of the body evokes activation in the somatosensory cortex (S1). In chronic pain, non-painful stimulation evokes a smaller or less widespread response in the cortex. The present invention reverses the weakening and/or contraction of non-painful cortical representations (NPR), restoring them to or closer to the healthy state.

Meanwhile, noxious (painful) representations expand and increase in size and become more responsive or sensitized to peripheral noxious stimulation (FIGS. 9 & 11). FIGS. 9A to 9D are representations of non-limiting examples of maladaptive cortical plasticity in chronic pain that are reversed by the present system disclosed herein. In the healthy cortex, painful sensations from regions of the body (such as the first and fifth digits of the hand, D1 and D5 (FIG. 9A) are mapped onto the cortex (FIG. 9B). In chronic pain, expansion of the representation of the hand is represented by the wider distance between the mapping of D1 and D5 during application of painful stimuli (FIG. 9C). The present system reverses the expansion of painful cortical representations, restoring them to or closer to the healthy state (FIG. 9D). FIGS. 11A to 11C are representations of non-limiting examples of maladaptive cortical plasticity in chronic pain that are reversed by the present system disclosed herein. In the healthy cortex, painful stimulation of a certain region of the body evokes activation in a region of the somatosensory cortex (S1). In chronic pain, painful stimulation evokes a larger and/or more widespread response in the cortex. The present system reverses the strengthening and/or expansion of painful cortical representations (PR), restoring them to or closer to the healthy state.

The regions of the cortex that sense pain grow larger and capable of producing more pain. Functional remapping can also trigger pain in response to previously non-painful stimuli as the shrinkage or contraction of non-nociceptive representations in the pain matrix regions of the brain (e.g., S1, S2, ACC, insula, thalamus) can result in replacement in those same non-nociceptive (non-painful) areas with nociceptive (painful) functionality. The regions of the brain that sense pain can take over the regions of the brain that previously sensed non-painful stimuli, meaning the previously non-painful stimuli, such as light touch or pressure, regular muscle contraction, or body or body part movement, can now cause pain following these negative changes that occur in the chronic pain state.

III. Systems and Methods to Provide Sustained Pain Relief

The present teaching provides devices, systems, methods, and instructions for use of devices, systems, or methods for placing and using one or more electrical stimulation lead(s) to target one or more peripheral nerves with stimulation that is delivered by the system(s) for a period or periods (e.g., minutes, hours, days, weeks, months, years (such as for example 60 days)) to relieve pain and produce sustained pain relief following cessation or termination of stimulation and/or withdrawal of the lead(s) and following the application of the electrical stimulation (e.g., producing pain relief during stimulation and relief that outlasts the duration of stimulation). The systems and methods activate a sufficient number of target fibers (e.g., Type Ia, Ib, and/or II fibers, large diameter sensory fibers, and/or A-alpha and/or A-beta fibers) to provide sustained pain relief by producing neuroplastic effects in the central nervous system that reverse, reduce, or overcome the chronic or background pain. The number of target fibers activated may be considered sufficient if a large percentage (e.g., majority) of target fibers in the target nerve that innervate the region of pain are activated (preferably up to 100% of target fibers that innervate the region of pain, though as non-limiting examples, >50%, >60%, >70%, >80%, >90%, etc. may also be sufficient to enable or produce the neuroplastic effects in the central nervous system required for sustained pain relief). The number of target (e.g., large diameter sensory, A-alpha and/or A-beta, and/or Type Ia, Ib, and/or II) fibers activated in the peripheral nerve may also be considered sufficient to cause changes in the central nervous system, such as cortical reorganization where the goal to cause cortical reorganization is a positive balance between non-painful input and painful input received in the somatosensory cortex from the region of pain. The number of target fibers activated may therefore be sufficient if the non-painful sensory information produced in the target fibers shifts the balance (e.g., the ratio, balance, or relative number of action potentials per second, minute, hour, or day, and/or the number of activated fibers and/or the intensity of the activation as measured by the frequency of action potentials, bursts of action potentials, or temporal shifts in the pattern(s) of action potentials) of painful and non-painful information reaching the somatosensory cortex from the region of pain to include more non-painful information than painful information (i.e., a positive balance). The foregoing provides sustained relief after stimulation ends.

It is contemplated that electrical stimulation producing the activation of a sufficient number of target fibers without or with the avoidance of the activation of non-target fibers (e.g., while avoiding the production of action potentials and/or the production or conveyance of stimulation-induced or stimulation-evoked physiological information in non-target fibers (e.g., small diameter pain fibers, A-delta fibers and/or C fibers, and/or Type III and/or Type IV fibers)) is necessary to produce sustained pain relief following withdrawal of the stimulating leads. In order to produce sustained pain relief, the present system: 1) activates, achieves, selectively achieves, preferentially achieves, increases, maximizes and/or optimizes activation of target fibers to ensure that a sufficient number of target fibers innervating the region of pain are activated, such as large diameter sensory fibers, A-alpha and/or A-beta fibers, and/or Type Ia, Ib, and/or II fibers, while 2) minimizing, reducing, limiting, preventing, and/or avoiding activating non-target fibers (e.g., small diameter (e.g., pain, noxious, or nociceptive), A-delta and/or C, and/or Type III and/or IV fibers), and also 3) facilitating augmenting and/or avoiding blocking or attenuating (e.g., permitting or avoiding undesirable blocking of) healthy, typical, normal, useful, usual, desirable, and/or beneficial function and/or activation of the peripheral nerve and nerve fibers (e.g., producing pain relief while avoiding interfering with motor or sensory capabilities and/or functions of the nerve and/or nerve fibers, such as off-target (e.g., bystander) nerve fibers). The foregoing, may maximize target fiber activation, may avoid non-target fiber activation and may enable (or at least not block/disable) normal sensorimotor function.

In an embodiment, the present system achieves pain relief in the long term by causing changes (e.g., neuroplastic changes in the central nervous system) while stimulation is on such that the changes continue to produce long term relief for months, years, or indefinitely (e.g., pain does not return) once stimulation is turned off (e.g., after stimulation has been delivered and after delivery of stimulation has ceased). In these embodiments, the time of pain relief may be measured from the date that the stimulation is turned off, i.e., from the date that the patient no longer receives stimulation. In addition, the present system may also: maximize pain relief in the short term and long term by selectively activating target fibers while avoiding activating non-target fibers that if activated may increase or cause pain; facilitate beneficial nerve fiber function by avoiding blocking nerve fibers that provide useful function (e.g., avoiding blocking of fibers that when activated do not promote chronic pain or background pain); enable or avoid disabling transmission of useful, beneficial, short-term, transient, and/or acute pain signals that serve as a warning or alarm of danger or tissue damage while decreasing perception of chronic or background pain that does not provide benefit in terms of a warning or alarm of danger or tissue damage; and cause, enable, and facilitate the positive changes in the nervous system (e.g., the central nervous system) that reduce and continue to minimize chronic pain and background pain during and after the delivery of stimulation (e.g., days, weeks, years, and/or indefinitely after stimulation is delivered and/or delivery of stimulation has ended).

In a non-limiting example of a patient in a chronic pain state and/or an unhealthy neural state with chronic and unwanted pain in which the background pain is deleterious, has a negative impact (e.g., on the patient's quality of life), is distracting, and/or does not serve a beneficial purpose or cause a positive effect, the present systems cause and perpetuate the creation and sustainment of a non-painful neural state (e.g., perceived as healthy, normal, or physiological) in which the physiology, neurophysiology, and neural state (e.g., the peripheral, central, spinal, or supraspinal cortical, etc. processing of sensory, non-sensory, and/or neural information) of the patient is changed by the system from painful to non-painful or from significant and disabling pain to insignificant and non-disabling pain (e.g., perceived as changed from unhealthy to healthy). In an embodiment, the system may also:

resolve, reduce, and/or minimize chronic pain and/or deleterious background pain;

enable, facilitate, or not attenuate or disable acute, beneficial, transient, and useful pain (e.g., pain that serves as an indicator or warning of damage, danger, etc.) that is beneficial to the patient while chronic, unwanted, persistent, deleterious, and/or background pain remains or is maintained in a resolved, abolished, attenuated, and/or minimized state;

facilitate or avoid attenuating or blocking other nerve functions, such as normal, healthy, desired, or physiologic sensory nerve fiber and motor nerve fiber functions.

The present system causes these changes and causes the sustainment and maintenance of these changes by delivering peripheral nerve stimulation through a unique set of device(s), system(s), and method(s), or instructions for use of device(s), system(s), and method(s) that cause changes (e.g., plastic changes) in the nervous system (e.g., the central and/or peripheral nervous system).

In a non-limiting example, the present system produces pain relief and maintains long term reductions in chronic or background pain by causing and mediating neural plasticity, including preferential and selective formation, strengthening, reinforcement, removal, weakening, attenuation, reorganization, and modification of specific neural processing centers, regions, pathways, connections, synapses and relative upregulation and downregulation of neurotransmitters (e.g., within specific non-pain and pain neural processing centers, regions, pathways, connections, synapses) within the central nervous system. These changes can be produced in isolation or in combination to change a patient's neural state from one of chronic pain to one that is devoid of chronic pain and/or maintains a state of reduced chronic pain and maintains a beneficial balance between painful and non-painful input and sensory information, thereby perpetuating a state without (or with reduced levels of) chronic pain or background pain. While many of the changes caused by the invention effect changes (e.g. long-term changes) in the central nervous system, it is to be appreciated that the invention may also effect changes in the peripheral nervous system, and those changes may also be long term.

The present system can achieve sustained (e.g., 6-12 months or up to 1, 2, 3, 5, 8, 10 or more years) pain relief by inducing changes in the central nervous system by stimulating a peripheral nerve or part of the peripheral nervous system. In an example of an embodiment, the present system causes changes in the central nervous system by delivering electrical stimulation to peripheral nerve(s) (e.g., stimulating part of the peripheral nervous system) while avoiding stimulation of, not directly stimulating and avoiding direct contact with the central nervous system (e.g., causing changes in the brain without and/or while avoiding direct stimulation of or contact with the brain (e.g., without and/or while avoiding brain stimulation or deep brain stimulation); causing changes in the cortex or cortices without and/or while avoiding direct stimulation of or contact with the cortex or cortices (e.g., without and/or while avoiding cortical stimulation); and/or causing changes in the spinal cord without and/or while avoiding direct stimulation of or contact with the spinal cord, spinal nerve fibers, cell bodies, spinal neurons that are considered part of the central nervous system, and/or the epidural space (e.g., without and/or while avoiding spinal cord stimulation, dorsal column stimulation, and epidural stimulation)). In a non-limiting example, the present system may also cause changes in the central nervous system (CNS) and/or dorsal root ganglion (or ganglia) (DRG) by stimulating a peripheral nerve without and/or while avoiding direct stimulation of or contact with the central nervous system (or the associated structures) or the DRG (or the associated structures) (e.g., without and/or while avoiding spinal cord stimulation, without and/or while avoiding dorsal column stimulation, without and/or while avoiding epidural stimulation, and/or without and/or while avoiding dorsal root ganglion (ganglia) stimulation or DRG stimulation). In another example of an embodiment, the present system causes changes in the central nervous system by delivering peripheral nerve stimulation or electrical stimulation of peripheral neve(s) (e.g., stimulating part of the peripheral nervous system) while avoiding stimulation individual nerve fiber endings (or nerves or nerve fibers) in the skin, muscles, tendons, ligaments, bones, or other non-nervous tissues (e.g., causing changes in the brain, spinal cord, and/or peripheral nerves without and/or while avoiding stimulation of nerve endings in the skin transcutaneously, through the skin, or at the surface of the skin, and without and/or while avoiding direct stimulation or activation of muscular tissue and/or nerves or nerve fibers innervating muscular tissue).

In an embodiment, the present system causes changes in the central nervous system and reduces pain by stimulating a peripheral nerve and activating a majority or a sufficient number of target peripheral nerve fibers (e.g., large diameter sensory fibers (also known as A-alpha and/or A-beta fibers, or Type Ia, Ib, and/or II fibers), or large diameter motor fibers) while avoiding stimulation of the central nervous system, avoiding activation of non-target peripheral nerve fibers (e.g., small diameter sensory fibers (also known as pain fibers, C and/or A-delta fibers, or Type III and/or IV fibers)), and avoiding blocking of beneficial transmission of neural signals (e.g. avoiding nerve block of peripheral nerve fibers, including nerve fibers that convey pain and non-pain related information, and facilitating the function of the peripheral nerve without unwanted block of the nerve). It is to be appreciated that in some cases, transmission of pain signals (e.g., acute, transient, and/or nociceptive pain that may relate to or indicate real, perceived, or potential tissue damage or danger) is beneficial and is desirably preserved and maintained by the present system while the system simultaneously reduces undesirable and unwanted chronic pain (e.g., neuropathic pain, nociplastic pain, background pain, etc.). The system:

desirably selectively decreases chronic or background pain, such as neuropathic or nociplastic pain that no longer provides utility to the patient and detracts from quality of life;

while avoiding blocking beneficial transmission of acute, transient, and useful pain, such as nociceptive pain that provides utility to the patient (e.g., provides appropriate indication or warning of real, perceived, or potential tissue damage or danger) and the level, intensity, and/or type of nociceptive pain that is enabled may also be modulated (e.g., in terms of duration, intensity, quality, and/or other characteristics) as needed to optimize its utility while mitigating and managing any negative effects such as unwanted pain and/or distraction that may detract from the potential utility;

while preserving non-painful sensory (afferent) and/or motor (efferent) function, input, signaling, action potential transmission, and perception (e.g., maintaining beneficial non-painful sensory inputs and use and control of muscles and end organs innervated by the peripheral nerve or nerve fibers and avoiding unwanted paralysis and unwanted limitations to sensory or muscle function). It is to be appreciated that the individual nerve functions that may be selectively or preferentially enabled, reduced, enhanced, attenuated, increased, decreased, facilitated, and/or eliminated may be interchanged as needed by the present system to achieve the desired effect. In a non-limiting example, it may be desirable to facilitate acute, transient, and/or nociceptive pain in one scenario while reducing or eliminating it in another scenario.

Figure 15A:
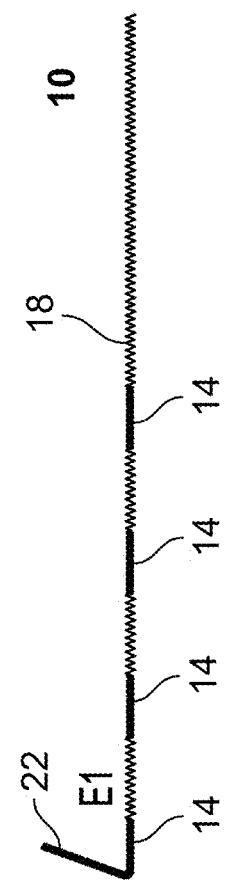
FIGS. 15A-F are representative leads that can form a part of a peripheral nerve stimulation system.
Figure 15B:
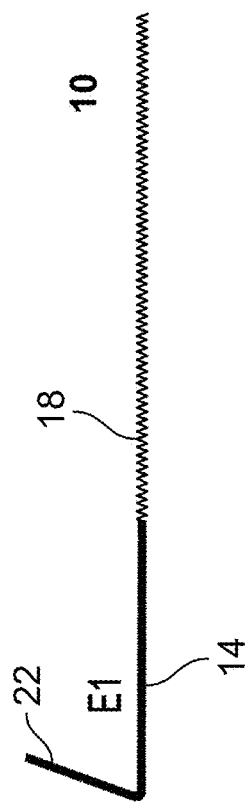
Figure 15C:
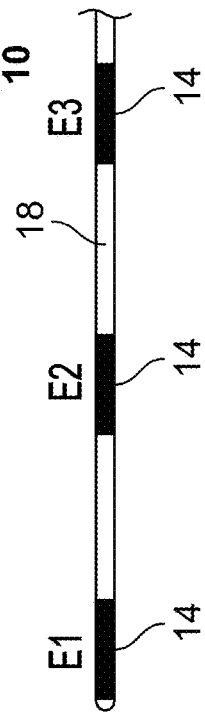
Figure 15D:
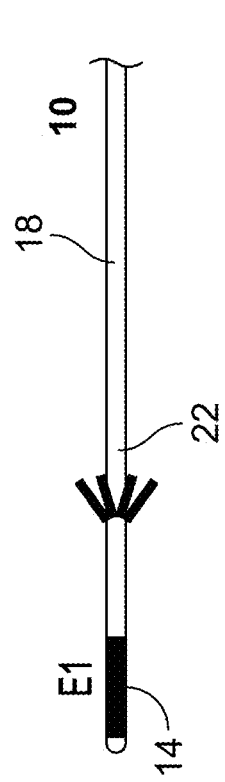
Figure 15E:
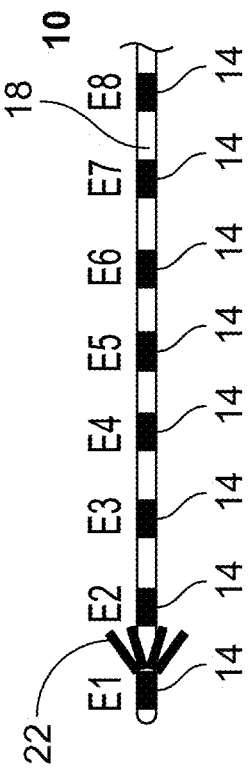
Figure 15F:
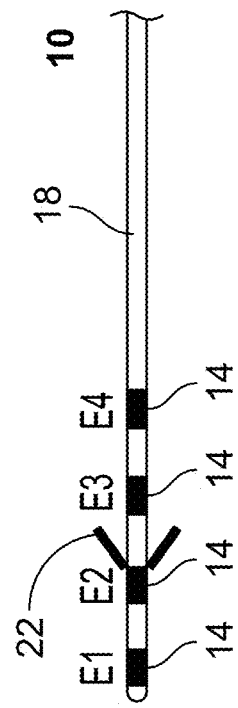
Figure 16A:
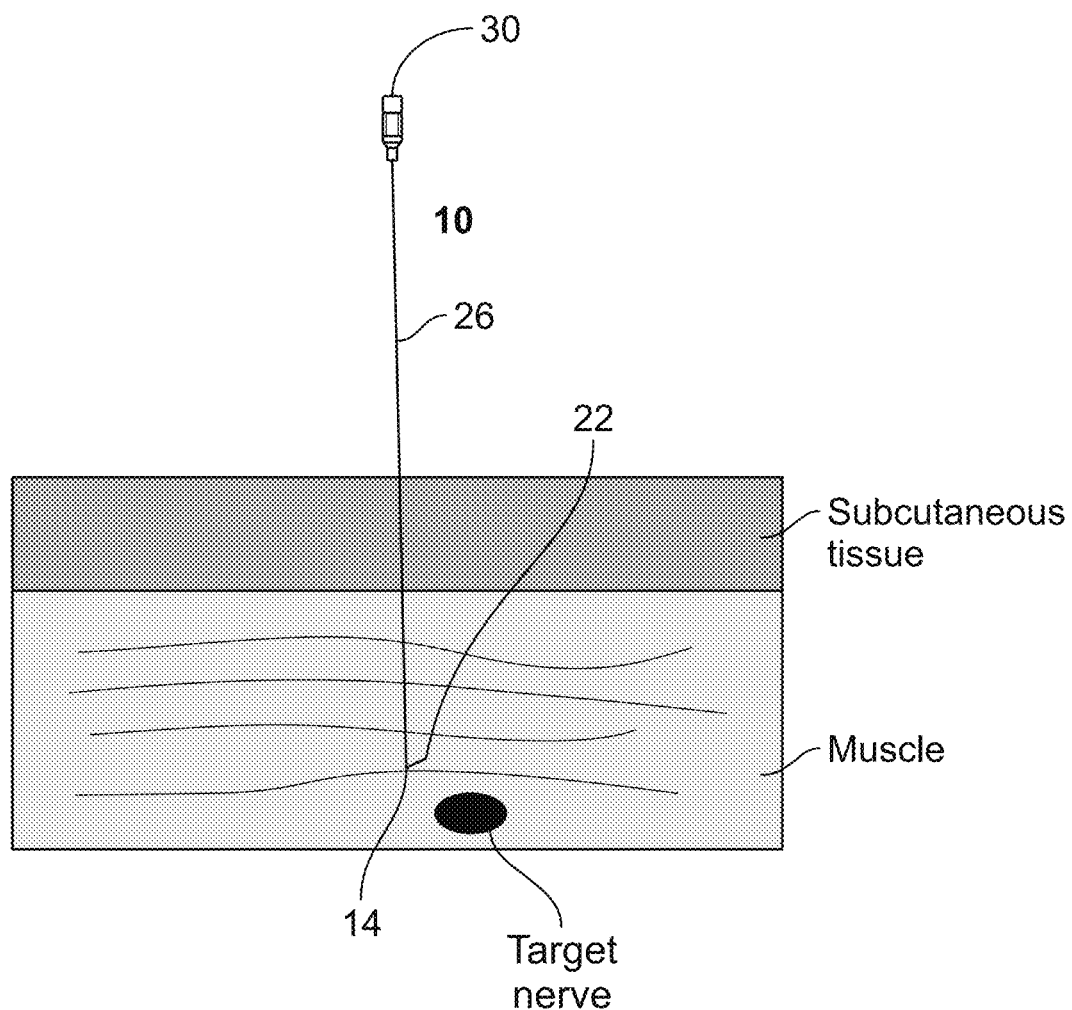
FIGS. 16A to 16C are views showing a percutaneous lead that can form a part of a peripheral nerve stimulation system, with the lead inside an introducer needle (FIGS. 16A and 16B) and placed remote to (e.g., one to three centimeters from) a nerve after the removal of the introducer needle (FIG. 16C). After placement of the lead and removal of the introducer (FIG. 16C), the lead may be connected to an external stimulator with a surface electrode as a return electrode, and an appropriate bandage placed over the site where the lead exits the skin.
Figure 16B:
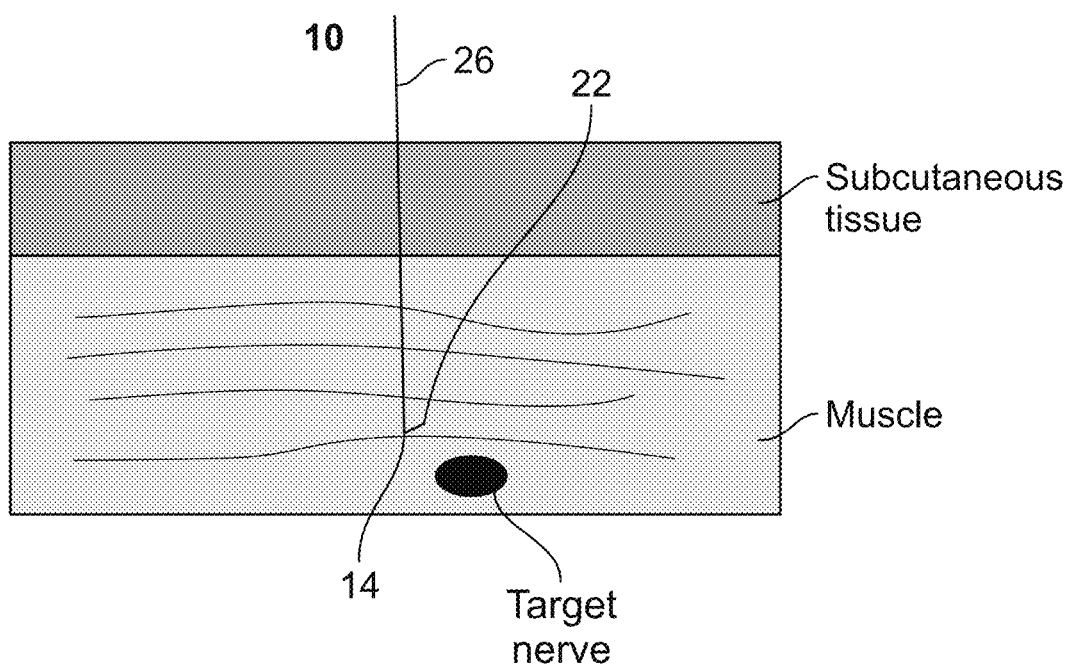
Figure 16C:
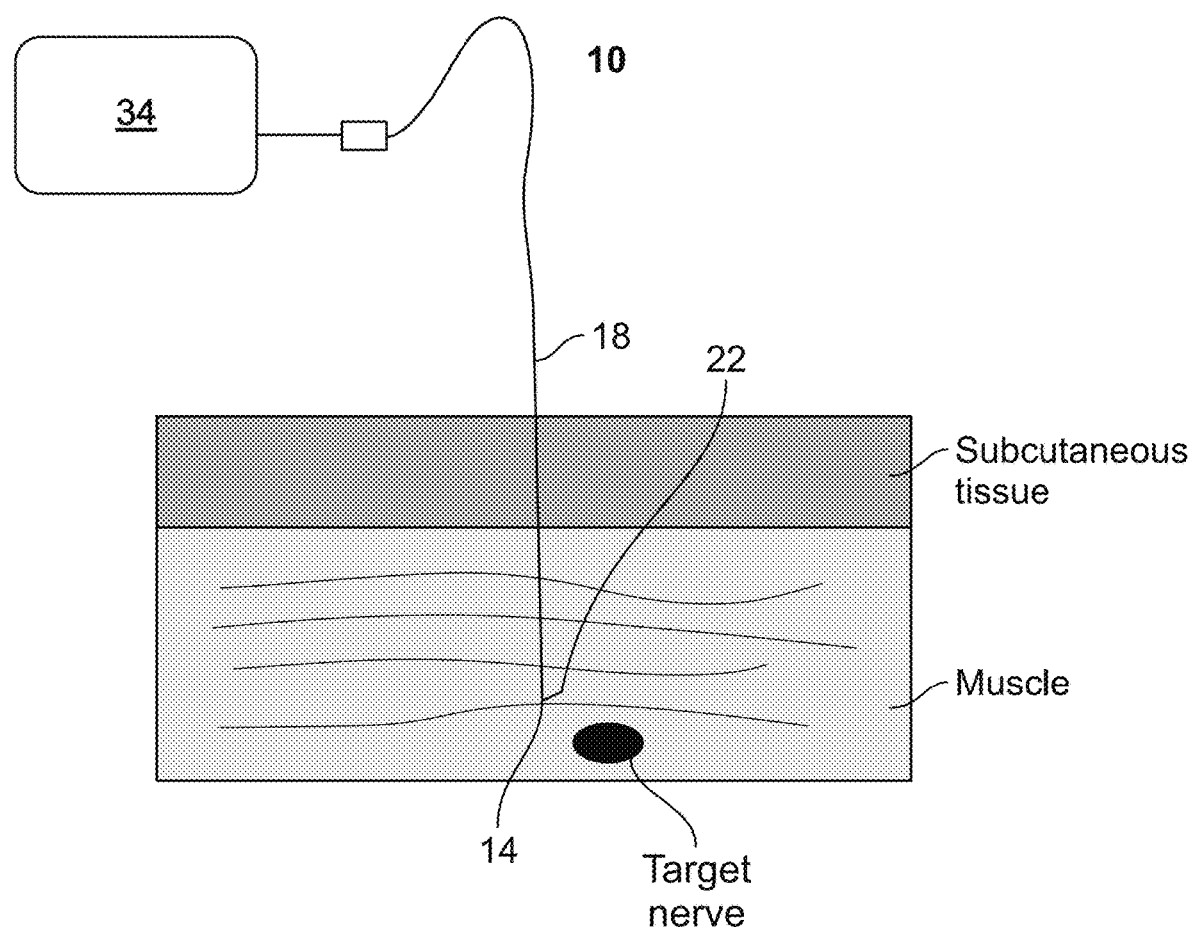
Figure 17A:
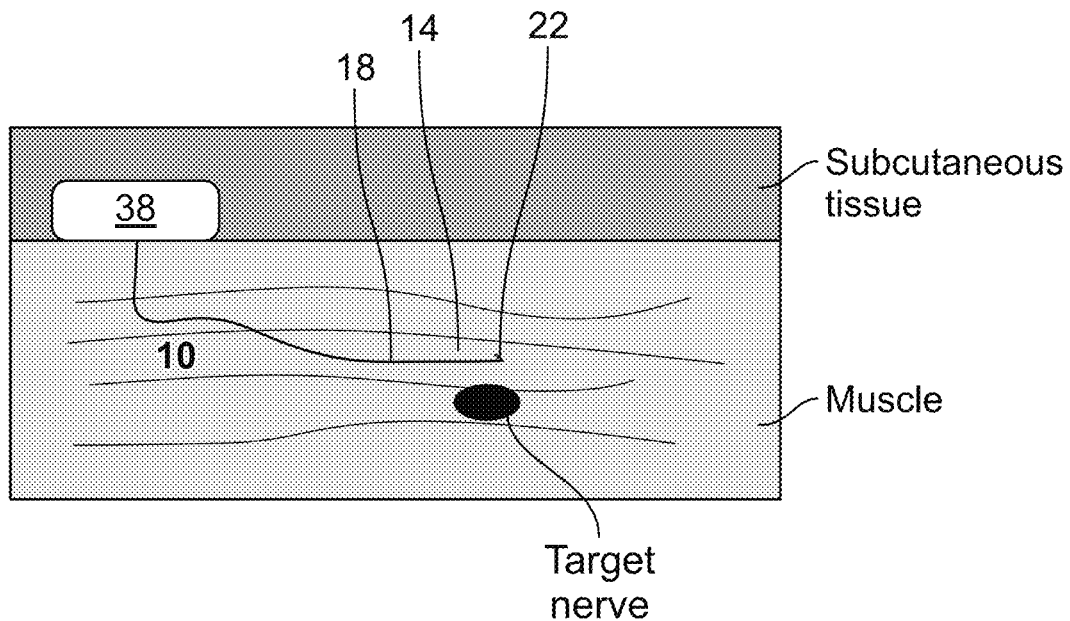
FIGS. 17A to B disclose partial cross-sectional views of the portions of the system operatively implanted into a body.
Figure 17B:
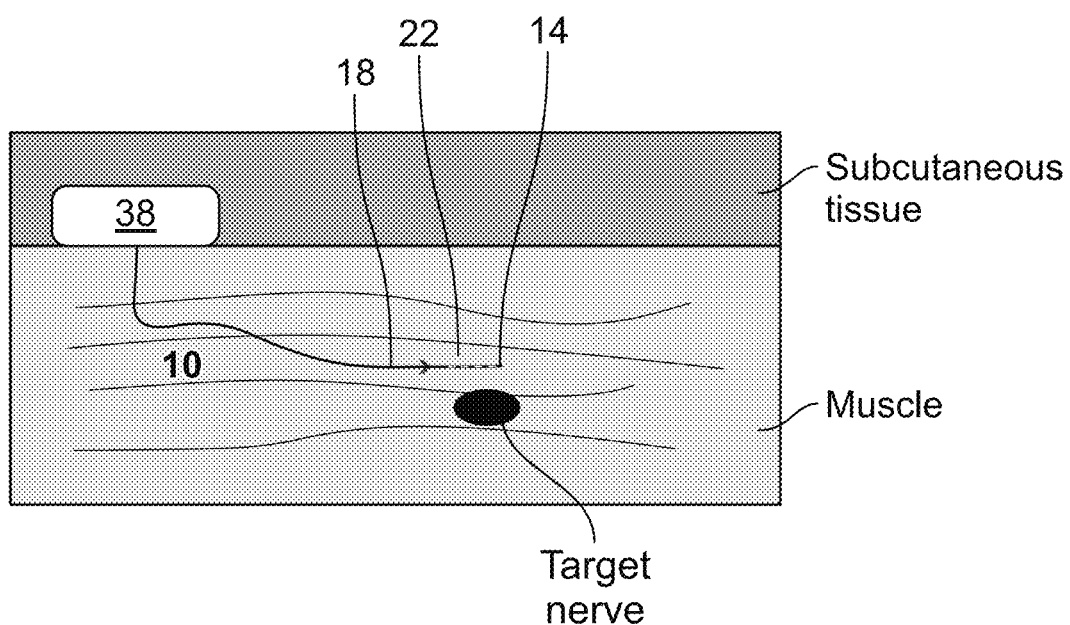

In an embodiment, the system overcomes many of the limitations of conventional neurostimulation systems, reducing invasiveness by enabling the placement of leads percutaneously (e.g., with or without imaging guidance, such as ultrasound or fluoroscopic guidance) and reducing infection rates and the loss of therapeutic effect due to lead migration by employing a lead that can be placed remote from the target nerve (e.g., 5-30 mm distant from the target nerve, and in some embodiments: 1-50 mm, 1-40 mm, 1-30 mm, 2-50 mm, 2-40 mm, 2-30 mm, 3-50 mm, 3-40 mm, 3-30 mm, 5-50 mm, 5-40 mm, 5-30 mm distant from the target nerve). In a preferred approach, the stimulating electrode is placed 0.5-3 cm distant from the nerve. The system may use multiple types of electrodes and leads, including a flexible, open-coil lead and/or a cylindrical lead that may or may not have an open coil (FIG. 15). For example, the nerve stimulation system 10 may include one or more electrodes 14, a lead 18, and an anchor 22. The nerve stimulation system 10 may include any number of electrodes 14, including one, two, three, four, five, six, seven, eight, nine, ten, eleven (E1-E11), or more electrodes 14. The anchor 22 may be located on a distal end of the electrodes 14 and the lead 18 may be located on a proximal end of the electrodes 14 (FIG. 15A-B), or the anchor 22 may be located anywhere on the electrode 14 and/or lead 18, including proximal the one (FIGS. 15C, F) or more (FIG. 15E) of the electrodes 14. In embodiments having more than one electrode 14 (FIGS. 15B, D-F), the electrodes 14 may be spaced apart by, for example, portions of the lead 18 (FIG. 15B). The lead 18 may be placed percutaneously into the tissue using an introducer needle 26 (FIGS. 16A-C). In an example, the lead 18 may be positioned all or partially inside the introducer needle 26 (FIGS. 16A and 16B) and the lead one or more electrodes 14, lead 18, and/or anchor 22 may be placed remote to (e.g., one to three centimeters from) a nerve and the introducer needle 26 may be removed (FIG. 16C). After placement of the lead 18 and removal of the introducer needle 26, the lead 18 may be connected to an external stimulator 34, such as an external pulse generator (EPG), (FIG. 16C), with a surface electrode as a return electrode, and an appropriate bandage placed over the site where the lead 18 exits the skin. Specifically, the lead 18 may have an end 30 that operatively attaches with the external stimulator 34. In another embodiment, the lead 18 may instead be placed remote to a nerve and connected to an internal stimulator 38, such as an internal pulse generator (IPG) (FIGS. 17A-B).

Figure 18:
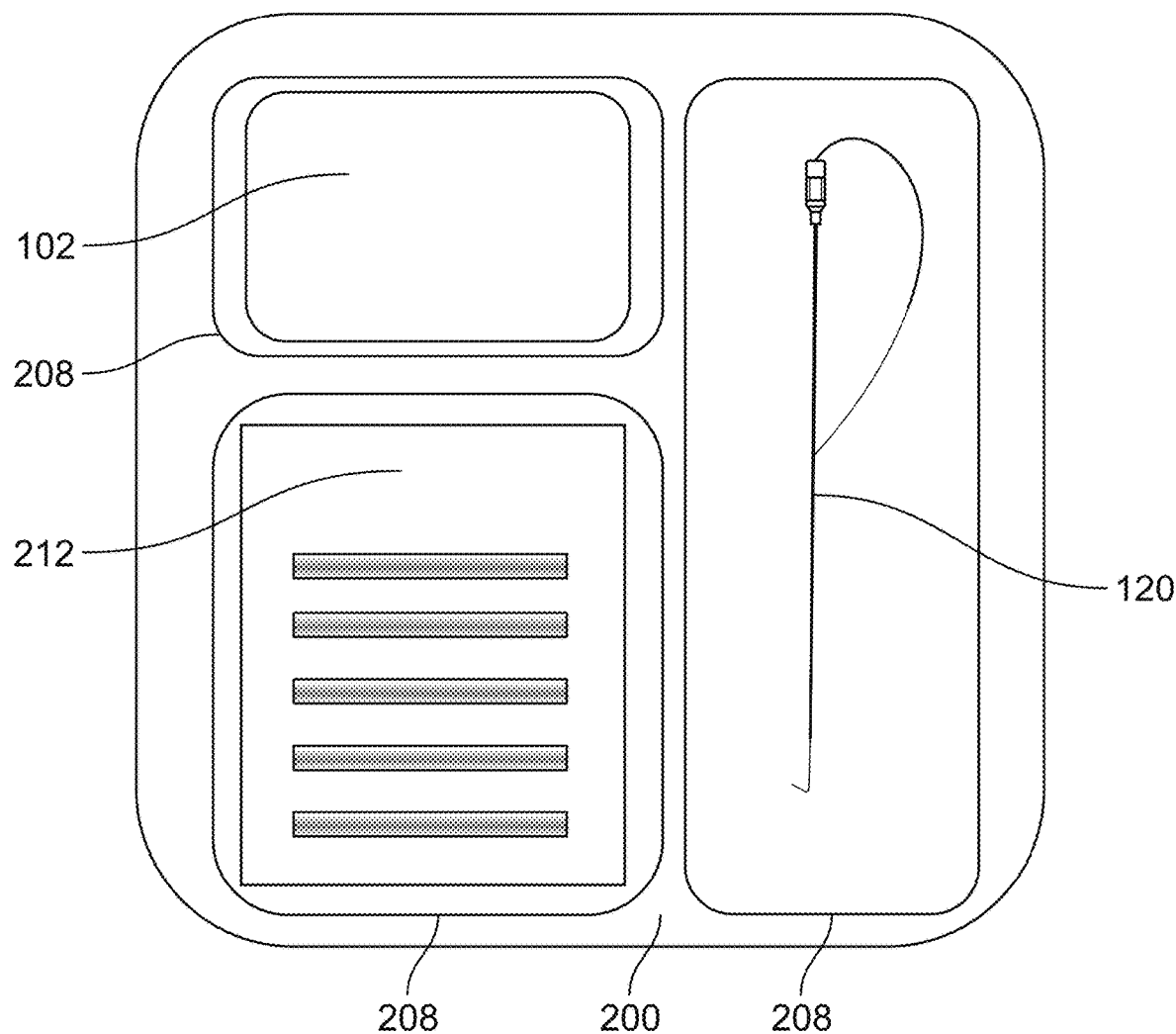
FIG. 18 is a plan view of a package containing a peripheral nerve stimulation system and instructions for use.

The present system may include a kit 200 as is shown in FIG. 18. The kit 200 may include at least one or a plurality of trays 208 in which the components or portions of the components described above can be included. The kit 200 may come in a sterile container such that a user merely need to open the kit 200 within a sterile field and the components remain sterile as long as they remain in the sterile field. In one embodiment, the kit 200 may comprise three trays 208. Although, any number of trays 208 may be utilized. One of the trays 208 may include the lead and electrode pre-installed in an introducer needle, which may comprise the pre-installed lead, electrode, introducer needle combination 120. The kit 200 may also include an electrical stimulator 102. The electrical stimulator 102 may be positioned in the tray 208. Still further, the kit 200 may include a set of instructions 212 included in the tray 208. While the kit 200 is shown and described in this format, any appropriate configuration of a kit may be utilized, and any of the components of the system described within this disclosure may be included within the kit 200.

Figure 19A:
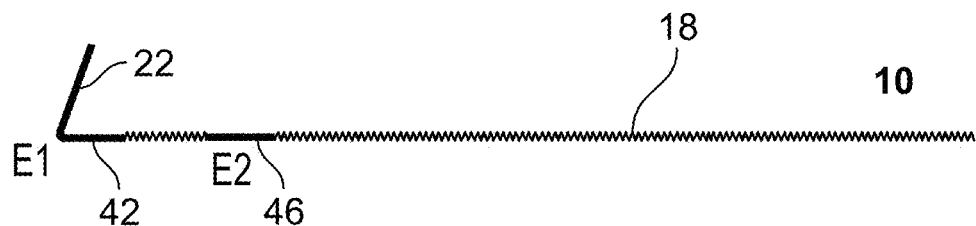
FIGS. 19A-D are representative leads that can form a part of a peripheral nerve stimulation system with stimulating and recording electrodes.
Figure 19B:
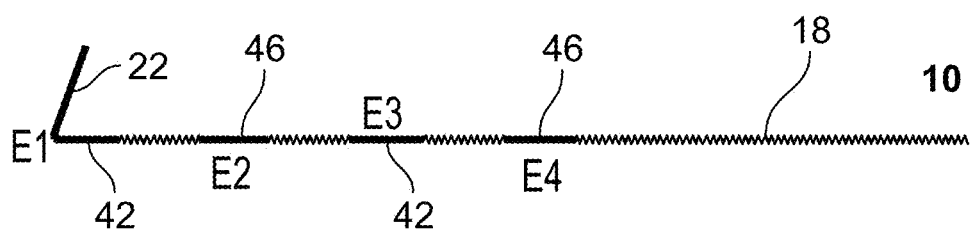
Figure 19C:
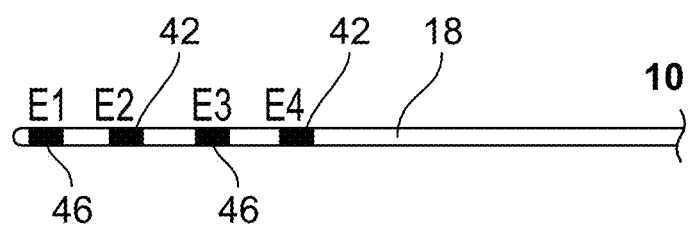
Figure 19D:
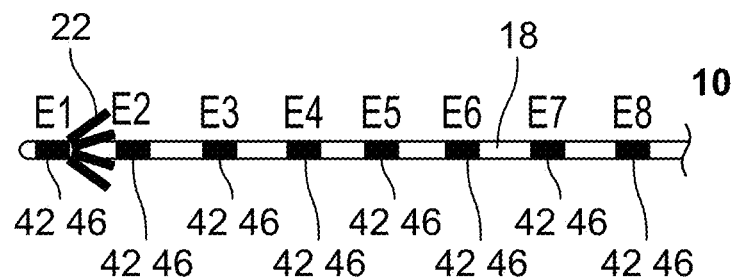
Figure 19E:
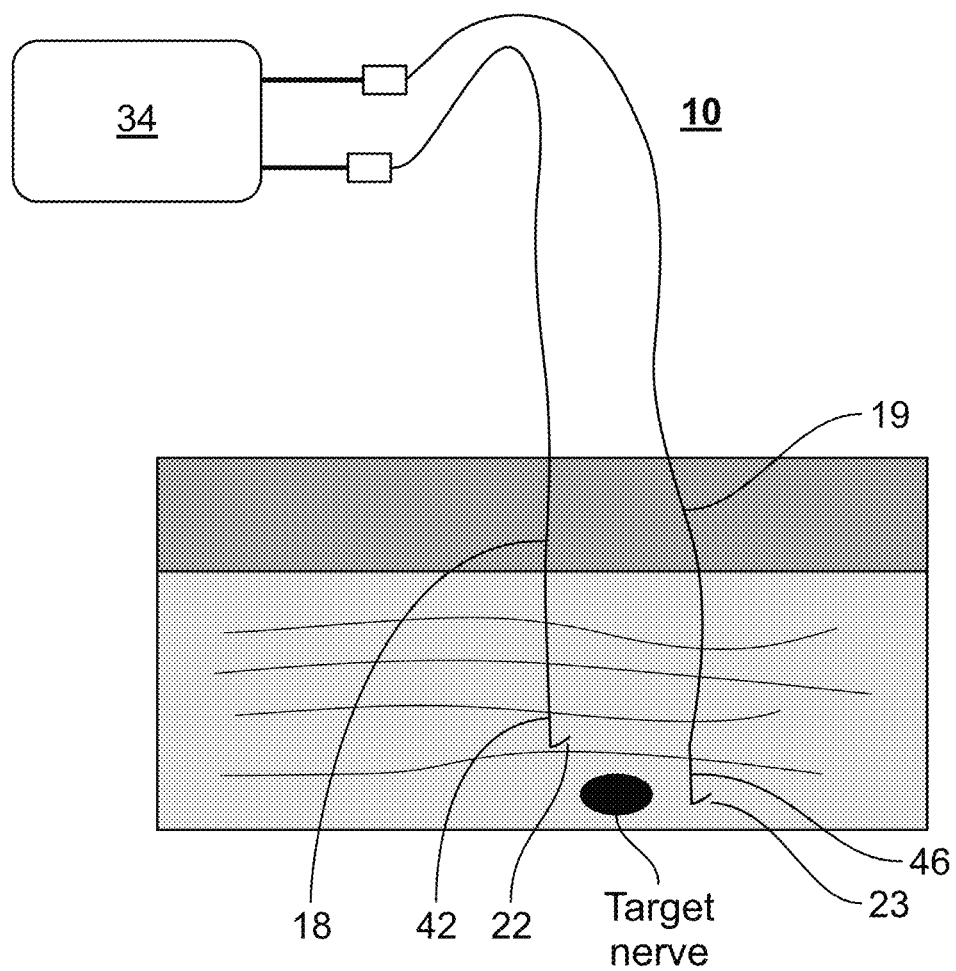
FIG. 19E is a view showing percutaneous leads with stimulating and recording electrodes that can form a part of a peripheral nerve stimulation system, with the leads placed remote to a nerve after the removal of the introducer needle. After placement of the lead and removal of the introducer, the leads may be connected to an external stimulator with a surface electrode as a return electrode, and an appropriate bandage placed over the site where the lead exits the skin.
Figure 19F:
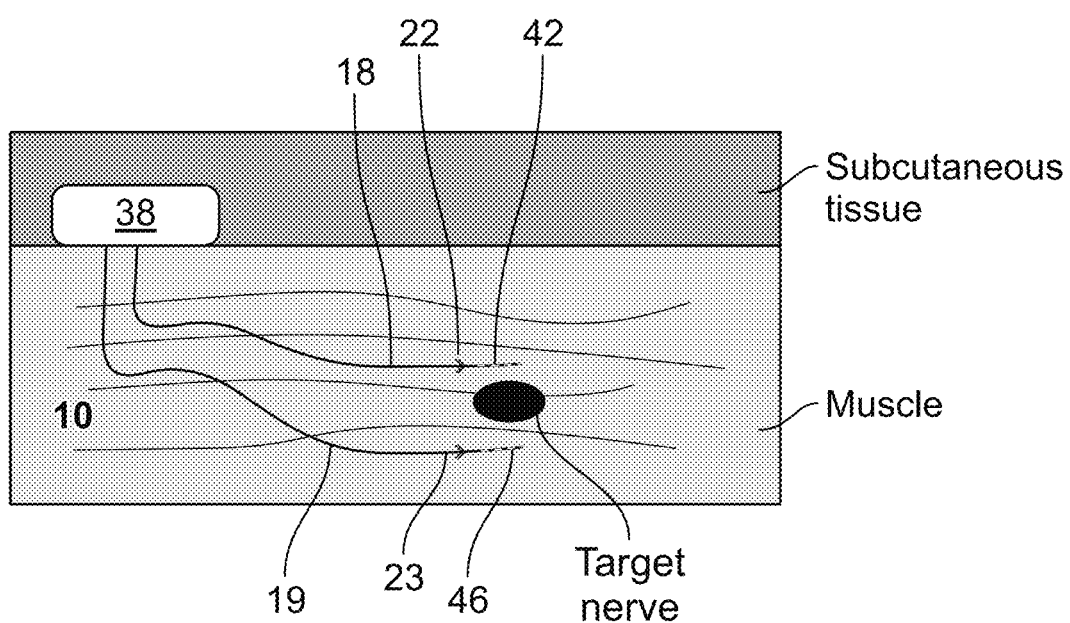
FIG. 19F shows is a view showing percutaneous leads with stimulating and recording electrodes that can form a part of a peripheral nerve stimulation system, with the leads placed remote to a nerve and connected to an internal stimulator.

In an embodiment, the one or more electrodes 14 may be stimulating electrodes 42 and/or recording electrodes 46 (FIGS. 19A-D). The nerve stimulation system 10 may include one or more stimulating electrodes 42 and one or more recording electrodes 46. The nerve stimulation system 10 may include any number of stimulating electrodes 42 and recording electrodes 46, including one, two, three, four, five, six, seven, eight, nine, ten, eleven (E1-E8), or more stimulating electrodes 42 and/or recording electrodes 46. The nerve stimulation system 10 may include the same number of stimulating electrodes 42 and recording electrodes 46, or the number of stimulating electrodes 42 and recording electrodes 46 may be different. The stimulating electrodes 42 and recording electrodes 46 may alternate on the same lead 18 (FIGS. 19B, C) or the stimulating electrodes 42 and recording electrodes 46 may be located on separate leads 18, 19 having separate anchors 22, 23 respectively (FIGS. 19E-F). In an example, the lead(s) 18, 19 may be positioned by an introducer needle(s) and placed remote to a nerve after the removal of the introducer needle(s). After placement of the lead(s) 18, 19 and removal of the introducer needle(s), the lead(s) 18, 19 may be connected to an external stimulator such as an external pulse generator (EPG), with a surface electrode as a return electrode, and an appropriate bandage placed over the site where the lead(s) 18, 19 exit the skin (FIG. 19E). In another embodiment, the lead(s) 18, 19 may instead be placed remote to a nerve and connected to an internal stimulator 38, such as an internal pulse generator (IPG) (FIG. 19F).

Previous systems and methods use electrodes placed in close proximity, near (e.g., <1 mm, or <2 mm) or in direct contact with the target nerve fiber and were unable to selectively and preferentially activate large diameter myelinated afferent fibers in the periphery or the spinal dorsal column that specifically innervate the region of pain to activate a gating mechanism in the spinal dorsal horn that attenuates pain. Without the use of the present system, the placement of conventional stimulation leads in contact with or in close proximity to (e.g., <1 mm, or <2 mm) target neural structures limits the ability of stimulation to selectively activate large diameter sensory fibers (e.g., a majority or sufficient number of large diameter sensory fibers) due to the neurophysiological relationships between activation threshold, fiber diameter, and distance from the stimulation source, resulting in activation (e.g. undesired activation) of non-target small diameter fibers that are nociceptive and cause discomfort or pain.

The present system produces robust neural signals by maximizing the preferential and selective activation of large diameter fibers in the target nerve (e.g., selectively activating a large proportion, sufficient number, and/or majority of the target large diameter fibers in a nerve) that innervate the region of pain to balance and/or override the uncomfortable and painful sensations that are perceived, sensed, or felt as part of a chronic pain condition. The present system focuses on producing changes that cause and perpetuate sustained pain relief following the cessation of stimulation (e.g., after stimulation is turned off and/or the removal of the stimulating electrodes) in addition to providing relief during stimulation while avoiding unwanted effects (e.g., pain) and unwanted blocking of beneficial nerve function by providing augmented neural input and/or drive and/or comfortable sensations to and from the periphery that signal to and cause changes in the central nervous system where noxious and/or painful and/or uncomfortable stimuli are processed. The present system also facilitates the desirable maintenance and sustainment of long term reductions in chronic or background pain while avoiding unwanted reduction and attenuation of beneficial neurological functions (including beneficial nociceptive pain that may appropriately warn of real or potential tissue damage or other beneficial sensory (afferent) and/or motor (efferent) nerve functions) by causing and mediating neural plasticity, including preferential and selective formation or strengthening of non-painful signaling pathways and/or representations in the central nervous system and/or the selective removal or weakening of painful signaling pathways and/or representations in the central nervous system. In a non-limiting example, the strengthening or forming of new synapses, removing or weakening of existing synapses, or modifying the expression or release of excitatory and inhibitory neurotransmitters and/or receptors in the primary somatosensory cortex is caused by the present system such that the representation, perception, or processing of non-painful neural activity increases and/or the representation, perception, or processing of painful neural activity decreases, producing pain relief that is sustained even after removal of the stimulating electrode and/or cessation of stimulation. In this way, the present system produces a sustained reduction or elimination of pain that lasts beyond the withdrawal of the stimulating electrodes or after stimulation is turned off, and/or enables intermittent stimulation of bursts (when stimulation is on) and gaps (when stimulation is off), such that the gaps between bursts can be lengthened while maintaining and/or increasing the beneficial effects (e.g., of pain relief) produced by the system enabling long term reduction of chronic and unwanted background pain (e.g., elevated pain that exists continuously as a baseline state that may be the result of an injury, disease state, or other central sensitization process).

The systems and methods described herein may be used to deliver a period or periods (e.g., for days, weeks, months, and/or years) of continuous, periodic, intermittent, or session-based (e.g., up to 1, 2, 5, 10, 15, 20, 30, 45, or 60 minutes or 1, 2, 3, 4, 5, 6, 9, 10, 12, 15, 18, 20, or 24 hours per day, week, month, and/or year or days per week, month, or year, and/or weeks per month or year, and/or months per year) stimulation through the one or more stimulating leads and/or electrodes to one or more target nerves. As a non-limiting example, the present system provides up to 30 days, 60 days, and/or 90 days of stimulation through at least one stimulating electrode targeting at least one nerve and produces prolonged pain relief (e.g., for at least 6, 9, 12, 18, 24 or 36 months or up to 1, 2, 3, 4, 5, or 10 or more years from the onset of stimulation) without a permanently implanted system. In another non-limiting example, the system may provide stimulation for 60 days and produce prolonged pain relief lasting 12 months following the removal of the lead(s). In another non-limiting example, the system may provide stimulation for 60 days and produce remission of chronic pain (e.g., pain ≤3 or <4 on a 0-10 rating scale for at least 6 months) in one or more regions of pain. The present system may also provide the same or similar effects with shorter duration(s) of stimulation (e.g. with durations as short as 1-30 days). Whereas previous systems were designed to be implanted only after patients complete a stimulation trial over several (e.g., 4-7) days, in an embodiment, the present system delivers stimulation without patients first needing to complete a temporary stimulation trial. The present devices, systems, methods, and instructions for use of devices, systems, and methods do not require a multi-day trial phase or implantation of a permanent system (i.e., an implantable system), yet may achieve long-term, sustained pain relief for at least 12 months (or up to 1, 2, 3, 4, 5, or 10 or more years) following the start of the stimulation period. Further still, in another non-limiting example, a dosing regimen may be utilized. A non-limiting example, may comprise applying stimulation (any example of stimulation disclosed herein may be utilized) periodically within a 60 day window. The period of stimulation may comprise any appropriate period from microseconds to hours or even days. One non-limiting example may comprise applying stimulation every four hours for a 60 day period. Of course, it should be understood that any stimulation on period may be utilized, e.g., every minute, 15 minutes, 30 minutes, 45 minutes, hour, 2-12 hours, 12-20 hours, 2-20 hours, every other day, every 2-5 days, every week, etc. Further in some non-limiting examples, a re-dosing strategy may utilized. A re-dosing strategy may involve applying electrical stimulation for a defined period (e.g., 60-days) of treatment. Then reapply the stimulation a period after the first stimulation, e.g., one or more years there after. This can be done over and over again and can be utilized with an implantable system. In such situations, the stimulation applied may be the same or may be different depending on the dosing scheme utilized.

The systems and methods produce sustained analgesic effects following the PNS treatment by engaging spinal and supraspinal mechanisms through the delivery of stimulation from the one or more stimulating electrodes targeting one or more peripheral nerves. As a non-limiting example, the electrode(s) are placed remote from the one or more target nerves (e.g., preferably 1-50 mm, and more preferably 5-30 mm distant from the target nerves). As a non-limiting example, the present systems and methods use electrodes implanted remote from the target nerve (e.g., >1 mm, >2 mm, not in direct contact with the nerve) to enable selective and comprehensive activation of a sufficient number of target large diameter fibers in the target nerve(s) while avoiding activation of non-target small diameter fibers. It is thus contemplated that the stimulation will avoid producing, augmenting, enhancing, or increasing pain or discomfort. Preferential activation of a sufficient number of large diameter fibers by the present system and methods therefore generates neural signals that activate, increase, engage, stimulate, or initiate spinal segmental and supraspinal mechanisms of pain relief. The system enables long-term relief of pain following a period or periods of PNS treatment (e.g., up to or less than 7 days, 14 days, 30-60 days, up to 60 days, 90 days, 6 months, 9 months, 12 months, 1 or more years, etc.). In a non-limiting example of one embodiment, the period of treatment is up to 60 days and significantly exceeds the 4-7-day average length of a percutaneous stimulation trial with a conventional neurostimulation system.

The present system produces signals in peripheral nerves through the electrical stimulation of target fibers (e.g., large diameter sensory fibers, A-alpha and/or A-beta fibers, and/or Type Ia, Ib, and/or II fibers) in peripheral nerves that act on or modulate more proximal structures (e.g., DRG, spinal cord, and/or brain) but does not directly electrically stimulate the central nervous system. Stimulation of one or more target peripheral nerves generates action potentials that can travel orthodromically and/or antidromically (e.g., proximally from the location of stimulation on the peripheral nerve towards the central nervous system and/or distally from the location of stimulation on the peripheral nerve towards the distal termination of the peripheral nerve). Thus, the present system is able to modulate pain processing in the central nervous system (e.g., the spinal cord and/or the brain), peripheral nervous system, and/or DRG, etc. while it also achieves the goal of being minimally invasive and avoids the need to be in, on, or near or directly stimulate the DRG, the spinal cord, and/or the brain.

The present system reverses spatial and functional remapping of the cortex and other regions of the pain matrix in the brain by reducing the flow of painful sensations from peripheral nerves (e.g., by restoring balance, proportion, or ratio between painful and non-painful sensations and/or shifting the balance, proportion, or ratio of sensory input or incoming sensations to be more of the non-painful sensation(s) and less of the painful sensations(s)) and/or by elevating non-painful sensation from the region of chronic pain to cause expansion of non-painful cortical representations and/or corresponding reduction and/or contraction of painful representations (FIG. 8-11). By modulating activity in the peripheral nerves that innervate the region of pain through stimulation of those target nerves and preferential activation of target fibers (e.g., large diameter sensory fibers, A-alpha and/or A-beta fibers, and/or Type Ia, Ib, and/or II fibers), the present system produces non-painful, physiologic sensory information that flows or conducts from the periphery to the brain to reverse the hypersensitization of the brain and reduce the size and/or magnitude and/or intensity of chronic or background pain sensations.

It is contemplated that the devices, systems, methods, and instructions for use of devices, systems, and methods of the present teachings provide relief of chronic pain while the stimulation is being actively delivered, including relief of neuropathic pain (i.e., pain due to injury, damage, lesion, or disease of the somatosensory nervous system) and/or non-neuropathic or nociceptive pain (e.g., pain not due to direct injury, damage, lesion, or disease of the somatosensory nervous system, such as pain due to scar tissue, ischemia, bone malformation or heterotopic ossification, inflammation, musculoskeletal injury, burn, mechanical pain, etc.). It also contemplated that the devices, systems, methods, and instructions for use of devices, systems, and methods of the present teachings provide relief of chronic pain following the withdrawal of the stimulating leads at the end of a period or periods (e.g., 1, 2, 7, 14, 28, 30, 60, 90 days, 1, 2, 3, 6, 9, 12 months, more than 12 months, etc.) of electrical stimulation. This carryover effect can prove to be of a significant benefit in relieving the pain of the patient for an extended period of time that may comprise months (1-12 months) or even years (1, 2, or more years).

Figure 12A:
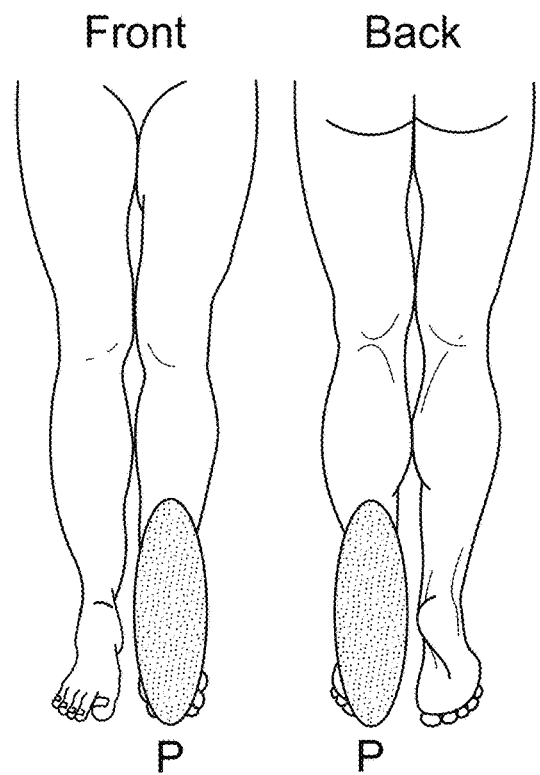
FIGS. 12A and 12B are, respectively speaking, front and rear views of an example areas of pain (P) and stimulation-evoked comfortable sensations (CS) that cover a region that includes within it the areas of pain (P) on a diagram of the body.
Figure 12B:
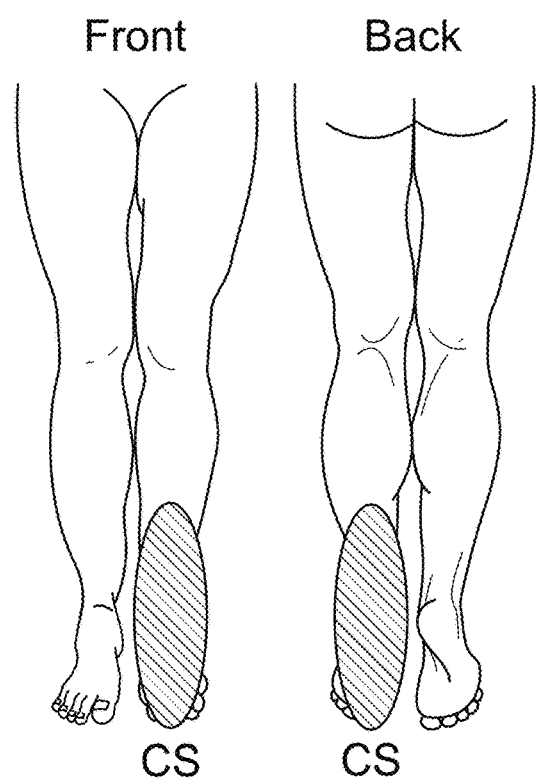
Figure 13A:
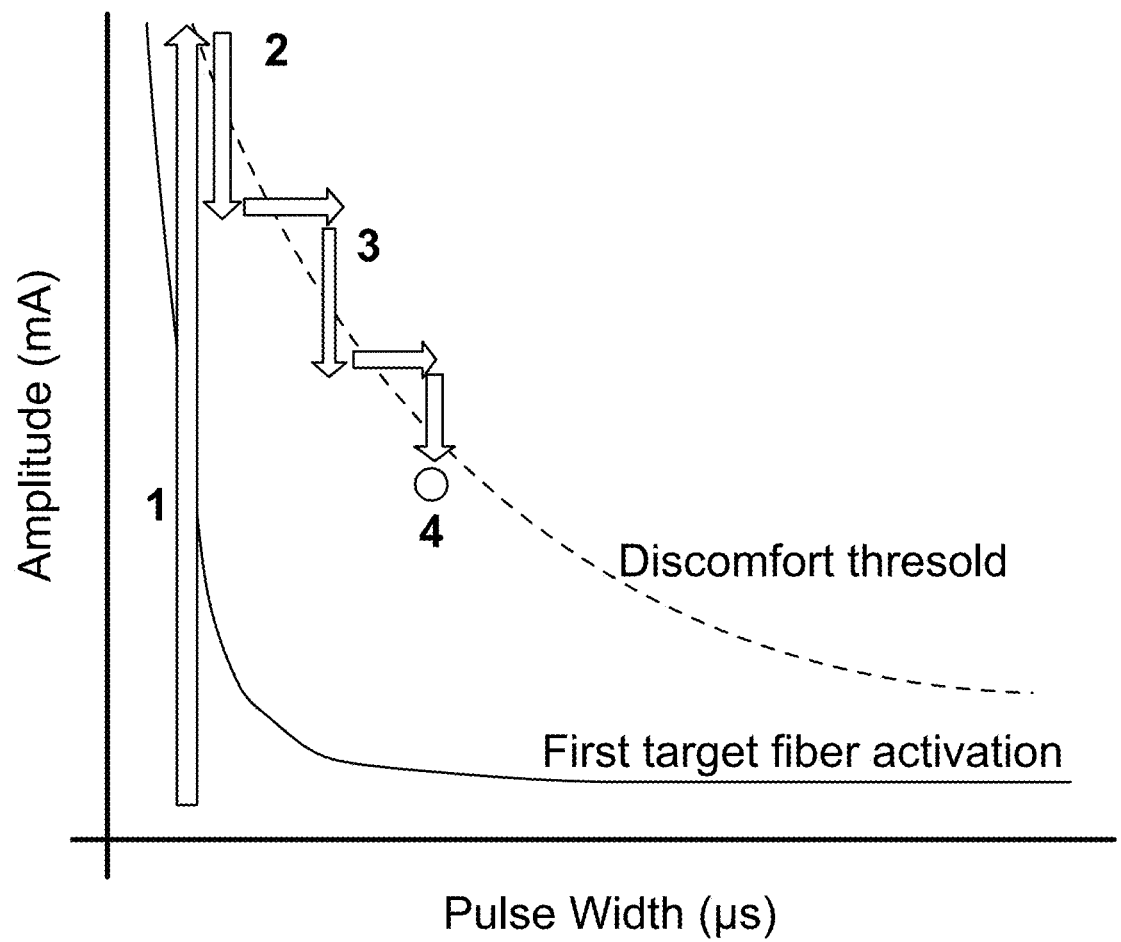
FIGS. 13A-E show schematic views of non-limiting examples of the programming optimization strategy, where the optimal stimulation parameters may be selected using an iterative process and may lie in a region or on a line between the first target fiber activation and the discomfort threshold. 1) The amplitude is increased while maintaining a short pulse duration until the patient reports the maximum comfortable evoked sensation (i.e., any further increases would create discomfort). 2) The amplitude is decreased and the pulse width correspondingly increased such that the patient's sensations remain at the maximum comfortable level. 3) The process is repeated iteratively until 4) the amplitude is set at a lower level and the pulse width is wider such that the separation in thresholds is maximized between the first target fiber and the first non-target fiber (discomfort threshold).
Figure 13B:
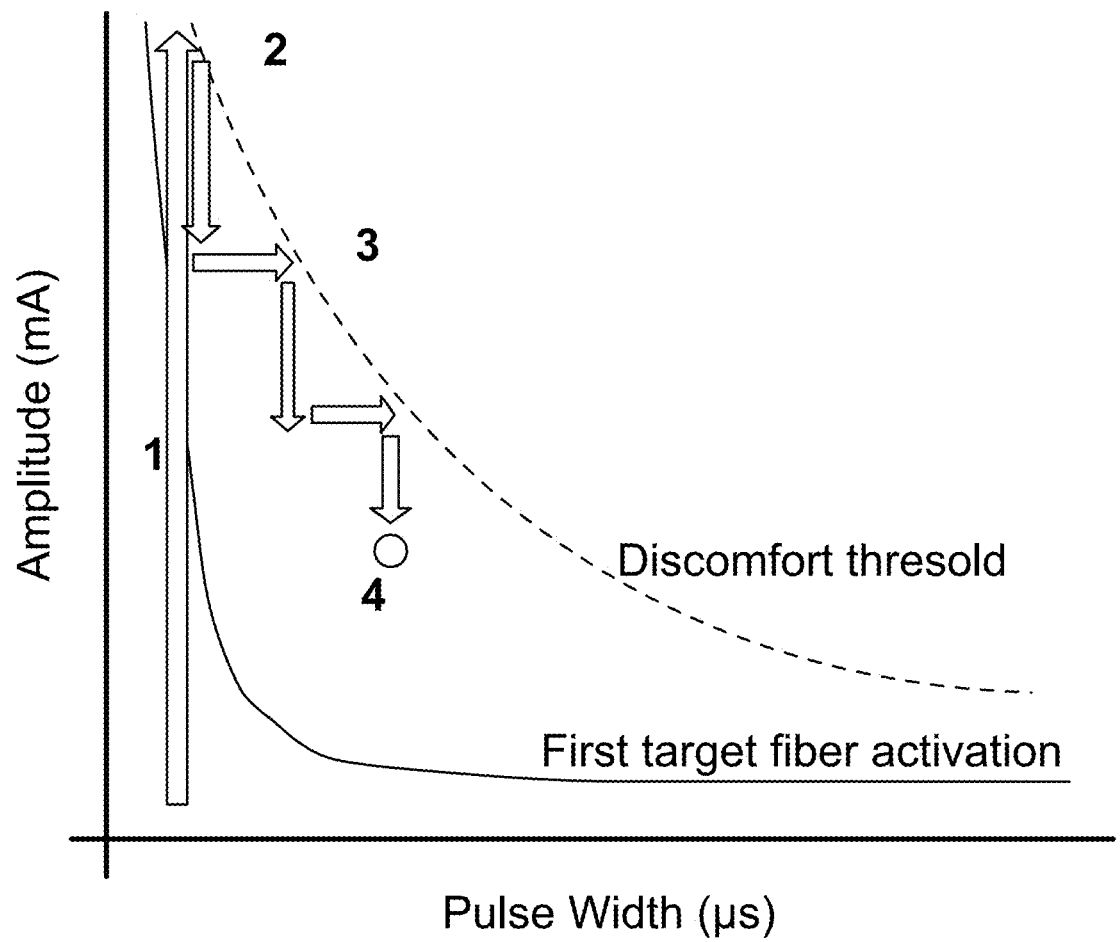
Figure 13C:
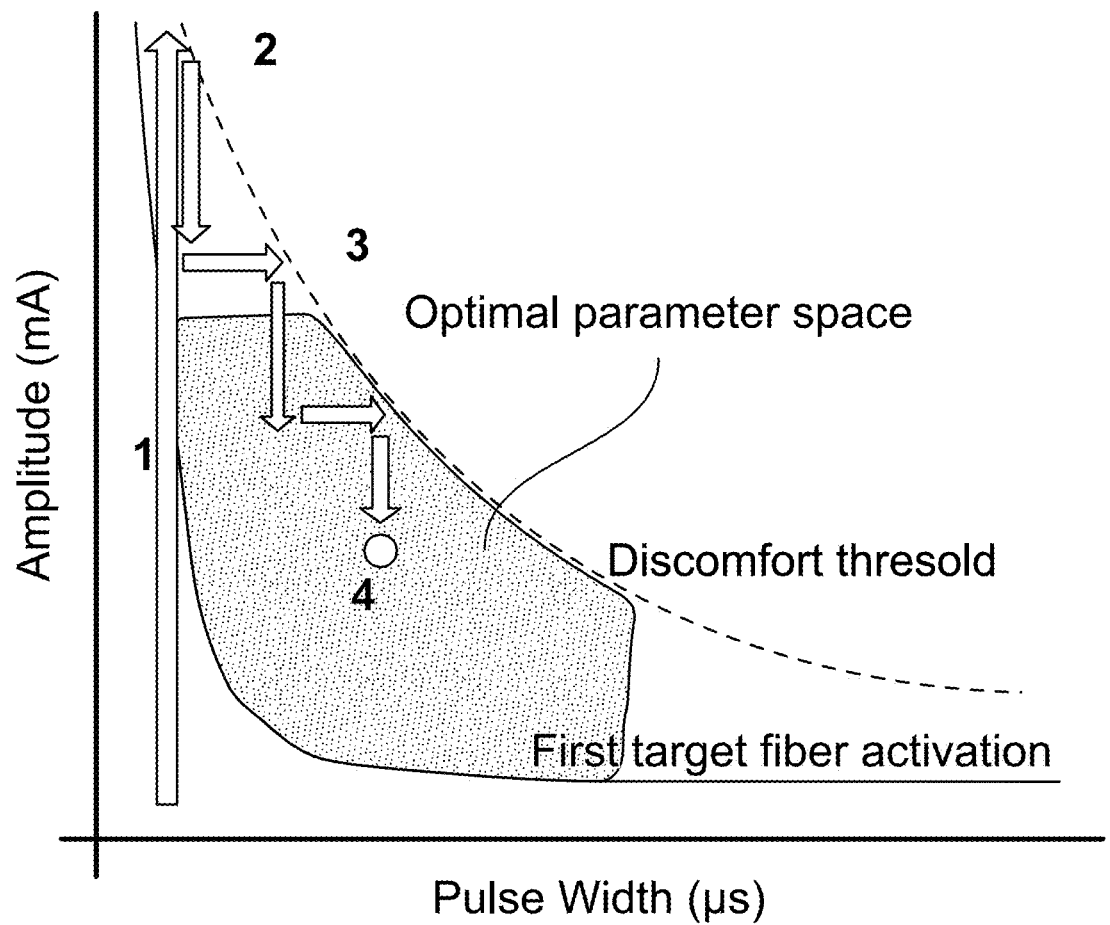
Figure 13D:
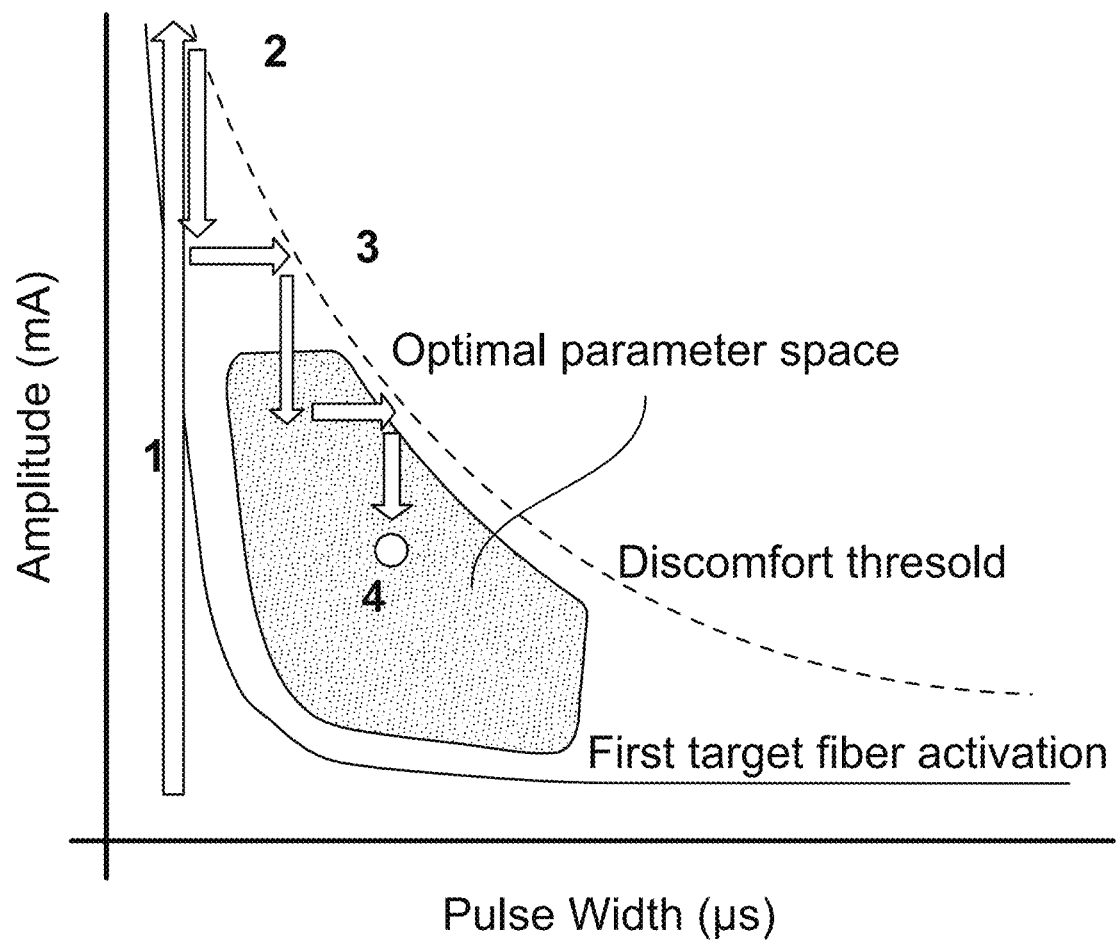
Figure 13E:
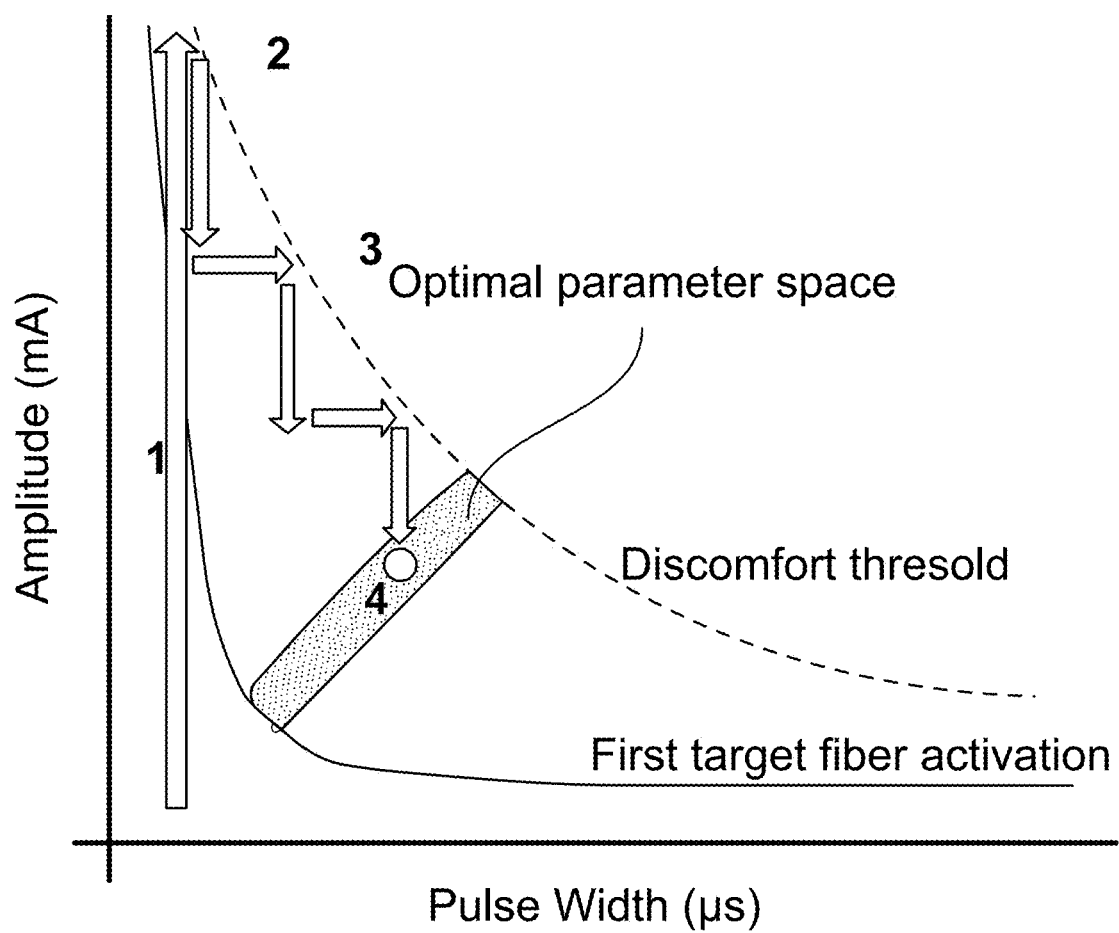

Preferentially and selectively targeting large diameter sensory fibers (e.g., A-alpha and/or A-beta fibers, and/or Type Ia, Ib, and/or II fibers) in the target peripheral nerve(s) may generate comfortable sensations or paresthesias, in the region of innervation of the nerve (FIG. 12), while avoiding generating uncomfortable sensations (e.g., pain or discomfort such as from the activation of small diameter sensory fibers, and/or C and/or A-delta fibers, and/or Type III and/or IV fibers). FIGS. 12A and 12B are, respectively speaking, front and rear views of an example areas of pain (P) and stimulation-evoked comfortable sensations (CS) that cover a region that includes within it the areas of pain (P) on a diagram of the body. The activation of the peripheral nerve(s) to generate comfortable sensations may offset painful signals produced in or emanating from the region of pain that is also innervated by the target nerve.

As used herein, "comfortable sensations" generally means that pain levels, as experienced by the patient, are decreased. Thus, any standard metric for pain can be employed at selected intervals, during the treatment and/or over a period of treatments. The pain level trend over that period is indicative of comfortable sensations. Other non-quantitative feedback, again provided by a given patient, also may augment or provide a further definition of "comfortable sensations." Still other indicators include reports of tingling, paresthesia, and the like. In some cases, it may be possible to use medical instrumentation to detect and/or quantify responses within the patient's body that are suggestive of pain or a lack thereof. Of particular import is that application of the electrical stimulation will avoid creating a nerve block which causes a patient to lose feeling or motor function in the limb to which the stimulation is applied, because blocking sensory and/or motor fibers can make walking (e.g., when applied to the lower limb) or other such tasks difficult. As non-limiting examples, the system provides pain relief while avoiding producing block in large diameter sensory fibers (e.g., A$\alpha$ and/or A$\beta$ fibers, and/or Type Ia, Ib, and/or II fibers), and/or small diameter sensory fibers (e.g., A-delta fibers, Type III fibers), and/or small diameter pain fibers (e.g., C fibers, Type IV fibers), and/or motor fibers.

It is to be appreciated that the comfortable sensation could be described as vibrating, buzzing, prickling, pins and needles, thumping, heat/warmth, cold/cool, trickling, pulsing/pulsating, comfortable, tightness, pressure, contraction etc. Evoking comfortable sensations or paresthesia in the region of pain while avoiding evoking uncomfortable sensations confirms correct placement of the lead(s) and indicates stimulus intensity is sufficient to reduce pain.

Inserting the lead(s) percutaneously allows the lead(s) to be placed quickly and easily. The present system uses percutaneous placement of lead(s) using an introducer needle to place the lead(s) targeting one or more peripheral nerves without the use of incisions, surgical dissection, or open surgical techniques in less time and without requiring regional or general anesthesia, enabling subjects to provide verbal feedback and/or confirmation of the location of stimulation-evoked sensations such that the lead(s) may be optimally placed to generate comfortable sensations in the region of pain.

Chronic pain has been suggested to involve maladaptive supraspinal structural and functional plasticity, including shifts in cortical sensory representations that correlate with the severity of pain and are caused by an imbalance of sensory information (e.g., an increase in pain information and/or a decrease in non-pain information compared to a healthy, normal baseline). The present devices, systems, and methods, and instructions for use thereof selectively activate a sufficient number of large diameter fibers in target nerve(s) with stimulation delivered through stimulating leads placed remote from the target nerve(s). Stimulating electrode(s) may be placed in electrical proximity to target nerve(s). In an embodiment, stimulating electrode(s) may be placed remote from target peripheral nerve(s) (e.g., 1-50 mm, or more preferably 5-30 mm distant from the target nerves). Activation of a sufficient number or majority of large diameter fibers innervating the region of pain (e.g., such as >50%, >70%, >80%, or preferably up to 100% of large diameter fibers) enhances the attenuation of pain, reversing aberrant plasticity in the cortex by shifting the balance of sensory information towards a greater amount of non-painful information and/or less painful information (e.g., the ratio, balance, or relative number of action potentials and/or the number of activated fibers and/or the intensity of the activation as measured by the average or instantaneous frequency of action potentials, or temporal shifts in the pattern(s) of action potentials). In a non-limiting example, the present system and methods provide sensory feedback to the CNS via activation of peripheral nerve fibers to promote beneficial functional plasticity to correct imbalances in somatosensory processing and relieve chronic pain, background pain, and/or centrally-maintained pain or central sensitization. In another non-limiting example, activation of a sufficient number of target fibers (e.g., large diameter sensory fibers, also known as A-alpha and/or A-beta fibers, and/or Type Ia, Ib, and/or II fibers) in peripheral nerves drives the reversal of aberrant plasticity in the cortex directly by promoting spatial expansion, augmentation, relocation, shifts, and/or changes in or of non-painful somatosensory representations in the cortex (FIGS. 8 & 10). The increase or change in physiologic, non-painful sensory information generated by the activation of a sufficient number of target fibers promotes the restoration of normal (e.g., healthy) processing of sensory information in the cortex.

The present devices, systems, methods, and instructions for use of devices, systems, and methods of the present disclosure deliver stimulation to a peripheral nerve to preferentially and selectively activate target fibers that are focal (e.g., localized, concentrated, not spread across wide regions of the body that are not regions of pain, etc.) in the cortical area that represents the region of pain and robust due to the preferential and selective activation of a significant number of target fibers that innervate the region of pain while avoiding activation of non-target fibers (e.g., small diameter sensory and/or pain fibers, C and/or A-delta fibers, Type III and/or IV fibers, etc.). The present devices, systems, methods, and instructions for use thereof stimulate a peripheral nerve to engage supraspinal mechanisms that correct the imbalances in physiological input (e.g., elevation or increase in painful sensory input that initially led to maladaptive cortical changes) while also promoting beneficial functional plasticity to produce sustained pain relief.

In the present system, it is advantageous for the activation of a large proportion of target fibers to use a pulse width identified empirically using an optimization strategy that maximizes the difference between the activation thresholds of target fibers and non-target fibers. Stimulating at an intensity that generates the maximum comfortable sensations in the patient's region of pain can be achieved at wider pulse widths (i.e., >10 µs, for example 15-200 µs) to selectively activate a larger number of target fibers without activating non-target fibers compared to the number of target fibers activated using conventional programming and optimization methods that use the minimum pulse width to achieve comfortable sensations and are unable to activate a sufficient number of target fibers to promote beneficial cortical plasticity for the sustained relief of chronic pain. In a non-limiting example, the target fibers may be large diameter sensory fibers, A-alpha and/or A-beta fibers, and/or Type Ia, Ib, and/or II fibers, and the non-target fibers may be small diameter sensory fibers, C and/or A-delta fibers, and/or Type III and/or IV fibers, and the present system stimulates the target nerve at an intensity, using a stimulation, and/or set of stimulation parameters that maximizes the difference between the activation thresholds of large diameter sensory fibers and small diameter sensory fibers, the large diameter sensory fibers typically having lower activation thresholds that small diameter sensory fibers and therefore being activate first (e.g., at a lower stimulation intensity) to enable selective activation of the large diameter sensory fibers while avoiding activation of the small diameter sensory fibers. The programming optimization strategy comprises (see FIG. 13):

1) Increase the amplitude from a zero or low amplitude to a high or higher amplitude (e.g., from 0 mA or 1 mA to 30 mA) while maintaining a short pulse duration (e.g., s; 1, 2, 5, 10, 15, 20, 30, or 50 µs) until the patient reports the maximum comfortable evoked sensations (e.g., any further increases in amplitude would create discomfort) or discomfort or pain.
2) The amplitude is then decreased, and the pulse width correspondingly increased, in a stepwise fashion until the amplitude is set at a lower level (e.g., 10%, 25%, 30%, 50%, 60%, 67%, 75%, 80%, or 90% of the maximum amplitude previously identified in step 1) and the pulse width is wider or larger (i.e., has been increased from 1, 2, 5, 10, 15, 20, 30, or 50 µs) such that the patient's stimulation-evoked sensations remain and/or can be produced at the maximum comfortable level.
3) The patient may optionally be provided with a range of amplitudes with pulse duration fixed at the identified optimal value (e.g., 10 µs, 20 µs, 50 µs, 100 µs, 200 µs, etc.), within which the amplitude can be increased or decreased to adjust stimulation intensity. The patient may also optionally be provided with a range of pulse durations (e.g., 0.1-10 µs, 0.1-20 µs, 1-50 µs, 1-100 µs, 10-1000 µs, etc.), with amplitude fixed at the identified value (e.g., 1 mA, 2 mA, 5 mA, 10 mA, 15 mA, 20 mA, 30 mA, etc.) within which the amplitude can be increased or decreased to adjust stimulation intensity. The patient may also optionally be provided with a range of pulse durations and a range of amplitudes (e.g., 0.01-10 mA, 0.1-2 mA, 1-5 mA, 3-10 mA, 2-15 mA, 1-20 mA, 0.1-30 mA, 10-100 mA, etc.) that may be independently or codependently (e.g., the amplitude and pulse width are codependent and the choice of amplitude may constrain the available choices of pulse width (or vice versa) to limit the overall charge delivery to predetermined values or limits) increased or decreased to adjust stimulation intensity.

FIGS. 13A-E show schematic views of non-limiting examples of the programming optimization strategy, where the optimal stimulation parameters may be selected using an iterative process and may lie in a region or on a line between the first target fiber activation and the discomfort threshold. 1) The amplitude is increased while maintaining a short pulse duration until the patient reports the maximum comfortable evoked sensation (i.e., any further increases would create discomfort). 2) The amplitude is decreased and the pulse width correspondingly increased such that the patient's sensations remain at the maximum comfortable level. 3) The process is repeated iteratively until 4) the amplitude is set at a lower level and the pulse width is wider such that the separation in thresholds is maximized between the first target fiber and the first non-target fiber (discomfort threshold).

If specific response(s) (e.g., desired response(s) and/or undesired response(s)) are obtained at a range of intensities that are too low or too high, then the electrode may be located in a non-optimal location (e.g., too close to or too far from the target nerve(s)). In such situations, therefore, the clinician may adjust the lead location to change the electrode(s) location(s) until the appropriate responses are achieved from the patient.

The appropriate electrode spacing from a target nerve may depend on various factors, and similar stimulation settings may evoke different responses from different peripheral nerve or from the same nerve but at different locations along the nerve. Differences between patients also evoke or cause different responses in different patients, even if the electrode is spaced at similar distances from the target nerves in each of the patients. Thus, electrode spacing from the nerve may be about 10 to about 20 millimeters for one target nerve at a given stimulation intensity while the spacing may be about 20 to about 40 millimeters for a second target nerve at the same stimulation intensity.

The system, device, method, or instructions for use thereof may also be used to prevent and/or relieve other effects that patients with chronic pain may experience. Non-limiting examples of such effects include depression, disability due to pain, pain interference with function or daily activities of living.

The present devices, systems, methods, and instructions for use thereof deliver stimulation to target peripheral nerve(s) to selectively activate target fibers that are focal (e.g., localized, concentrated, not spread across wide regions of the body that are not regions of pain, etc.) in the cortical area that represents the region of pain and robust due to the selective activation of a sufficient number of target fibers that innervate the region of pain while avoiding activation of non-target fibers (e.g., small diameter sensory and/or pain fibers, C and/or A-delta fibers, Type III and/or IV fibers, etc.). In order to selectively activate target fibers that are focal (e.g., whose innervation is localized to the region of pain), the present system may identify one or more peripheral nerves located proximal to (e.g., closer to the spinal cord), distal to (e.g., closer to the periphery), and/or in, overlapping with, on, or around the region where pain is manifested, through which neural impulses comprising the pain pass. In a non-limiting example of an embodiment, the present system identifies target peripheral nerve(s) and stimulating electrodes placed sufficiently proximal (i.e., but outside the spinal cord or the CNS) to the region of pain such that the large diameter peripheral nerve fibers innervating the region of pain have joined the peripheral nerve trunk and the peripheral nerve is not being targeted too far distally such that some or all of the peripheral nerve fibers innervating the region of pain or partially innervating the region of pain have branched off the peripheral nerve trunk and will not be activated by stimulation, overcoming the limitations of previous systems and methods that require placement of stimulating electrodes more distal or as far distally as possible to limit the size or number of regions in which stimulation evokes sensations while still covering the region of pain and/or place electrodes directly within the region of pain. Previous systems and methods that place electrodes in or on tissues (e.g., skin, muscle, tendon, ligament, bone) in the region of pain do not activate the target fibers that innervate the region of pain because those fibers are no longer included in the main body of the target nerve and are no longer within electrical proximity of the stimulating electrode(s), whereas the present system avoids the limitations of placing or requiring placement of electrodes in or on the region of pain by stimulating the target nerve proximally from the region of pain at a location where all potential target fibers (e.g., target fibers that innervate the region of pain) are within the target neural structure and/or within electrical proximity of the electrode(s), a sufficient number or proportion, large number or proportion, or majority of target fibers (e.g., large diameter sensory fibers, A-alpha and/or A-beta fibers, and/or Type Ia, Ib, and/or II fibers) innervating the region of pain may be selectively activated, enabling a robust non-painful, physiological signal to reach the spinal cord and brain to engage the mechanisms of long term pain relief described herein. As a non-limiting example, the fibers of the median nerve that innervate the forearm branch off the nerve near the elbow to innervate their distal structures (e.g., skin, bone, muscle, tendon, and other tissues in the forearm), and the present system uses electrodes placed above the elbow when a region of pain is in the forearm (e.g., proximal to the elbow, in the upper arm, in the shoulder, or at the brachial plexus proximal to the shoulder) to overcome the limitations of previous systems and methods that may have stimulated the median nerve below the elbow (e.g., distal to the elbow, in the forearm) and/or stimulated individual nerve endings in the forearm. The present system enables electrical stimulation of a named peripheral nerve (e.g., peripheral nerve stimulation) to provide pain relief while avoiding the limitations and/or disadvantages of peripheral nerve field stimulation or peripheral field stimulation. Placement of the lead(s) may be optimized to activate fibers that innervate the region of pain (as opposed to fibers that innervate other structures in addition to fibers that innervate the region of pain, which would be non-focal, or non-localized effects of stimulation).

Figure 14A:
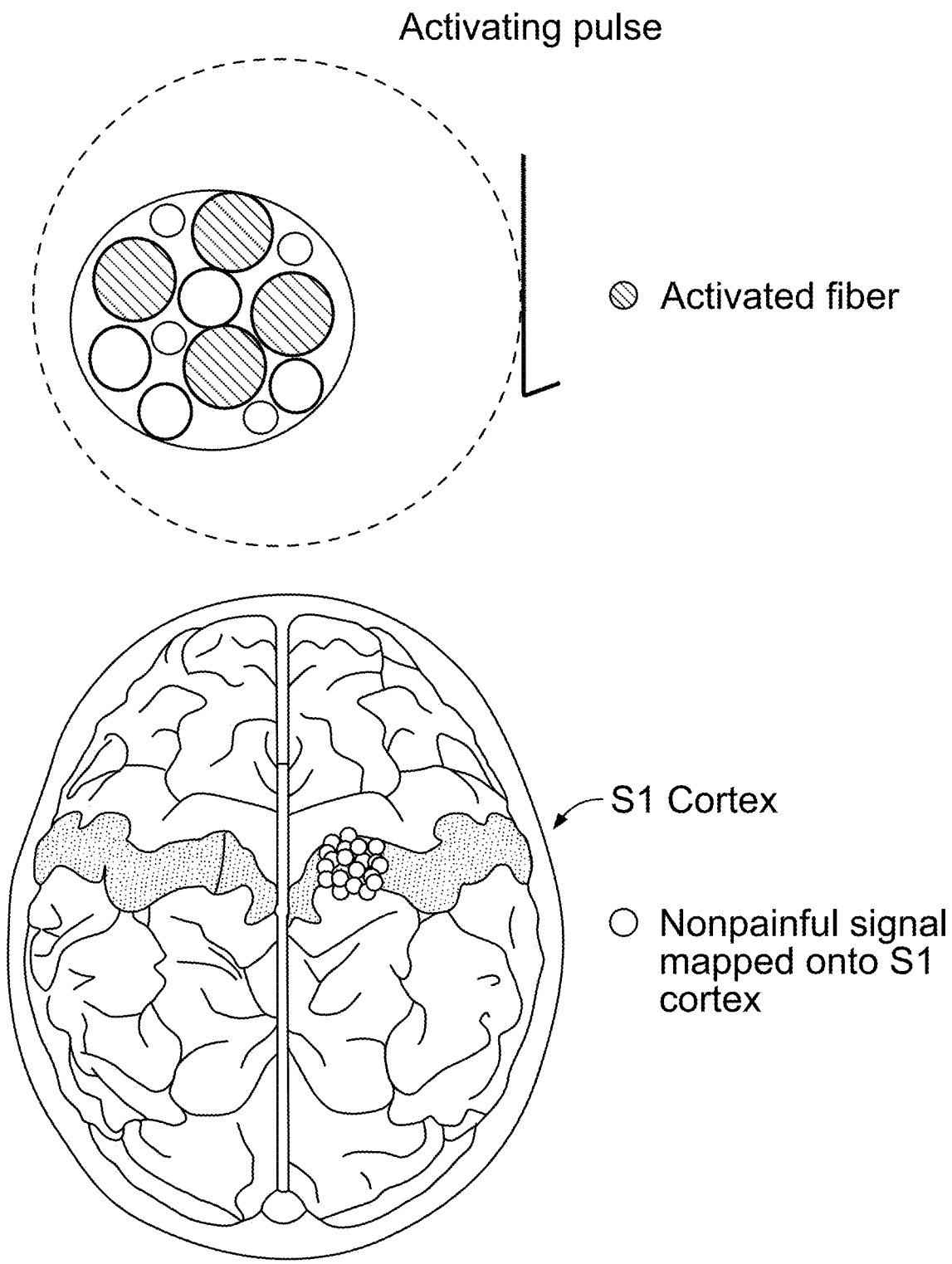
FIGS. 14A to 14C are schematic representations of the activation of target fibers and the corresponding activation of the somatosensory cortex by the present system disclosed herein (FIG. 14A) and previous systems and methods of stimulation in the dorsal columns (FIG. 14B) or peripheral nerves (FIG. 14C). The present system produces a more localized and more robust activation of the somatosensory cortex compared to previous systems and methods of stimulation for pain relief.
Figure 14B:
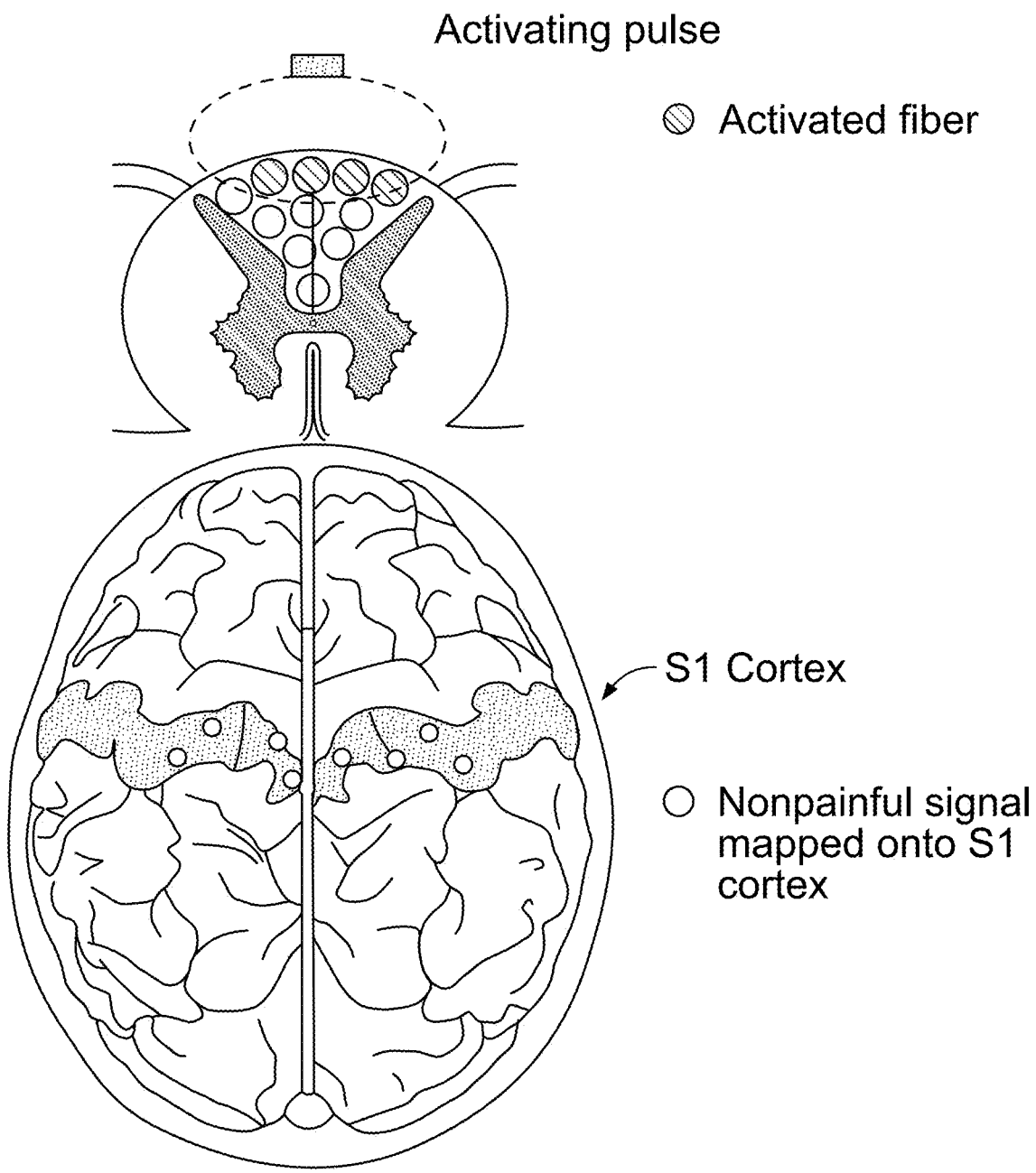
Figure 14C:
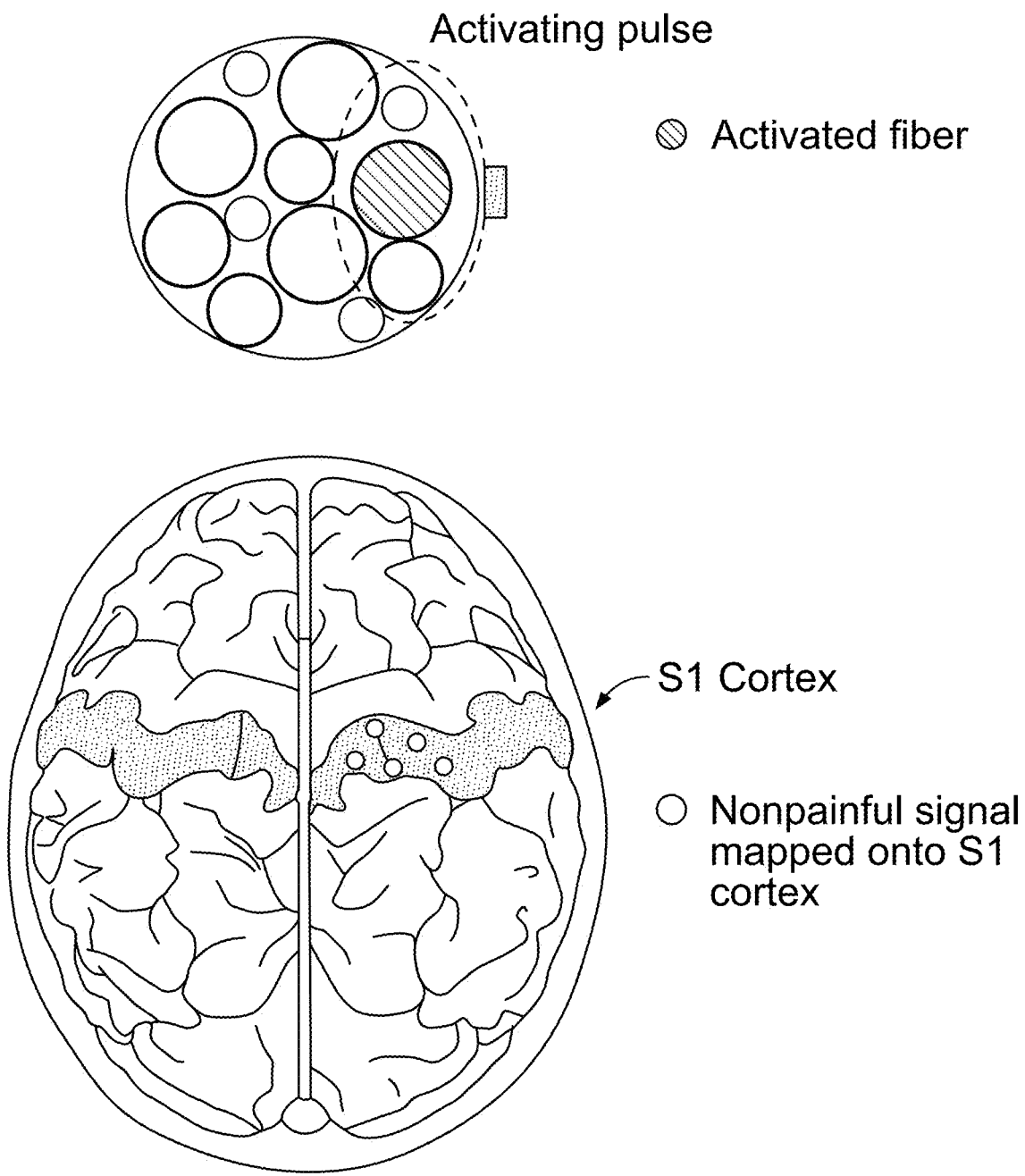

The present system overcomes limitations of other previous systems and methods that stimulate nerve fibers too far proximally (e.g., in the DRGs, dorsal column of the spinal cord) by identifying and stimulating target nerves sufficiently distal on the nerve that the comfortable sensations generated by stimulation are isolated to the region of pain and part of the region of pain as an indication that the neuronal activity evoked in large diameter fibers by stimulation is specific to the fibers innervating the region of pain. Whereas previous systems and methods stimulate nerve fibers (in or proximally near the CNS) where many off-target fibers may be activated (e.g., bystander fibers that innervate regions other than the region of pain and may provide beneficial function and are not intended to be activated, inactivated, or deactivated), the present system stimulates neural structures sufficiently far or distal from the spinal cord and distal to the branching off of subgroups of off-target fibers to produce non-painful, physiological signals caused by stimulation of target nerves that are focal, localized, concentrated, or specific to the region of pain (FIG. 14). FIGS. 14A to 14C are schematic representations of the activation of target fibers and the corresponding activation of the somatosensory cortex by the present system disclosed herein (FIG. 14A) and previous systems and methods of stimulation in the dorsal columns (FIG. 14B) or peripheral nerves (FIG. 14C). The present system produces a more localized and more robust activation of the somatosensory cortex compared to previous systems and methods of stimulation for pain relief.

Therefore, the present system is optimally designed to induce beneficial plasticity in the pain matrix of the brain (such as the somatosensory cortex) that enables long-term pain relief after the end of the short-term (e.g., up to 60 day) stimulation period by stimulating the target peripheral nerve(s) distal to the spinal cord and DRG to avoid overstimulation or oversaturation (e.g., avoiding activation of off-target fibers, such as large diameter sensory fibers innervating regions of the body that are not the region of pain or part of the region of pain such that the system desirably prevents the cortex from receiving non-painful sensory information from a broad area of the body much larger than the region of pain and/or multiple regions including but in addition to the region of pain) (FIG. 14). Previous systems and methods have specified, are limited by and/or require the placement of leads proximal to the branching of off-target peripheral nerve fibers (e.g., in the dorsal root ganglion or in the spinal cord), where the signals generated by activation of large diameter fibers may produce comfortable sensations in a wide area of the body and are not (or are insufficiently) spatially focused, concentrated, localized, or specific to the region of pain or part of the region of pain (FIG. 14). Stimulating large diameter fibers in the dorsal column of the spinal cord with previous systems and methods may not produce sustained pain relief. Widespread signals (e.g., non-focal, non-concentrated, non-localized, and/or non-specific to the region of pain) from the periphery are unable to or insufficiently reduce or contract the painful representations in the cortex and/or increase or expand the non-painful representations in the cortex, whereas the present system produces focused, localized, concentrated, or specific signals from the region of pain that are able to or sufficiently reduce, shrink, or contract the painful representations in the cortex, and/or increase, grow, or expand the non-painful representations in the cortex (FIGS. 8-11 & 14).

A given peripheral nerve that is identified may comprise a nerve trunk located in a nerve plexus, or a division and/or a cord of a nerve trunk, or a nerve branch, or a nerve plexus provided that it is upstream or cranial or proximal to where the nerve innervates the region affected by the pain. Table 1 below provides non-limiting examples of regions of pain that may be innervated by specific nerves.

The given peripheral nerve may be identified by medical professionals, doctor, surgeon or clinician using textbooks of human anatomy along with their knowledge of the site and the nature of the pain or injury, as well as by physical manipulation and/or imaging, e.g., by ultrasound, fluoroscopy, or X-ray examination, of the region where pain is manifested. A desired criterion of the selection may include identifying the location of tissue in a therapeutically effective distance (e.g., any combination of one tenth increments between 0.5 cm and 3.0 cm) from the nerve, which tissue may be accessed by placement of one or more stimulation electrodes, aided if necessary by ultrasonic or electro-location techniques. A therapeutically effective distance may be defined to mean the placement of a lead at a distance remote or removed from the nerve (e.g., 0.1-5.0 cm, 0.2-3.5 cm, 0.5-3.0 cm) so as to allow selective activation of target fibers while avoiding activation of non-target fibers. The nerve identified may comprise a target peripheral nerve. The tissue identified may comprise the "target tissue." See Table 1 for further details.

TABLE 1

Non-limiting examples of peripheral nerves and the regions the nerves innervate within which responses, such as comfortable sensations, end organ actions, such as muscle tension, muscle activation, and/or muscle contraction (which may be non-functional), can be evoked, generated, or caused to overlap partially or completely with pain in those regions.

| Example Nerve | Region of Innervation (Potential Region of Pain) |
|---|---|
| Sciatic nerve | Posterior lower limb |
| Iliohypogastric nerve | Lateral hip and lower abdomen |
| Ilioinguinal nerve | Lower abdomen and genitalia |
| Lateral femoral cutaneous nerve | Anterolateral thigh |
| Obturator nerve | Distal medial thigh |
| Femoral nerve | Anterior lower limb |
| Common peroneal nerve | Lateral lower leg and foot |
| Tibial nerve | Posterolateral lower leg, heel, and foot |
| Saphenous nerve | Medial lower leg |
| Sural nerve | Posterior lower leg and heel |
| Median nerve | Forearm and digits |
| Ulnar nerve | Palm and digits |
| Radial nerve | Hand and digits |
| Musculocutaneous nerve | Upper limb |
| Axillary nerve | Shoulder and upper limb |
| Intercostal nerve | Abdominal wall |
| Intercostobrachial nerve | Proximal medial upper limb |
| Brachial plexus | Upper extremities |
| Lumbar plexus | Lower extremities and lower abdomen |
| Sacral plexus | Lower extremities |
| Medial branch of dorsal ramus | Axial back |
| Intercostal nerve | Thorax |
| Trigeminal nerve | Face and neck |
| Occipital nerves | Head |
| Cranial nerves | Head and face |

In a non-limiting example, the electrodes of the electrical stimulation device are percutaneously inserted using the percutaneous lead(s). The system and method may place the one or more leads with their electrode(s) in the target tissue in electrical proximity to but spaced away from the target peripheral nerve. The system, device, or method may apply electrical stimulation through the one or more stimulation electrodes to electrically activate or recruit the target peripheral nerve that conveys the neural impulses comprising the pain to the spinal column and brain. The stimulation electrodes are placed remote from the target nerve (e.g., any combination of one tenth increments between 0.5 cm and 3.0 cm) at a location proximal to the region of pain (i.e., closer to the spinal cord or the origin of the nerve) such that the target fibers may be activated in the nerve trunk before they branch off to innervate distal structures in the region of pain. In a non-limiting example, the anterior upper leg (e.g., the front of the thigh) is innervated by fibers from the femoral nerve, and the present system may apply stimulation to the femoral nerve within 1-2 cm below the inguinal crease (e.g., the top of the leg defined by the inguinal ligament and/or the crease running from the hip to the groin at the boundary between the lower abdomen and the top of the front of the thigh) in order to activate the target fibers that innervate the front of the thigh before those fibers branch off of the femoral nerve to innervate their target structures (e.g., skin, muscle, bone, tendon, ligament, etc.) and can no longer be activated by stimulating the femoral nerve. Stimulating the femoral nerve distal to the branch point enables stimulation of fibers that innervate the knee and/or lower leg but not the fibers that innervate the anterior thigh. Because the fibers that innervate the front of the thigh branch off from the femoral nerve to innervate the skin, muscle, bone, tendon, ligament, and other structures in the thigh, the present system in this non-limiting example targets the femoral nerve upstream or closer to the spinal cord from where the fibers branch off to enable activation of the fibers that innervate the front of the thigh. In order to stimulate the target fibers before they branch off to innervate the region of pain, the stimulating electrode is placed closer to the spinal cord (but still outside of the spinal cord and in the periphery), proximal, rostral, and/or cephalad to the branch points of those fibers (e.g., at about 0.5-2 cm, or at about 1-3 cm, etc. proximal to the branch point). In the non-limiting example of the femoral nerve, the stimulating electrode is placed proximal (e.g., closer to the spinal cord or closer to the origin of the nerve) to the branching off of fibers that innervate the anterior thigh, such as a location within 1-2 cm of the top of the thigh.

Placing the lead(s) percutaneously in tissue with the electrode(s) in electrical proximity to but spaced away from the target peripheral nerve may also minimize complications related to lead placement and movement. In a percutaneous system, the lead(s) may be configured as a coiled fine wire electrode lead. This configuration may be used because it is minimally-invasive and well suited for placement in proximity to a peripheral nerve. The lead(s) may be sized and configured to withstand mechanical forces and resist migration during long-term use, particularly in flexible regions of the body, such as the shoulder, elbow, and knee. Previous systems and methods using percutaneous placement of leads have used introducer needles as large as 13-gauge or 14-gauge, which are damaging to the tissue through which they are inserted. The use of a fine wire electrode lead enables the present system to use smaller introducer needles and/or test needles (e.g., 17-gauge, 18-gauge, 20-gauge, 24-gauge, etc.), which enables placement of stimulating leads without or with less tissue damage than previous systems and methods—a narrower diameter of the lead can be a key factor in this. In a non-limiting example, an 18-gauge introducer may be used to place the stimulating lead. In another non-limiting example, a 24-gauge test needle may be used to stimulate the target nerve to identify the optimal location for lead placement where comfortable sensations are evoked that overlap with the region of pain and a 20-gauge introducer may be used to place the stimulating lead at that location.

In an embodiment the lead(s) may include a temporary or permanently implanted helically coiled or open-coiled fine wire electrode. In other embodiments, the leads may include any other type of electrode, such as a straight or uncoiled fine wire, paddle electrode, needle electrode, cylindrical electrode, intramuscular electrode, general-purpose electrode, skin surface, cutaneous, transcutaneous, or any other appropriate type of electrode (whether known today or developed thereafter), placed or inserted via a needle introducer, percutaneously, non-invasively, or surgically implanted with one or more open incisions (FIGS. 15 & 17). In one embodiment, a coiled fine-wire electrode lead (FIG. 15) or multiple electrode lead is placed using a needle introducer and once proper placement of the electrode (i.e., in its appropriate operative position) is confirmed (e.g., the electrode is placed remote from the target nerve such that stimulation produces comfortable sensations focally in the region(s) of pain), the needle introducer may be withdrawn, leaving the lead(s) and/or electrode(s) in place (FIG. 16). Stimulation may also be applied through a penetrating electrode, such as an electrode array comprised of any number (i.e., one or more) of needle-like electrodes that may be inserted into the target site. In both cases, the lead may be placed using a needle-like introducer, allowing the lead(s) and electrode placement to be minimally invasive. In a representative embodiment, the lead(s) may include a thin, flexible component made of a metal and/or polymer material. By "thin," it is contemplated that the lead(s) may not be greater than about 0.75 mm (0.030 inch) in diameter. However, the present teachings are not limited to such dimensions. Any appropriate electrode and lead may be utilized without departing from the present teachings. The lead(s) may also include one or more coiled metal wires with an open or flexible elastomer core. The wire may be insulated, e.g., with a biocompatible polymer film, such as polyfluorocarbon, polyimide, or parylene. The lead may be electrically insulated everywhere except at, for example, one (monopolar), or two (bipolar), or three (tripolar), or more than three (e.g., 4, 5, 6, 8, 10, 12, 16, 32) conduction locations near its distal tip of the same or different sizes, lengths, and/or dimensions (e.g., 0.1 mm, 0.2 mm, 0.3 mm, 0.5 mm, 1 mm, 3 mm, 5 mm, 7 mm, 10 mm, 15 mm, 20 mm, 1.0 cm, 0.2-1.5 cm, 0.1-3.0 cm, 1-10 cm in length) separated by non-conducting lengths of the same or different sizes and/or dimensions (e.g., 0.1 mm, 0.2 mm, 0.3 mm, 0.5 mm, 1 mm, 3 mm, 5 mm, 7 mm, 10 mm, 15 mm, 20 mm, 1.0 cm, 0.2-1.5 cm, 0.1-3.0 cm, 1-10 cm in length) (FIGS. 15 & 19). A non-limiting example of such is disclosed in U.S. Pat. No. 5,366,493, which is hereby incorporated by reference. Each of the conduction locations may be connected to one or more conductors that may run the length of the lead(s) and extension cable or cables used to connect the lead to an external pulse generator/stimulator or a portion thereof. The conductor may provide electrical continuity from the conduction location through the lead to an external pulse generator or stimulator.

The conduction location or electrode may include a de-insulated area of an otherwise insulated conductor that may run the length of an entirely insulated electrode or a portion thereof. The de-insulated conduction region of the conductor may be formed differently, e.g., it may be wound with a different pitch, or wound with a larger or smaller diameter, or molded to a different dimension. The conduction location or the electrode may include a separate material (e.g., metal or a conductive polymer) exposed to the body tissue to which the conductor of the wire is bonded. In a non-limiting example, the conduction location or the electrode may be preferably 1-30 mm in length, more preferably 10-20 mm in length, and most preferably 15 mm in length.

Embodiments of the lead may include a minimally invasive coiled fine wire lead and electrode. The lead(s) may possess mechanical properties in terms of flexibility and fatigue life that provide an operating life free of mechanical and/or electrical failure, taking into account the dynamics of the surrounding tissue (i.e., stretching, bending, pushing, pulling, crushing, etc.). The material of the electrode(s) may discourage the in-growth of connective tissue along its length or an applicable portion thereof, so as not to inhibit its withdrawal at the end of its use. However, it may be desirable to encourage the in-growth of connective tissue at the distal tip of the electrode, to enhance its anchoring in tissue.

The electrode may also include, at its distal tip or at one or more locations proximal (closer to the EPG or IPG) to one or more electrode contacts (e.g., behind or closer to the EPG relative to the first electrode contact, behind or closer to the EPG relative to a second electrode contact, behind or closer to the EPG relative to one, more than one, or all electrode contacts, etc.), an anchoring element (FIG. 15). In the illustrated embodiments, the anchoring element may take the form of a simple barb or bend. The anchoring element may be sized and configured so that, when in contact with tissue, it takes purchase in tissue (FIG. 16), to resist dislodgement or migration of the electrode out of the correct location in the surrounding tissue. Desirably, the anchoring element may be prevented from fully engaging body tissue until after the electrode has been correctly located and deployed.

The lead(s) may be provided in a sterile package and may be pre-loaded in an introducer needle (FIG. 18). Alternatively, the lead may be introduced via the same needle that is used to inject anesthetic or analgesics during peripheral nerve blocks, which are a common interventional procedure for chronic pain patients. The sterile package may take various forms and the arrangement and contents of the sterile package may be as appropriate related to the use thereof. The sterile package may include a sterile, wrapped assembly. The sterile package may include an interior tray made from any appropriate material, e.g., from die cut cardboard, plastic sheet, or thermo-formed plastic material, which may hold the contents. The sterile package may include any appropriate number of interior trays, including, without limitation, one, two, three, four, etc., including, without limitation the three such interior trays shown. The sterile package may also desirably include instructions for use regarding using the contents of the sterile package to carry out the lead(s) location and placement procedures.

In an embodiment, the lead(s) may exit through the skin and connect with one or more external electrical stimulation devices. Further, the lead(s) may be connected as needed to internal and external coils for RF (Radio Frequency) wireless telemetry communications or an inductively coupled telemetry to control the stimulation device(s). The lead(s) may also be fully implanted and electrical stimulation may be delivered with a temporary or permanent fully implantable system, which could include a fully implantable lead and an implantable pulse generator (IPG) which may be controlled by external devices (such as a patient and/or clinician programmer and/or controller) (FIGS. 17A-B). The IPG may be powered by a(n) internal source(s), such as a rechargeable battery, a primary cell or non-rechargeable battery, or other means. The implantable system may also be powered by external sources, including an external pulse transmitter, or other means.

The introducer needle is made from conductive and/or non-conductive materials, with its stimulating portion of the lead (e.g., the electrode) housed inside. This stimulating portion may protrude from the end of the needle itself so as to come into contact with the body tissue in which the lead is inserted. The distal end of the electrode may also protrude from the end of the needle in the same manner. The needle, lead, and/or electrode are then connected to an electrical stimulation device, such as an external pulse generator during/as a part of the introducer/implantation process. Applying stimulating current through the electrode while it is housed within the introducer may provide a close approximation to the response that the electrode will provide when it is deployed at the location of the introducer needle because stimulation will be delivered through the same conductive portion of the electrode.

The introducer needle may be sized and configured to be bent by hand prior to its insertion through the skin. This may allow the physician to place the lead(s) in a location that is not in an unobstructed straight line with the insertion site. The construction and materials of the introducer needle may allow bending without interfering with the deployment of the lead(s) and withdrawal of the introducer needle, leaving the lead(s) in the tissue.

An electrical stimulation lead may be placed percutaneously to target a peripheral nerve such that the lead takes a non-intersecting path near the nerve. This approach maintains an optimal (e.g., minimum) distance between the lead and the nerve when the trajectory of the nerve brings them in closest proximity. By maintaining a minimum distance (e.g., 0.1-5.0 mm, 0.1 cm-5.0 cm, 0.2 cm-2.0 cm, 0.2 cm-3.0 cm, 0.5 cm-3.0 cm), the safety of the procedure is improved by reducing the risk of the lead and/or needle to place the lead coming into contact with or puncturing the nerve. Keeping the lead at a minimum distance from the nerve also promotes selective stimulation of target fibers (e.g., large diameter sensory fibers, A-alpha and/or A-beta fibers, Type Ia, Ib, and/or II fibers) over non-target fibers (e.g., small diameter sensory and/or pain fibers, C and/or A-delta fibers, Type III and/or IV fibers), enabling activation of a sufficient number of target fibers to activate the spinal and supraspinal mechanisms enabling sustained pain relief.

Previously, existing approaches and methods used a trajectory that was intersecting. However, the present system includes an approach that is not intersecting (with the nerve) and provides increased potential efficacy (e.g., benefit to the patient), such as increased activation of target pain-relieving fibers and/or increased pain relief) with increased safety (e.g., decreased safety risk to the patient). In an embodiment, the stimulating electrode is a monopolar surface 1 cm in length that is placed such that the 1 cm of the electrode is arrayed across or alongside the nerve at a minimum distance (e.g., 0.5-3.0 cm) from the nerve. This placement will increase the size and uniformity of the electrical field applied to the nerve, enabling activation of a large number of target fibers throughout the entire nerve to generate a robust non-painful signal that engages spinal and supraspinal mechanisms described herein for sustained pain relief.

Representative lead insertion techniques will now be described to place an electrode and lead in a desired location in tissue in electrical proximity to but spaced away from a peripheral nerve. In an embodiment, a single lead may be placed to provide pain relief by targeting the peripheral nerve that innervates the region of pain. It is this placement that may make possible the stimulation of the target nerve or peripheral nerves with a single lead to provide pain relief. It may also be desirable to place multiple leads to target a single peripheral nerve, for example by placing one lead medial to and one lead lateral to (or one lead superficial to and one lead deep to) a target peripheral nerve to activate target nerve fibers distributed throughout the nerve rather than preferentially activating nerve fibers on one side of the nerve. It may also be desirable to place multiple leads to target multiple peripheral nerves (using one or multiple leads for each target nerve) to provide pain relief in multiple regions of pain or in a region of pain that spans the regions of innervation of multiple peripheral nerves or branches of peripheral nerves.

To determine the optimal placement for the lead, test stimulation may be delivered through a test needle, including but not limited to those described in U.S. patent application Ser. No. 15/388,128, filed on Dec. 22, 2016 and incorporated by reference herein. These and other test needles may include one or more electrodes and/or be made from conductive material(s). The test needle can be selectively, electrically insulated to create a stimulating surface or surfaces on or near its distal tip, whereas the proximal tip has a hub, plug, and/or other connection mechanisms to allow the test needle to operate in concert with an external stimulation device, such as a pulse generator. These types of test needles may be used because they may be easily repositioned until the optimal location to deliver stimulation and generate paresthesia is determined. Alternatively, in some embodiments, the introducer or test needle may be carried with the stimulation lead/electrode.

At least one lead(s) may be placed in tissue near a target peripheral nerve. The lead(s) may be inserted via the introducer needle in any appropriate manner, which may be in some exemplary embodiments similar in size and shape to a hypodermic needle. The introducer needle, however, may be any size. By way of a non-limiting example, the introducer needle may range in size from 17 gauge to 26 gauge. Before inserting the introducer needle, the insertion site may be cleaned with a disinfectant (e.g., Betadine, 2% Chlorhexidine/80% alcohol, 10% povidone-iodine, or similar agent). A local anesthetic(s) may be administered topically and/or subcutaneously to the area in which the electrode and/or introducer needle will be inserted.

The position of the electrode(s) on the test needle and/or on the lead itself may be checked by visualizing the test needle or introducer using imaging techniques, such as ultrasound, fluoroscopy, or X-rays. Following placement of the lead(s), the portion of the leads which exit the skin may be secured to the skin using covering bandages and/or adhesives or any other appropriate method and mechanism.

Electrical stimulation may be applied to the target peripheral nerve during and after placement of the electrode. Electrical stimulation may be applied to the target peripheral nerve through the electrode while the patient describes the sensations and location of the sensations that are generated by the stimulation. The intensity of the stimulation may be increased or decreased (i.e., by increasing or decreasing the amplitude and/or pulse width) to change the sensations and the location of sensations reported by the patient. When this method is used during the placement of the electrode, the sensations and location of sensations reported by the patient may also be modified by changing the location of the electrode placement near the target peripheral nerve. This method may be used to determine whether stimulation of the target peripheral nerve can generate comfortable sensations, when the comfortable sensations are at the maximum comfortable or tolerable level, and whether the comfortable sensations or paresthesia overlap with the region of pain and/or reduce pain.

The lead may be percutaneously placed near the target peripheral nerve and exit at a skin puncture site. Stimulation may be administered without a previous short-term trial. Alternately, a trial or screening test may be conducted in any appropriate clinical setting (e.g., an office of a clinician, a laboratory, a procedure room, an operating room, an intensive care unit, an acute rehabilitation facility, a subacute rehabilitation facility, etc.). During the trial, the lead may be coupled to an external pulse generator and temporary percutaneous and/or surface return electrodes, to confirm paresthesia coverage and/or pain relief of the painful areas.

If the clinical screening test is successful, the patient may proceed to treatment with an external pulse generator or external electrical stimulation device and temporary percutaneous and/or surface return electrodes. The treatment period may range from minutes to hours to days to weeks to months. By way of a non-limiting example, the treatment period may be between approximately 21 and 30 days, or between approximately 56 and 60 days or between 21 and 60 days.

Electrical stimulation may be applied between the lead and return electrode(s) (uni-polar mode). Regulated current may be used as a type of stimulation, but other type(s) of stimulation (e.g., non-regulated current such as voltage-regulated) may also be used. Multiple types of electrodes may be used, such as surface, percutaneous, and/or implantable electrodes.

In embodiments of a percutaneous system, the surface electrode(s) may serve as the anode(s) (or return electrode(s)). The surface electrodes may be a standard shape or they may be modified as appropriate to fit the contour of the skin. When serving as a return electrode(s), the location of the electrode(s) may not be critical and may be positioned anywhere in the general vicinity (e.g., on the shoulder, abdomen, lower back, or upper or lower extremity), provided that the current path does not cross parts of the body (e.g., the heart), through which stimulation could be harmful.

The electrode and lead may be placed via multiple types of approaches. By way of a non-limiting example, when the target peripheral nerve includes one or more nerves of the lumbar plexus or sacral plexus, the approach may be either an anterior or a posterior approach. This may be similar to those used for regional anesthesia of the same-target peripheral nerve, except that the approach may be used for placement through an introducer of stimulation lead(s) in electrical proximity to but spaced away from a peripheral nerve (e.g., any combination of whole integers to form lower and upper ranges between 2 and 100 millimeters, with a preferred range between 5 and 30 millimeters), and not for regional anesthesia. Unlike regional anesthesia, the approach to nerves of the lumbar plexus or sacral plexus may not involve the application of anesthesia to the nerve, and, when the introducer needle is withdrawn, the lead(s) may be left behind to desired stimulation of the target peripheral nerve.

Control of the electrical stimulation device (e.g., the pulse generator) and its stimulation parameters may be provided by one or more external controllers. Alternatively, a controller may be integrated with the external electrical stimulation device. The implanted pulse generator external controller (i.e., clinical programmer) may be a remote unit that uses RF (Radio Frequency) wireless telemetry communications (rather than an inductively coupled telemetry) to control the pulse generator. The electrical stimulation device may use passive charge recovery to generate the stimulation waveform, regulated voltage (e.g., 10 mV to 20 V), and/or regulated current (e.g., about 10 mA to about 50 mA). Passive charge recovery may be one method of generating a biphasic, charge-balanced pulse as desired for tissue stimulation without severe side effects due to a DC component of the current.

Pulses may be applied in continuous or intermittent trains (i.e., the stimulus frequency changes as a function of time). In the case of intermittent pulses, the on/off duty cycle of pulses may be symmetrical or asymmetrical, and the duty cycle may be regular and repeatable from one intermittent burst to the next or the duty cycle of each set of bursts may vary in a random (or pseudo random) fashion. Varying the stimulus frequency and/or duty cycle may assist in warding off habituation because of the stimulus modulation. As a non-limiting example, the stimulation train may consist of periods (e.g., 10 s, 30 s, 5 min, 60 min, 6 h, 12 h) of stimulation at a constant frequency (e.g., 100 Hz) followed by periods of inactivity that may be the same duration or a different duration as the period of stimulation such that the duty cycle is less than 100% (e.g., a 10% duty cycle whereby the inactive period is 9× the length of the active period, a 50% duty cycle whereby the inactive period is equal in duration to the active period, 75% duty cycle whereby the inactive period is one third the duration of the active period, etc.). The stimulation train may also include a gradual ramp up (e.g., each successive stimulation pulse has greater intensity, beginning at zero and increasing to the desired therapeutic stimulation intensity over the course of a period (e.g., 1-60 s, 0.1-10 min, 5-60 min)) in intensity at the transition between the inactive and active periods and a gradual ramp down (e.g., each successive stimulation pulse has lower intensity, beginning at the therapeutic stimulation intensity and decreasing to zero over the course of a period of time (e.g., 1-60 s, 0.1-10 min, 5-60 min)) in intensity at the transition between the active and inactive periods.

The stimulating frequency may be selected from a range of frequencies (e.g., 1-100 Hz, 1-300 Hz, 1-1000 Hz, 1-1200 Hz, 1-1500 Hz, 1-10,000 Hz, 1-20,000 Hz, 1-100,000 Hz, 12-100 Hz, 12-150 Hz, 1200-10,000 Hz, 1200-20,000 Hz, and/or 10,000 to 100,000 Hz). The frequency of stimulation may be constant or varying. In the case of applying stimulation with varying frequencies, the frequencies may vary in a consistent and repeatable pattern or in a random (or pseudo random) fashion or a combination of repeatable and random patterns.

In an embodiment, the stimulator may be set within a range of intensities including amplitude and pulse width (e.g., any combination of two whole integers between 1.0 and 30.0 mA and, separately, between 10 and 200 microseconds, so as to form lower and upper limits for each) and frequencies (e.g., any combination of two whole integers between 1 and 100 Hertz, again forming lower and upper limits to the ranges contemplated and expressly disclosed herein).

If the stimulus intensity is too great, it may generate muscle twitch(es) or contraction(s) sufficient to disrupt correct placement of the lead. If stimulus intensity is too low, the lead may be advanced too close to the target peripheral nerve (beyond the optimal position), possibly leading to incorrect guidance, mechanically evoked sensation (e.g., pain and/or paresthesia) and/or muscle contraction (i.e. when the lead touches the peripheral nerve), inability to activate the target nerve fiber(s) without activating non-target nerve fiber(s), improper placement, and/or improper anchoring of the lead (e.g., the lead may be too close to the nerve and no longer able to anchor appropriately in the muscle tissue).

Patient sensation may instead be used to indicate electrode location relative to the target peripheral nerve as indicator(s) of lead placement (distance from the peripheral nerve to electrode contact). Any combination of stimulus parameters that evoke sensation(s) may be used. The stimulation parameters may include, but are not limited to frequency, pulse duration, amplitude, duty cycle, patterns of stimulus pulses, and waveform shapes. Some stimulus parameters may evoke a more desirable response (e.g., comfortable sensations are felt in a greater percentage of the region of pain compared to other, less desirable stimulus parameters) or a sensation that may be correlated with or specific to the specific target nerve fiber(s) within the target peripheral nerve. As a non-limiting example, it is contemplated that certain frequencies (e.g., 100 Hz or 12 Hz) may evoke sensation(s) or comfortable paresthesia(s) in the region(s) of pain or in alternate target region(s).

While stimulation is being applied, the lead (non-limiting examples of the lead could include a single or multi-contact electrode that is designed for temporary (percutaneous) or long-term (implant) use or a needle electrode (used for in-office testing only) may be advanced (e.g., slowly advanced) towards the target peripheral nerve until the desired indicator response (e.g., patient paresthesia sensation, and/or pain relief) is obtained. The intensity may then be decreased (e.g., gradually decreased) as the lead is advanced (e.g., advanced slowly) closer to the target nerve until the desired indicator response(s) may be obtained at smaller intensity(ies) within a target range (e.g., 0.1-1.0 mA (or 0.09-39 mA, or 0.009-199 mA), 100-300 μs (or 40-1000 μs, or 1-10,000 μs)).

The stimulus intensities may be a function of many variables. The stimulus intensities set forth herein are meant to serve as non-limiting examples only, and may need to be scaled accordingly. As a non-limiting example, if electrode shape, geometry, or surface area were to change, then the stimulus intensities may need to change appropriately. For example, if the intensities were calculated for a lead with an electrode surface area of approximately 20 mm$^2$, then the intensities may need to be scaled down accordingly to be used with a lead having an electrode surface area of 0.2 mm$^2$ because a decrease in stimulating surface area may increase the current density, increasing the potential to activate excitable tissue (e.g., target and non-target nerve(s) and/or fiber(s)). Alternatively, if the intensities were calculated for a lead with an electrode surface area of approximately 0.2 mm$^2$, then the intensities may need to be scaled up to be used with a lead with an electrode surface area of 20 mm$^2$. Alternatively, stimulus intensities may need to be scaled to account for variations in electrode shape or geometry (between or among electrodes) to compensate for any resulting variations in current density. In a non-limiting example, the electrode contact surface area may be between approximately 0.1-20 mm$^2$, 0.01-40 mm$^2$, or 0.001-200 mm$^2$. In a further non-limiting example, the electrode contact configuration may include one or more of the following characteristics: cylindrical, conical, spherical, hemispherical, circular, triangular, trapezoidal, raised (or elevated), depressed (or recessed), flat, and/or borders and/or contours that are continuous, intermittent (or interrupted), and/or undulating. The present disclosure contemplates any appropriate configuration of electrode contact and is not limited to just what is described in this disclosure. The present system may utilize any configuration of electrode contact, whether known now or developed in the future.

In one embodiment of the present system, a fine-wire, open-coil lead may have a single electrode at its distal tip that serves as a stimulating electrode and records the activity in the target nerve (e.g., neural activity in one or more nerve fibers in the peripheral nerve) in between, before, during, and/or after stimulation pulses and/or delivery of electrical stimulation (FIG. 15). The present teachings are not limited to the electrode for stimulating and recording being the same electrode on the same lead. Any combination is contemplated, including, without limitation, the stimulating electrode being on one position on the lead and the recording electrode being on a different position on the same lead. Still further, the stimulating electrode and the recording electrode may be on different leads. Further still in some embodiments, the recording electrode may have the same or similar configuration as the stimulating electrode. In other embodiments, the recording electrode may have a different configuration from the stimulating electrode. Further, the stimulating and recording electrodes may be on different positions on the same lead. Any combination of the foregoing is contemplated. In other embodiments, one or more electrodes are used to stimulate the target nerve(s) and one or more electrodes are used to record the response to or of the stimulation (FIG. 19). The one or more stimulating electrodes may be distinct, different, and/or separate from the one or more recording electrodes, or the one or more stimulating electrodes may also be the one or more recording electrodes (e.g., the stimulating electrode(s) may be the same as and/or integrated mechanically and/or electrically with the recording electrode(s)) (FIGS. 19A & 19B). The stimulating electrodes and recording electrodes may have the same or different lengths (e.g., 0.1 mm, 0.2 mm, 0.3 mm, 0.5 mm, 1 mm, 3 mm, 5 mm, 7 mm, 10 mm, 15 mm, 20 mm, 1.0 cm, 0.2-1.5 cm, 0.1-3.0 cm, 1-10 cm) and may be separated by interelectrode distances of the same or different lengths (e.g., 0.1 mm, 0.2 mm, 0.3 mm, 0.5 mm, 1 mm, 3 mm, 5 mm, 7 mm, 10 mm, 15 mm, 20 mm, 1.0 cm, 0.2-1.5 cm, 0.1-3.0 cm, 1-10 cm in length) (FIG. 19). The stimulating electrodes and recording electrodes may be arranged on the same or one or more distinct, different, and/or separate leads that are placed in the same, similar, or different locations and/or orientations (e.g., parallel, perpendicular, orthogonal, at an angle to the nerve, etc.). While the stimulating electrode(s) are preferably placed remote from the nerve (e.g., 0.5-3 cm from the nerve), it is contemplated that separate recording electrode(s) may be placed closer to the target nerve than the stimulating electrode(s) and may preferably be placed in close contact with the nerve (e.g., 0.1 mm, 0.5 mm, 1 mm, 2 mm, 5 mm) to increase the signal-to-noise ratio and/or enhance the quality of the recorded neural activity. The stimulating electrodes may be arranged on one lead and the recording electrodes on one or more different leads, or the stimulating electrodes and recording electrodes may be mixed together and/or integrated with and/or near each other on one or more leads. The recording electrode may also be an electrically separate, second electrode separated from the stimulating electrode on the same lead by a non-conductive or minimally conductive material or material with a high or specified impedance.

Figure 20A:
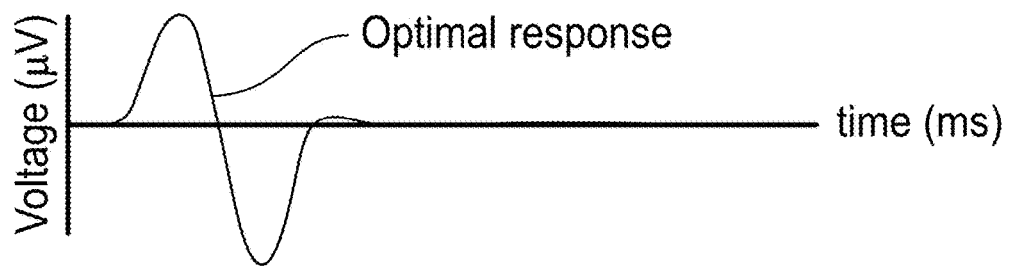
FIGS. 20A to 20C are schematic views of a non-limited example of a compound action potential that may have one or more positive and/or negative peaks.
Figure 20B:
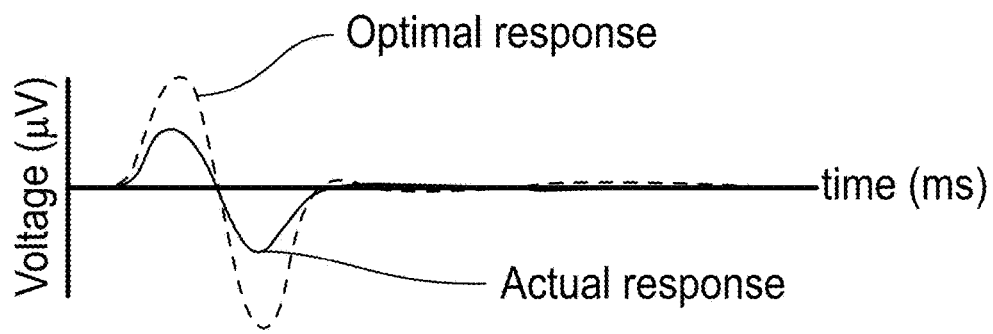
Figure 20C:
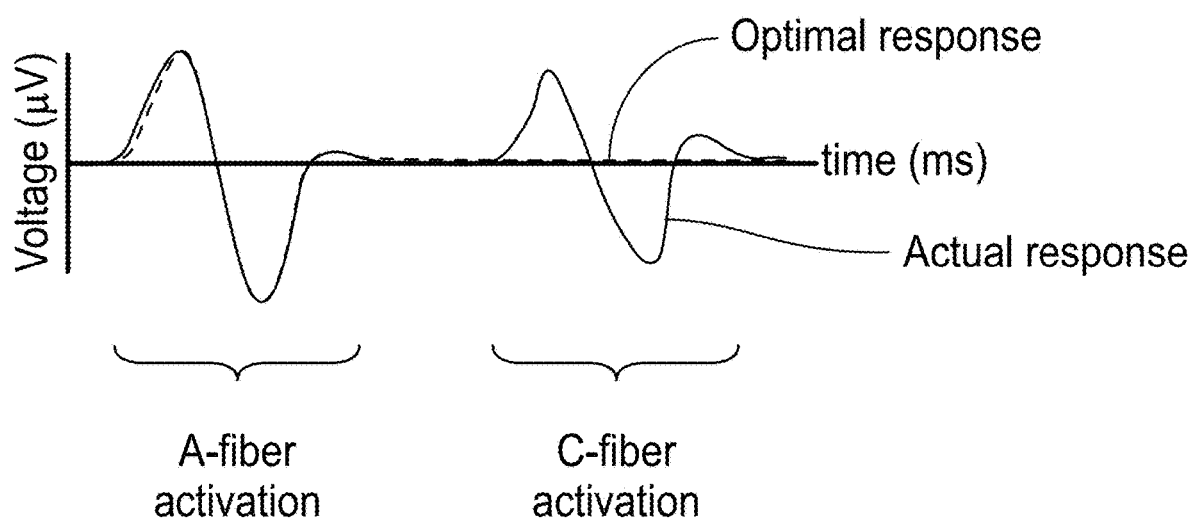

The stimulating electrode may activate one or more fibers in the target nerve (e.g., the peripheral nerve), creating individual action potentials in fibers that may be recorded as a compound action potential that includes the activity of multiple (e.g., more than one) or many fibers (FIG. 20). FIGS. 20A to 20C are schematic views of a non-limited example of a compound action potential that may have one or more positive and/or negative peaks. In FIG. 20A, the optimal response to stimulation is shown, with the A-fiber activation maximized indicating activation of a sufficient number of target fibers to produce sustained pain relief. In FIGS. 20B and 20C, the compound action potentials show non-optimal responses (solid lines) because of the activation of an insufficient number of target fibers (FIG. 20B) or the activation of non-target C fibers (FIG. 20C), overlaid for comparison with the optimal response (dotted lines).

The compound action potential may have one or more characteristics, such as peaks, absences of peaks and/or valleys (e.g., highs or lows) and/or the intensity, timing, and/or duration of the characteristics of the compound action potential corresponding to the activity (or lack or absence of activity), firing of action potentials (or lack or absence of action potentials) by, of, in, or from one or more fibers, activation, or stimulation (or lack or absence of activation or stimulation) of unique groups of fibers, and the characteristics, such as peaks or potential timing or orientation of peaks, lack of peaks, or valleys, may be arranged or oriented temporally based on the fiber diameter, conduction velocity, and/or other characteristics of the peripheral nerve fibers. In a non-limiting example, the activity of large diameter sensory fibers (e.g., A-alpha and/or A-beta fibers, and/or Type Ia, Ib, and/or II fibers) may occur first in time and therefore be the first peak of the compound action potential, and the activity of small diameter sensory fibers (e.g., C and/or A-delta fibers, and/or Type III and/or IV fibers) may occur last in time and therefore be the last peak of the compound action potential (FIG. 20). The recording electrode may detect and/or record activity in the target nerve (e.g., from one fiber, two fibers, a small group of fibers, multiple small groups of fibers, the entire nerve, etc.) as individual action potential and/or compound action potentials.

The recording electrode(s) may be placed in, on, near, or adjacent to or away from the target nerve(s) to record neural activity. The recording of neural activity may be similar to or the same as an electroneurogram (ENG). The recording electrode(s) may also be placed in, on, near, or adjacent to or away from a muscle, muscles, or muscle group innervated by the target nerve to record muscle activity. The recording of muscle activity may be similar to or the same as an electromyogram (EMG).

The recording electrode(s) (and/or the recording(s) of neural and/or muscle activity) may be used determine when a response (e.g., an optimal, desired, wanted, or suboptimal, undesired, or unwanted response) and/or what type of response has or has not been elicited from a peripheral nerve (and/or the target and/or non-target nerve fibers) by the stimulating electrode(s). In a non-limiting example, a desired, wanted, or optimal response may be activation of the target population of fibers while avoiding activation of non-target population(s) of fibers. In a non-limiting example, the desired, wanted, or optimal response from stimulation of the target nerve may be the activation of a majority or a sufficient number (i.e., >50%, >70%, >80%, >90%, >100%) of the large diameter sensory fibers that innervate the region of pain (e.g., A-alpha and/or A-beta fibers, also known as Type Ia, Ib, and/or II fibers) in the target nerve while avoiding activation of non-target fibers (e.g., small diameter sensory and/or pain fibers, C and/or A-delta fibers, and/or Type III and/or IV fibers) to produce neuroplastic changes in the CNS that enable or cause long-term sustained pain relief. Such activation may be confirmed as a desired, wanted, or optimal response when the one or more compound action potential peaks corresponding to large diameter sensory fibers (e.g., non-pain fibers, and/or A$\alpha$ fibers, and/or A$\beta$ fibers, and/or Type Ia, Ib, and/or II fibers) reach the largest possible or maximal level (e.g., further increases in stimulation intensity no longer result in increases the peak indicating that all or a majority of or a sufficient number of large diameter fibers are activated) while avoiding, minimizing, or eliminating the presence of one or more compound action potential peaks corresponding to small diameter sensory fibers (e.g., pain fibers, and/or A$\delta$, and/or C fibers, and/or Type III and/or IV fibers) (FIG. 20).

In another embodiment, the desired, wanted, or optimal response from stimulation of the target nerve may be the activation of large diameter motor fibers (e.g., efferent peripheral nerve fibers, alpha motoneurons, etc.) to produce contraction or activation of or tension, sensation, or response in the innervated muscle, muscles, or muscle group such that the contraction, activation, tension, sensation, or response produces activation of a sufficient number (i.e., >50%, >70%, >80%, >90%, preferably up to 100%) of large diameter sensory peripheral nerve fibers innervating the region of pain (e.g., afferent peripheral nerve fibers) to produce neuroplastic changes in the CNS that enable or cause long-term sustained pain relief. In a non-limiting example, such activation may be confirmed as a desired, wanted, comfortable, or optimal response when the muscle activity is produced in the region or regions of pain and maximized while avoiding activation of non-target fibers (e.g., small diameter sensory fibers, pain fibers, A-delta fibers, and/or C fibers, and/or Type III and/or IV fibers) and/or avoiding unwanted muscle activity such as muscle fiber activation, contraction, or tension that are uncomfortable or cause unwanted movement (e.g., unwanted muscle movement or motor activity, including limb movement, trunk movement, head movement, etc.) and further increases in stimulation intensity do not result in further increases in muscle activity, and/or further increases in stimulation intensity result in physical discomfort to the patient. In another non-limiting example, activation may be confirmed as a desired, wanted, or optimal response if comfortable sensations are generated by activation of a sufficient number or proportion of large diameter sensory fibers (e.g., A-alpha and/or A-beta fibers, Type Ia, Ib, and/or II fibers), while avoiding unwanted muscle activity such as muscle fiber activation, contraction, or tension that are uncomfortable or cause unwanted movement (e.g., unwanted muscle movement or motor activity, including limb movement, trunk movement, head movement, etc.).

In a non-limiting example of an embodiment, the present system may use one or more recording electrodes to instruct, guide, determine, improve, and/or optimize lead placement and/or selection of stimulation parameters and/or reduce or minimize the amount of time, skill, expertise, and/or experience required for lead placement, programming of stimulation parameters, delivery of stimulation, and/or use of the device and system, enabling a wide range of users, such as clinicians, including physicians, nurses, nurse practitioners, physician assistants, medical assistants, and nonmedical personnel, including patients, and technical and nontechnical personnel to correctly use the system (e.g., the devices, systems, and methods). The present embodiment, may provide a system that is easy to use. Use of a recording electrode (as described in the previous paragraphs) enables use of the present system and/or method with less time, skill, or training required. The recorded signals may be used to guide (automatically or algorithmically or without physician decision-making required) lead placement location for optimal stimulation outcomes. During lead placement, recorded neural and/or muscle activity may be used to place the lead and/or instruct, guide, determine, and/or optimize the placement of the lead in a location that enables the desired outcome (e.g., sufficient activation of large diameter A fibers) while avoiding unwanted responses, such as undesirable activation and/or blocking of other peripheral nerve fibers. As a non-limiting example, if stimulation when the electrode(s) are placed at a location near the nerve does not produce the desired, wanted, or optimal response, such as sufficient activation of the target fiber population (e.g., large diameter A fibers (also known as A-alpha fibers, A-beta fibers, non-pain fibers, Type Ia, Ib, and/or II fibers) or large diameter motor fibers (also known as efferent fibers, alpha motor neurons etc.)) while avoiding activation of non-target fibers (e.g., small diameter fibers, also known as A-delta fibers, C fibers, Type III and/or IV fibers, pain fibers) and/or the compound action potential peak corresponding to the target fiber population has reached a sufficient size (e.g., at least 50%, 70%, 80%, 90%, or preferably 100% of the maximum possible height or area under the curve that could be achieved if all large diameter fibers were activated) while avoiding activating non-target fibers as indicated by the absence of a compound action potential peak corresponding to the non-target fibers, the electrode(s) may be relocated or another electrode may be selected (e.g., from the same lead if it is a lead with multiple electrodes or electrode contact(s) or from a different lead) and the system may guide the relocation of the electrode(s) (e.g., moved closer, further away, moved in a specific direction, or kept at the same distance but moved to a different location circumferentially around the nerve) and stimulation may be reapplied to test at the new location and/or stimulation delivered through a different electrode or electrodes. As another non-limiting example, stimulation-evoked activity in a muscle, muscles, or muscle group in or near the region of pain may serve as the desired, wanted, proxy, indicator, and/or optimal response to stimulation of the target nerve. If stimulation at an electrode location or from one or more selected electrode(s) does not activate the muscle, muscles, or muscle group innervated by the target nerve, or activates one or more muscles that are not intended to be activated and/or are not in the region of pain and/or are not innervated by the target nerve, the electrode(s) may be relocated or another electrode may be selected (e.g., from the same lead if it is a lead with multiple electrodes or electrode contact(s) or from a different lead) and the system may guide the relocation of the electrode(s) (e.g., moved closer, further away, moved in a specific direction, or kept at the same distance but moved to a different location circumferentially around the nerve) and stimulation may be reapplied to test at the new location and/or stimulation delivered through a different electrode or electrodes. By using these objective measures that are based on recorded nerve and/or muscle activity rather than relying on subjective measures that are based on the verbal reports of patients regarding where the patients perceive or feel stimulation-evoked sensations and whether the sensations are comfortable, lead placement and programming of stimulation parameters after the placement of leads in the present system reduce or minimize the amount of time, skill, expertise, and/or experience required for lead placement, programming of stimulation parameters, delivery of stimulation, and/or use of the device and system and/or reduce the rate or need for replacement, revision, movement, retesting, or reprogramming of leads or stimulation parameters due to the initially placed leads and stimulation parameters not producing a desired, wanted, or optimal response, enabling a wide range of users, such as clinicians, including physicians, nurses, nurse practitioners, physician assistants, medical assistants, and nonmedical personnel, including patients, and technical and nontechnical personnel to correctly use the system (e.g., the devices, systems, and methods).

The systems, devices, methods, and instructions for use of systems, devices, and methods of the present teachings apply electrical stimulation to one or more peripheral nerves throughout the body to enable comfortable sensations to be evoked in the region of pain. The presence of comfortable sensations in the region of pain serves as confirmation that the target nerve innervates the region of pain and is the correct stimulation target, but the presence of comfortable sensations alone does not necessarily indicate that a sufficient number of target fibers have been activated to produce the neuroplastic changes in the central nervous system that promote sustained pain relief. Whereas previous systems and methods may produce comfortable sensations, the present system and methods use feedback from recording electrodes to measure and confirm that a sufficient number of target fibers are activated, and thereby confirm that the comfortable sensations produced are representative of a sufficient activation of target fibers such that the neuroplastic changes in the CNS that promote sustained pain relief may occur.

It is to be appreciated that the present system in a non-limiting example of an embodiment is different from and overcomes limitations of previous systems, devices, and or methods that are fully implanted and/or use or require neural or muscle feedback to automatically or algorithmically adjust one or more stimulation parameters to maintain a desired response or effect of stimulation (e.g., throughout the stimulation or treatment period, indefinitely or for a period of many years in the case of permanently implanted systems). Although the present system can use continuous or periodic neural and/or muscle feedback to automatically or algorithmically adjust one or more stimulation parameters to maintain a desired response or effect of stimulation throughout the stimulation or treatment period, the method, device, system, and/or algorithm through which the present system achieves its effect in an embodiment by using neural and/or muscle feedback during the lead placement procedure to instruct, inform, or guide the placement of electrodes and selection of stimulation parameters such that continuous, ongoing feedback-driven adjustment of stimulation parameters throughout the stimulation period is unnecessary and the desired, wanted, or optimal response to stimulation can be achieved and maintained throughout the stimulation period while avoiding the need for, without or with less feedback-driven adjustment of stimulation parameters. In a non-limiting example of an embodiment, the present system uses neural and/or muscle feedback to guide electrode placement (e.g., initial placement) and/or stimulation parameter selection (e.g., initial stimulation parameter selection or parameter range selection) to enable consistent delivery of stimulation to evoke the desired, wanted, or optimal response consistently while avoiding the need to use neural and/or muscle feedback after the initial use and/or avoid the need to use neural and/or muscle feedback throughout (continuously or intermittently) the delivery of treatment (e.g., following the initial lead placement and/or programming procedure, experience, or period), whereas previous systems and methods have required continuous, repeated, multiple, and/or intermittent adjustment of stimulation parameters throughout the stimulation period (e.g., often many years or indefinitely in the case of permanently implanted systems) to maintain an optimal response and were limited by electrode encapsulation, electrode migration, accommodation, and other factors that diminish the effectiveness of or ability to record and analyze neural and/or muscle signals over an extended period of time (e.g., hours, days, weeks, months, or years) during which stimulation may be delivered and require adjustment or optimization. The present system, in a non-limiting example of an embodiment that overcomes the limitations of the reliance on continuous or period recording of neural and/or muscle signals throughout the stimulation period to optimize stimulation parameters by using neural and/or muscle feedback to guide electrode placement and/or stimulation parameter selection at the time of initial lead placement and/or programming such that the electrode location(s) and/or stimulation parameters are designed or selected to produce the desired, wanted, or optimal response throughout the stimulation period without or while avoiding the need for or the requirement of automated, repeated, continuous, intermittent, regular, or algorithmic adjustment.

Previous systems and methods using conventional feedback loops were limited by the need to continuously provide neural and/or muscle feedback to inform, instruct, or guide adaptive changes to one or more stimulation parameters because of the challenges associated with continuously recording and analyzing neural signals for the duration of a stimulation period (e.g., fibrous encapsulation, electrode degradation, hardware failure, electrode movement or migration, and other factors that cause deterioration or loss of recorded signals over time), and were intended for situations such as spinal cord stimulation in which feedback is required to adjust stimulation parameters to maintain a constant response to stimulation in spite of changes in the electrode location relative to the neural target during the delivery of stimulation (e.g., due to postural changes and/or heartbeat). The challenges associated with maintaining a constant response to electrical stimulation in the spinal cord or dorsal columns or other central nervous system locations are different than the challenges in the periphery, and it is to be appreciated that the present system specifically addresses the challenges associated with the stimulation of peripheral nerves that are unique and different from the challenges associated with stimulation of other neural targets (e.g., spinal cord, DRG, brain, etc.), such as changes in body position or postural changes in the periphery (e.g., due to muscle contraction, extremity movement, etc.) that are different and have a different effect than changes in body position or postural changes do on the spinal cord. As a non-limiting example, the present system overcomes the limitations associated with previous systems that place electrodes on or adjacent to neural targets and subsequently encounter large fluctuations in distance between the electrode and neural target (e.g., due to postural changes, breathing, or heartbeat) by using neural and/or muscle feedback to place electrodes remote from one or more target nerve(s) (e.g., 0.5-3 cm distant from the target peripheral nerve(s)) and overcome the effects of movement in the periphery (e.g., by reducing the proportional effects of movement; in a non-limiting example, a 1 mm increase in electrode-fiber distance would represent a 10-fold increase (1000% increase) in distance from the neural target for an electrode placed at approximately 0.1 mm from the neural target, whereas a 1 mm increase in electrode-fiber distance would represent a 10% increase in distance from the neural target for an electrode placed remote (e.g., 10 mm) from the neural target) and maintain the desired, wanted, or optimal response without requiring adjustment of stimulation parameters during the stimulation period.

The present system maintains the desired, wanted, or optimal nerve and/or muscle response by analyzing recorded neural and/or muscle signals to instruct, inform, or guide electrode placement and/or stimulation parameters (e.g., programming and/or parameter range setting or programming) to avoid changes or decreases in the desired, wanted or optimal response (e.g., the activation of target fibers and non-activation of non-target fibers during the stimulation period), enabling sustained relief of pain by maintaining the increased or amplified amount, intensity, or ratio of non-painful sensory information relative to painful sensory information from the region of pain to the central nervous system. In one aspect, the system, device, and method may use one or more electrodes on one or more separate leads such that a decrease in the desired, wanted, or optimal response may be prevented, avoided, or reversed (e.g., the desired, wanted, or optimal response may be restored) by selecting one or more of the same or different electrodes (e.g., from the same lead if it is a lead with multiple electrodes or electrode contact(s) or from a different lead) from which to deliver stimulation that maintains the desired, wanted, or optimal nerve and/or muscle response consistently.

The optimal stimulation intensity to evoke the desired nerve and/or muscle response as measured by a recording electrode may vary (increase and/or decrease) based on the location of the electrode(s) and/or the stimulation parameters. In one aspect, an automated program, system, or algorithm analyzes the recorded nerve and/or muscle activity and instructs, informs, or guides the relocation of one or more electrodes, selection of one or more different electrodes, and/or changes in one or more stimulation parameters to achieve the desired, wanted, or optimal response (e.g., in a non-limiting example, if the compound action potential peak corresponding to target fibers (e.g., large diameter sensory fibers, A-alpha and/or A-beta fibers, Type Ia, Ib, and/or II fibers) decreases or is not at the desired, maximal, or optimal level the algorithm instructs, informs, or guides electrode relocation and/or selects one or more different electrode(s), and or changes one or more stimulation parameters (e.g., by increasing, decreasing, or changing one or more stimulation parameters such as frequency, amplitude, pulse duration, waveform pattern, pulse shape, pulse polarity, duty cycle, etc.) to achieve the desired, wanted, or optimal response indicated by the maximal or optimal size of the peak, and/or if the compound action potential peak corresponding to non-target fibers (e.g., small diameter fibers, pain fibers, C and/or A-delta fibers, Type III and/or IV fibers) becomes present, is activated or evoked, and/or increases in size, the algorithm may similarly adjust or instruct adjustment of electrode location, selection, and/or stimulation parameters (e.g., by increasing, decreasing, or changing one or more stimulation parameters such as frequency, amplitude, pulse duration, waveform pattern, pulse shape, pulse polarity, duty cycle, etc.) to restore the size or absence of the peak. The algorithm analyzes recorded nerve and/or muscle activity and adjusts stimulation intensity or parameters at regular intervals (e.g., every millisecond, every second, twice per second, five times per second, once per minute, twice per minute, five times per minute, once per five minutes, and/or in intervals measured by hours, days, weeks, months, etc.). The algorithm may adjust stimulation intensity by varying one or more parameters including, as non-limiting examples, the frequency of pulses (e.g., varying in increments of 1 Hz, less than 1 Hz, or greater than 1 Hz within 0.01-100 Hz, 0.1-300 Hz, 1-20 Hz, 20-50 Hz, 20-100 Hz, 50-200 Hz, 1-1000 Hz, 1-5,000 Hz, 1-10,000 Hz, 1-20,000 Hz, 1-100,000 Hz, etc.), polarity of pulses (e.g., cathodic or anodic), shape of pulses (e.g., rectangular, sinusoidal, symmetric, asymmetric, exponentially decaying, charge-balanced, charge imbalanced, triangular or saw-toothed, ramped, etc.), pattern of pulses (e.g., regular, irregular, bursting, random, etc.), amplitude of pulses (e.g., varying in increments of 1 mA, less than 1 mA, or greater than 1 mA within 0.01-30 mA, 0.1-30 mA, 1-50 mA, 0.2-50 mA, 0.1-100 mA, etc.), width of pulses (e.g., varying in increments of 1 µs, less than 1 µs, or greater than 1 µs within 0.01-100, 0.1-100, 1-200, 10-200, 1-500, 10-500, 1-1000, 10-1000, 50-1000, 1-10,000 µs, etc.), and which one or more electrodes on the one or more leads are selected to deliver stimulation and/or record nerve and/or muscle activity.

In another aspect, the present system may use an automated system, program, or algorithm to adjust stimulation parameters to maintain the desired, wanted, or optimal response that will improve battery life of the stimulation system by reducing the time at which stimulation is delivered at non-optimal, excessive, superfluous, or unnecessarily high parameters or intensities. Whereas previous systems and methods used manual programming to identify stimulation parameters at which the desired, wanted, or optimal response is achieved, such as the activation of target fibers (e.g., large diameter sensory fibers, A-alpha and/or A-beta fibers, Type Ia, Ib, and/or II fibers) that generate comfortable sensations in the region of pain, and/or did not identify stimulation parameters that maximized energy efficiency and/or delivered stimulation at parameters or intensities that are greater or higher than necessary to achieve the desired, wanted, or optimal response, and/or used continuous or periodic feedback to change one or more stimulation parameters in an algorithm or automated program that require computing power and are energy inefficient as a result of the need for continuous adjustment of stimulation parameters to maintain the desired, wanted, or optimal response and/or avoid unwanted or undesired responses. The present system overcomes the limitations of manual reprogramming and continuous, automated reprogramming by using neural and/or muscle feedback to identify electrode locations and/or stimulation parameters that are robust and can maintain the desired, wanted, or optimal response without manual reprogramming or continuous recording and analysis of feedback to adjust stimulation parameters. As a non-limiting example, if the desired nerve and/or muscle response can be achieved at an amplitude of 10 mA and the maximum comfortable threshold occurs at 15 mA (e.g., a therapeutic window of 10-15 mA), but increasing the amplitude from 10 mA to 15 mA does not increase or improve the desired nerve and/or muscle response (e.g., stimulation at 11, 12, 13, 14, or 15 mA would not make the response more or less desirable or more or less optimal compared to stimulation at 10 mA), previous systems or methods may deliver stimulation at some non-efficient amplitude such as 11 mA, 12 mA, 13 mA, 14 mA, or the maximum comfortable amplitude of 15 mA, whereas the present system may use an automated system, program, application, or algorithm that would identify 10 mA as the most efficient amplitude and deliver stimulation at that amplitude by recording and analyzing nerve and/or muscle activity to determine that the intensity, size, optimization, or desirability of the response is unchanged (e.g., not more or less desirable or more or less optimal) at higher amplitudes up to 15 mA. The present devices, systems, methods, and instructions for use of devices, systems, or methods overcomes the limitations of manual programming in previous systems and methods by an automated system, program, application, or algorithm that identifies the set(s) of stimulation parameters that produce the desired, wanted, or optimal response, and further identifying the most efficient (e.g., most energy efficient, least energy intensive, lowest intensity, lowest amplitude, smallest pulse width, lowest frequency, etc.) stimulation parameters from among the set(s) of parameters that may produce the desired, wanted, or optimal response, thereby reducing energy or power requirements, increasing battery life, reducing the recharge burden (e.g., increasing the amount of time between recharges of the rechargeable battery, reducing the frequency of recharging, and/or shortening the amount of time required to recharge the rechargeable battery), increasing the lifespan of a rechargeable or non-rechargeable battery, reducing the number, frequency, rate, or need for surgeries or operations to replace batteries in fully implanted pulse generators, and/or reducing the number, frequency, rate or need for replacement of rechargeable or non-rechargeable batteries.

In another non-limiting example, the present system may use an automated system, program, or algorithm to adjust stimulation parameters to maintain the desired, wanted, or optimal response by identifying electrode locations and/or stimulation parameters at the time of lead placement that enable delivery of stimulation in the middle of the therapeutic window such that the desired, wanted, or optimal response can be maintained without reprogramming even if there is movement of the nerve or nerve fibers and/or electrodes relative to each other, which may occur, in a non-limiting example, as the patient receives relief of chronic and/or background pain and the patient becomes more mobile, active, increases activity levels or exercise, and/or has reduced interference of pain with activity or activities of daily living. Prior to the present system it was not known how to optimize stimulation parameters within the therapeutic window using an automated program, application, or algorithm to provide the greatest likelihood of maintaining the desired, wanted, or optimal response to electrical stimulation of a target nerve throughout the stimulation period to produce sustained relief of chronic and/or background pain while avoiding undesired (e.g., uncomfortable, non-therapeutic, detrimental) responses to stimulation. As a non-limiting example, if the desired nerve and/or muscle response can be achieved at one stimulation intensity (e.g., an amplitude of 10 mA) and the maximum comfortable threshold occurs at a second stimulation intensity (e.g., an amplitude of 15 mA, creating a therapeutic window of 10-15 mA), previous systems or methods may deliver stimulation at some stimulation intensity (e.g., an amplitude such as 10 mA or 15 mA) that is at or near the minimum or maximum of the therapeutic window, whereas the present system may use an automated system, program, application, or algorithm that would identify the stimulation intensity (e.g., an amplitude of 12.5 mA) as the intensity within the therapeutic window that is optimal (e.g., provides the best likelihood or ability to maintain the desired, wanted, or optimal response to stimulation during, after, in spite of, or with regard to movement of the nerve or nerve fibers and/or electrodes relative to each other) and stimulation may be delivered at the identified intensity or modulated (e.g., increased or decreased) within the therapeutic window to maintain the desired, wanted, or optimal response in spite of movement of the nerve or nerve fibers and/or electrodes relative to each other. The present devices, systems, methods, and instructions for use of devices, systems, or methods overcome the limitations of manual programming in previous systems and methods by an automated system, program, application, or algorithm that identifies the set(s) of stimulation parameters that produce the desired, wanted, or optimal response, and further identifying the set of stimulation parameters that provides the greatest ability to maintain the desired, wanted, or optimal response in spite of movement of the nerve or nerve fibers and/or electrodes relative to each other, thereby reducing the number, frequency, rate, or need for reprogramming sessions, reducing the time required for reprogramming to maintain therapeutic efficacy, reducing the number, frequency, rate, or need for procedures or surgeries to replace leads, and/or reducing or minimizing the amount of time, skill, expertise, and/or experience required for lead placement, programming of stimulation parameters, delivery of stimulation, and/or use of the device and system, enabling a wide range of users, such as clinicians, including physicians, nurses, nurse practitioners, physician assistants, medical assistants, and nonmedical personnel, including patients, and technical and nontechnical personnel to correctly use the system.

The automated system or algorithm to adjust stimulation parameters enables the identification of optimal stimulation parameters for the selective and preferential activation of target fibers in the target nerve independent of the distance of electrode location from the nerve while avoiding activation of non-target fibers. Previous systems and methods preferentially placed leads remote from the target nerve to selectively activate target fibers (e.g., large diameter fibers) without activating non-target fibers (e.g., small diameter fibers), and stimulation parameters were identified and chosen by manually adjusting one or more parameters (e.g., amplitude, pulse width, frequency, waveform, etc.). The present systems and methods may utilize automated optimization of one or more parameters (e.g., amplitude, pulse width, frequency, waveform, etc.). The automated optimization may test a large number of combinations of parameters in a short period of time using the analysis of recorded nerve and/or muscle activity to determine if the optimal response is achieved with a given set of parameters. In a non-limiting example, the system and method may deliver stimulation at a low amplitude (e.g., 0.1 mA, 0.2 mA, 0.5 mA, 1 mA, 0.01-1 mA, 0.1-2 mA, 0.1-5 mA) and a low pulse duration (e.g., 0.1 µs, 1 µs, 2 µs, 5 µs, 10 µs, 0.01-1 µs, 0.01-3 µs, 0.1-5 µs, 0.1-10 µs) for a short period of time (e.g., 1s, 5 s, 10 s, 20 s, 30 s, 60 s, 2 min, 5 min, 1-10 s, 1-30 s, 1-2 min, 2-5 min). The amplitude may be increased by one or more increments (e.g., 0.1 mA, 0.5 mA, 1 mA, 2 mA, 0.01-1 mA, 0.1-2 mA, 0.1-10 mA) and/or the pulse duration increased by one or more increments (e.g., 0.1 µs, 0.2 µs, 1 µs, 2 µs, 5 µs, 10 µs, 20 µs, 30 µs, 0.01-10 µs, 0.1-5 µs, 1-10 µs, 0.1-100 µs) and the new parameters tested again for a short period of time. If the optimal response is not recorded, one or more parameters may be changed (e.g., increased or decreased). If the non-desired response is recorded (e.g., small diameter fiber activation, such as the presence of a compound action potential peak corresponding to C fibers, A-delta fibers, and/or Type III and/or IV fibers), one or more parameters may be changed (e.g., decreased or increased) to abolish, diminish, reduce, remove, eliminate, or restore the absence of the non-desired response. In this fashion, a large number of parameter combinations may be tested during a short time (e.g., during a lead placement procedure) to determine the optimal electrode location(s) and/or stimulation parameters to produce the desired response in a robust way (e.g., the desired response is not lost even if there is movement of the peripheral body that causes increases or decreases in the distance between the electrode and the target nerve). The present system and method overcome the limitations of previous systems and methods in which manually changing parameters in a time-limited programming session and/or relying on patients' verbal feedback limited the number of stimulation parameter combinations that could be tested and therefore resulted in a high likelihood that not all possible parameter combinations were tested to determine the optimal combination(s).

Stimulus intensities may need to be scaled to account for biological factors, including but not limited to patient body size, weight, mass, habitus, age, and/or neurological condition(s). As a non-limiting example, patients that are older, have a higher body-mass index (BMI), more tissue such as adipose, muscle, connective, fibrous, and/or scar tissue, and/or neuropathy (e.g., due to diabetes) may need to have stimulus intensities scaled higher (or lower) accordingly.

As mentioned above, if the lead is too close to or too far away from the target peripheral nerve, then stimulation may be unable to evoke the desired response (e.g., comfortable sensation(s) (or paresthesia(s)), and/or pain relief) in the desired region(s) at the desired stimulus intensity(ies). If the lead is too close to the target peripheral nerve, then stimulation may insufficiently or be unable to evoke the desired response(s) (e.g., comfortable sensation(s) (or paresthesia(s)), and/or pain relief) in the desired region(s) at the desired stimulus intensity(ies) without evoking undesirable response(s) (e.g., unwanted and/or painful sensation(s) (or paresthesia(s)), increase in pain, and/or generation of additional pain in related or unrelated area(s)). In some cases, it may be difficult to locate the optimal lead placement (or distance from the target peripheral nerve) and/or it may be desirable to increase the range of stimulus intensities that evoke the desired response(s) without evoking the undesired response(s) so alternative stimulus waveforms and/or combinations of leads and/or electrode contacts may be used.

Figure 7A:
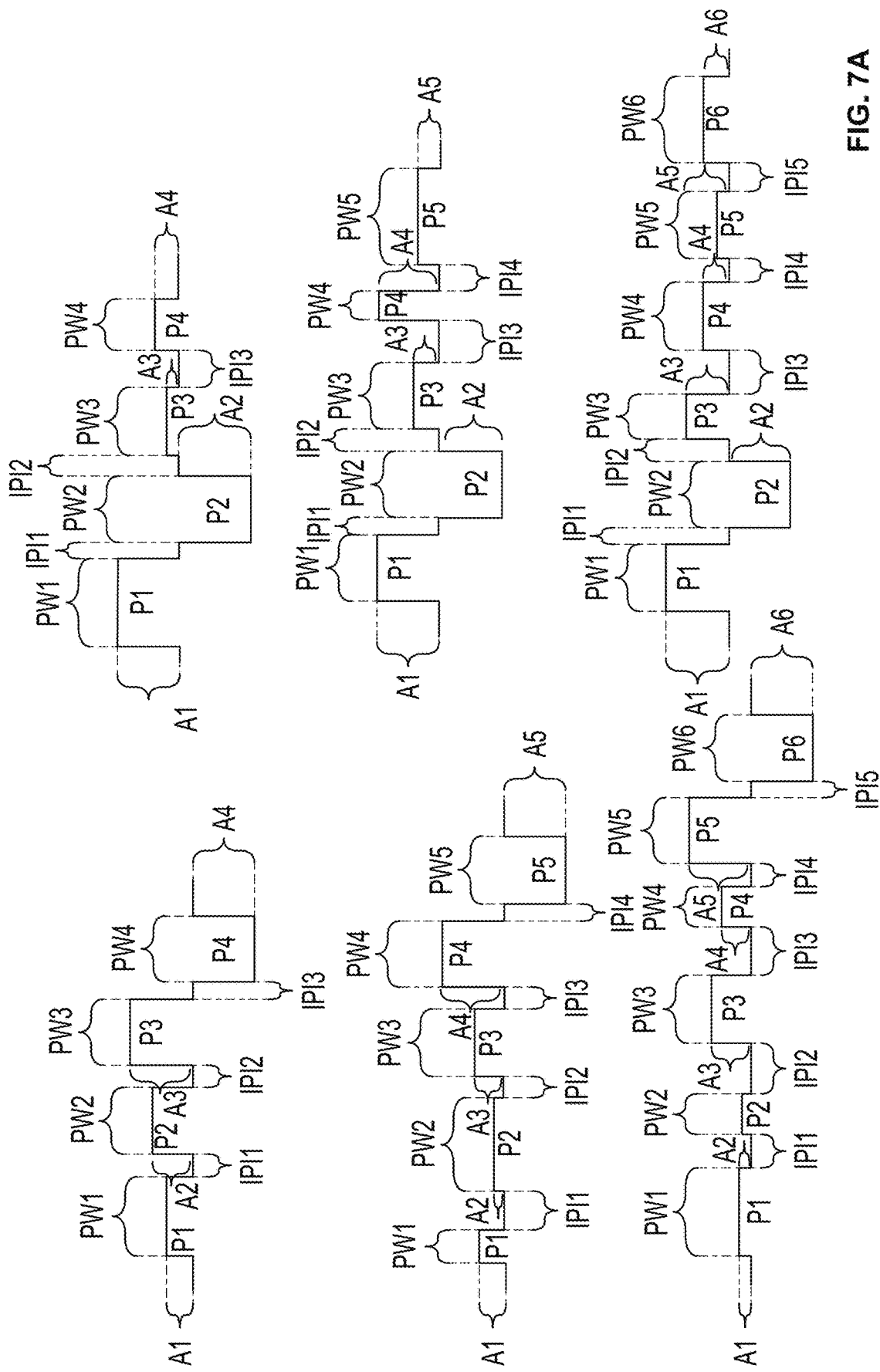
FIGS. 7A to C show non-limiting examples of schematic representations of waveform shapes, including one, two, three, four, or more pre-pulses; one, two three, four, or more post-pulses; one or more primary depolarizing pulses; and/or one or more charge balancing pulses, each pulse having amplitude A (e.g., A1, A2, A3, etc.), pulse width PW (e.g., PW1, PW2, PW3, etc.), and separated by interpulse interval IP (e.g., IP1, IP2, IP3, etc.).
Figure 7B:
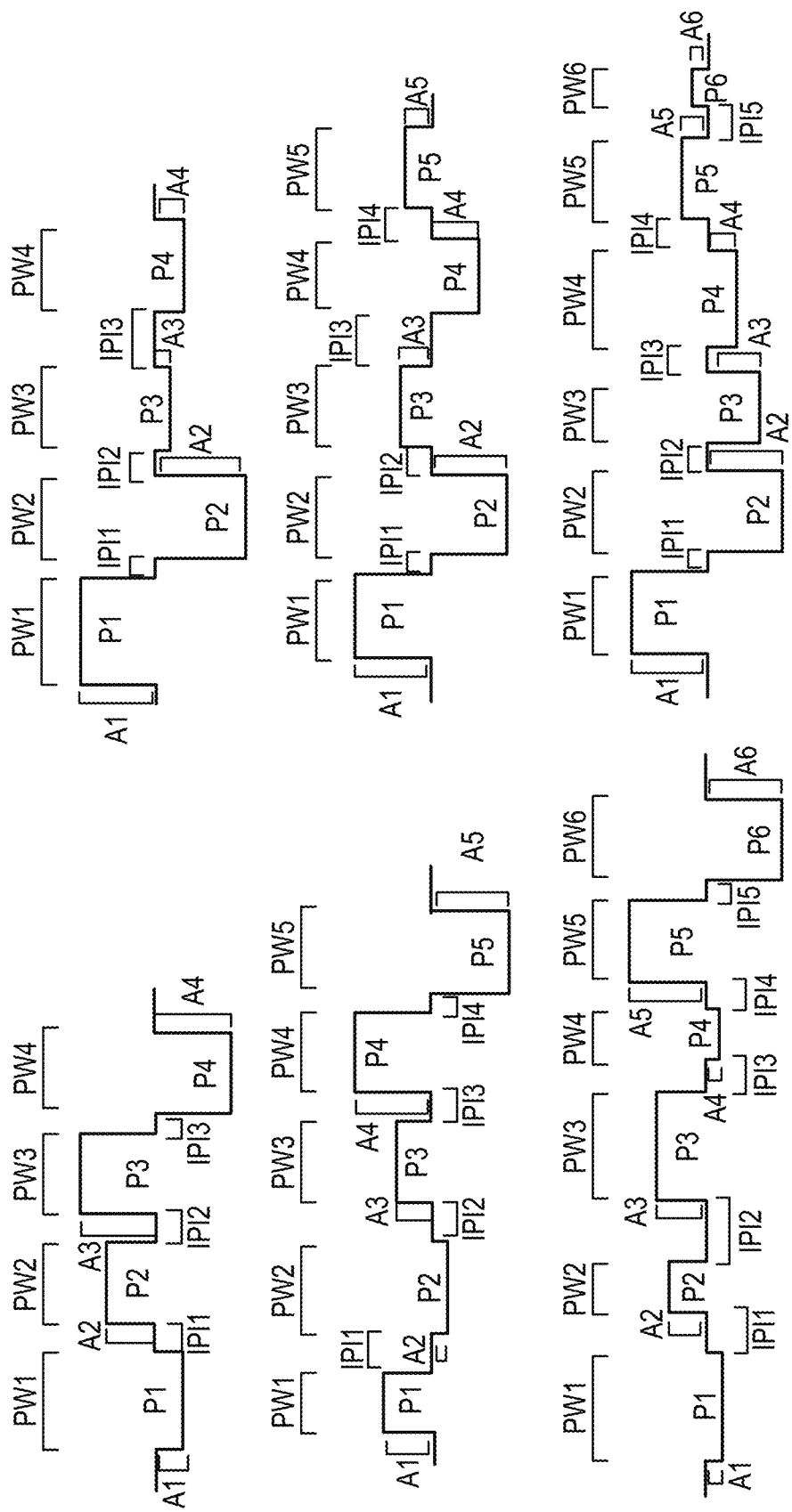
Figure 7C:
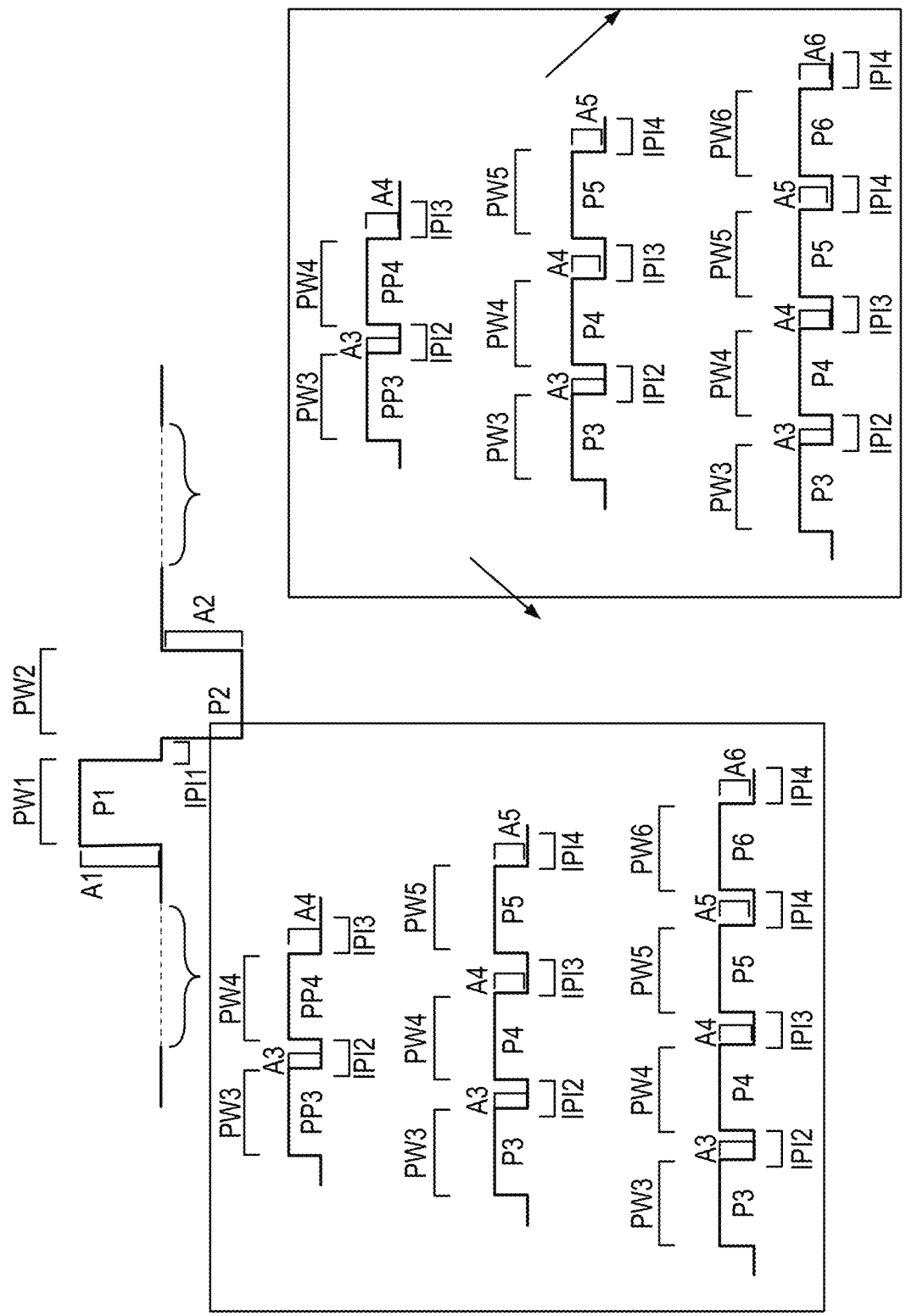

In an embodiment, a biphasic, charge-balanced pulse may be generated for tissue stimulation, however, non-limiting examples of alternative stimulus waveforms may include the use of a pre-pulse to increase the excitability of the target fiber(s) and/or decrease the excitability of the non-target fiber(s) to enable activation of a sufficient number of target fibers. The neurostimulation pulse(s) used to selectively activate, inactivate, deactivate, preemptively inactivate, preemptively deactivate, and/or preemptively prime for activation of target fibers (e.g., activation targets and/or deactivation targets) and/or avoid or prevent unwanted activation, deactivation, inactivation, and/or blocking of off-target fibers (e.g., bystander fibers, or fibers that may provide beneficial function, action, service, and/or utility and are not intended to be activated, inactivated, deactivated, preemptively inactivated, preemptively deactivated, and/or preemptively primed for activation) may be monophasic (e.g., anodic or cathodic), biphasic, and/or multi-phasic (FIG. 7). FIGS. 7A to C show non-limiting examples of schematic representations of waveform shapes, including one, two, three, four, or more pre-pulses; one, two three, four, or more post-pulses; one or more primary depolarizing pulses; and/or one or more charge balancing pulses, each pulse having amplitude A (e.g., A1, A2, A3, etc.), pulse width PW (e.g., PW1, PW2, PW3, etc.), and separated by interpulse interval IP (e.g., IP1, IP2, IP3, etc.).

In the case of the biphasic or multi-phasic pulse, the pulse may be symmetrical or asymmetrical, balanced or unbalanced. Its shape may be rectangular, triangular, curved, sinusoidal, sawtoothed, exponential, and/or other shaped waveforms or a combination of rectangular, triangular, curved, sinusoidal, sawtoothed, exponential, and/or other shaped waveforms. The pulse duration or pulse width of each phase may range from between e.g., about 0.1 µsec. to about 1.0 sec. and every 0.1 µsec. therebetween, as non-limiting examples. Changes in the pulse duration or pulse width of each phase may change the effect or perception of the stimulation, comfort of the sensations from stimulation, or location of sensations from the stimulation that are sensed, described, or reported by the patient. In an embodiment, an asymmetrical biphasic pulse train with a rectangular cathodic and exponentially decaying anodic phase is used to stimulate the target peripheral nerve with a pulse duration (or width) optimally tuned to selectively activate a sufficient number of target fibers, and non-limiting examples of alternative stimulus waveforms may include the use of one or more pre-pulses (e.g., pulses that occur before the primary depolarizing or activating pulse of the waveform and may prime for activation, activate, deactivate, inactivate, and/or block one or more populations of fibers) and/or post-pulses (e.g., pulses that occur after the primary depolarizing or activating pulse of the waveform and may prevent, arrest, or stop activation, activate, deactivate, inactivate, and/or block one or more populations of fibers) to enable activation of a sufficient number of target fibers and/or deactivation of non-target fibers and/or while avoiding activation of non-target fibers and/or off-target fibers and/or avoiding and/or preventing unwanted effects in off-target fibers (see FIGS. 21-26).

The waveform may consist of monophasic (anodic or cathodic), biphasic, and/or multi-phasic pulses, multiple phases of pulses, and/or one or more pre-pulses and/or post-pulses. The multiple phases of pulses may be used to condition or pre-condition the fibers and/or select populations or sets of specific fibers within the same peripheral nerve to achieve the desired and optimized response or effect. In a non-limiting example, multiphasic waveforms may consist of a primary rectangular depolarizing pulse with amplitude and pulse width optimized to activate large diameter fibers without activating small diameter fibers. In a non-limiting example, the depolarizing phase may be a cathodic (or anodic) pulse preceded or followed by an anodic (or cathodic) charge balanced pulse (or phase) that is symmetrical (i.e., the same size, shape, duration, width, amplitude, etc., but with the same or inverse (or opposite (e.g., negative or positive)) polarity as the depolarizing phase), or is a different size, shape, duration, width, amplitude, etc., and may (or may not) achieve charge balance (e.g., a shorter, wider rectangular anodic (or cathodic) pulse with less amplitude and larger or longer pulse duration, a taller, more narrow rectangular anodic (or cathodic) pulse with more amplitude and shorter or smaller pulse duration, or an exponentially decaying anodic pulse, etc.). The depolarizing phase may also be preceded by one or more pre-pulses and/or followed by one or more post-pulses that alter the excitability of select or specific fibers in the nerve while avoiding altering the excitability of other select or specific fibers, for example, increasing the excitability of the activation targets and/or decreasing the excitability of the deactivation targets while avoiding unwanted effects (e.g., activation, deactivation, inactivation, or block) of off-target or bystander fibers (FIGS. 21-24).

Figures 22A, 22B:
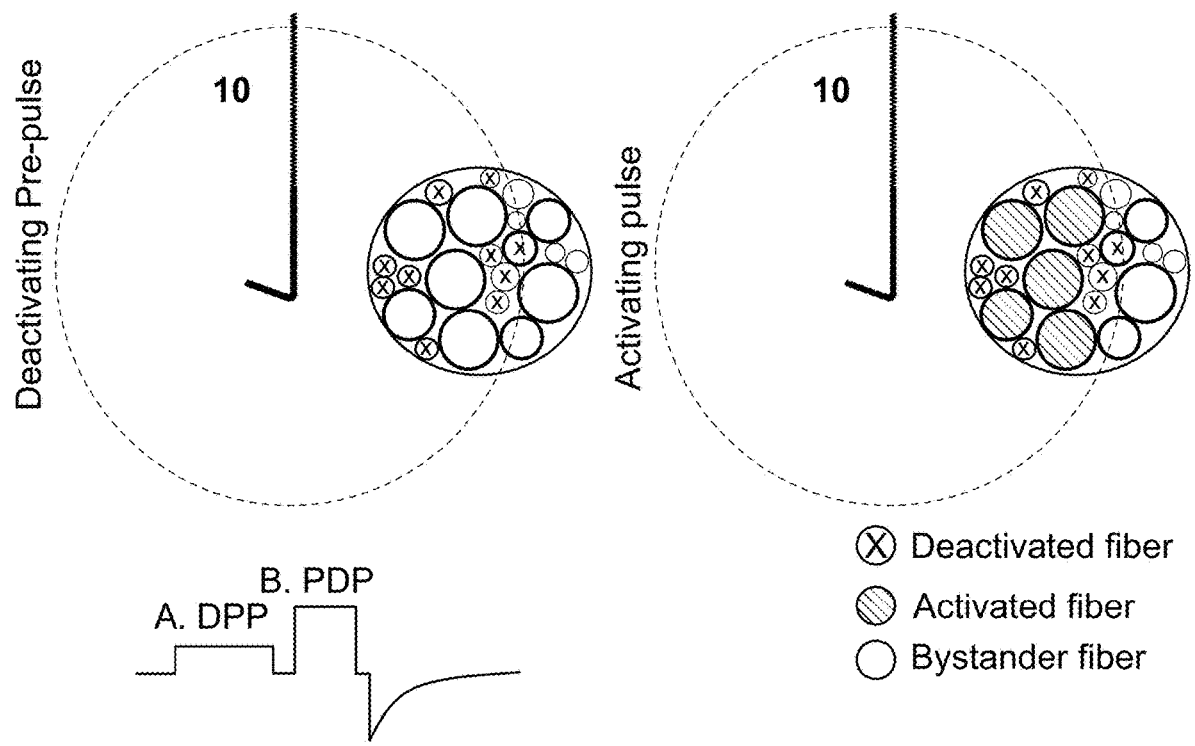
FIGS. 22A and 22B are representations of a target nerve undergoing stimulation with a waveform consisting of a subthreshold depolarizing pre-pulse (DPP) that deactivate non-target fibers, followed by a primary depolarizing stimulation pulse (PDP) that activates target fibers in the target nerve without activating bystander fibers.
Figure 25:
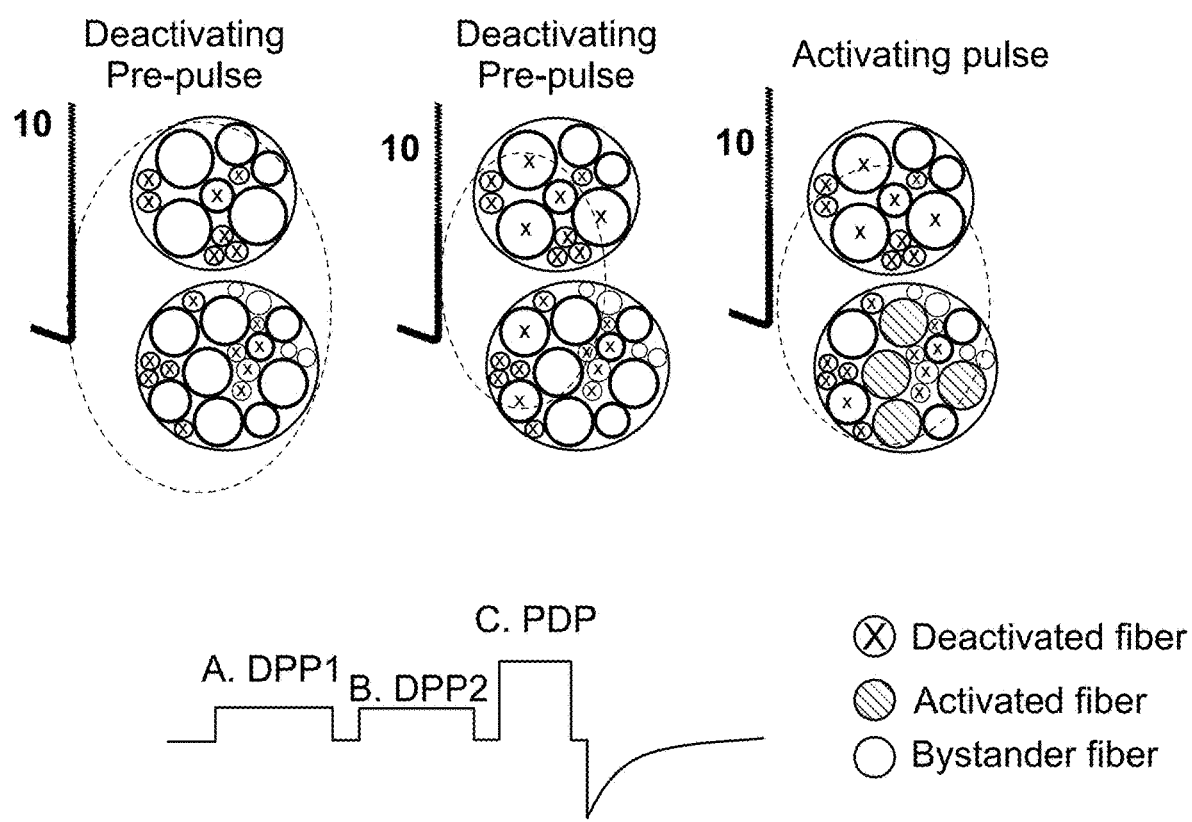
FIG. 25 is representation of a target nerve undergoing stimulation with a waveform consisting of a two subthreshold depolarizing pre-pulse (DPP) that deactivate non-target fibers, followed by a primary depolarizing stimulation pulse (PDP) that activates target fibers in the target nerve farther away from the electrode without activating bystander fibers.
Figure 26:
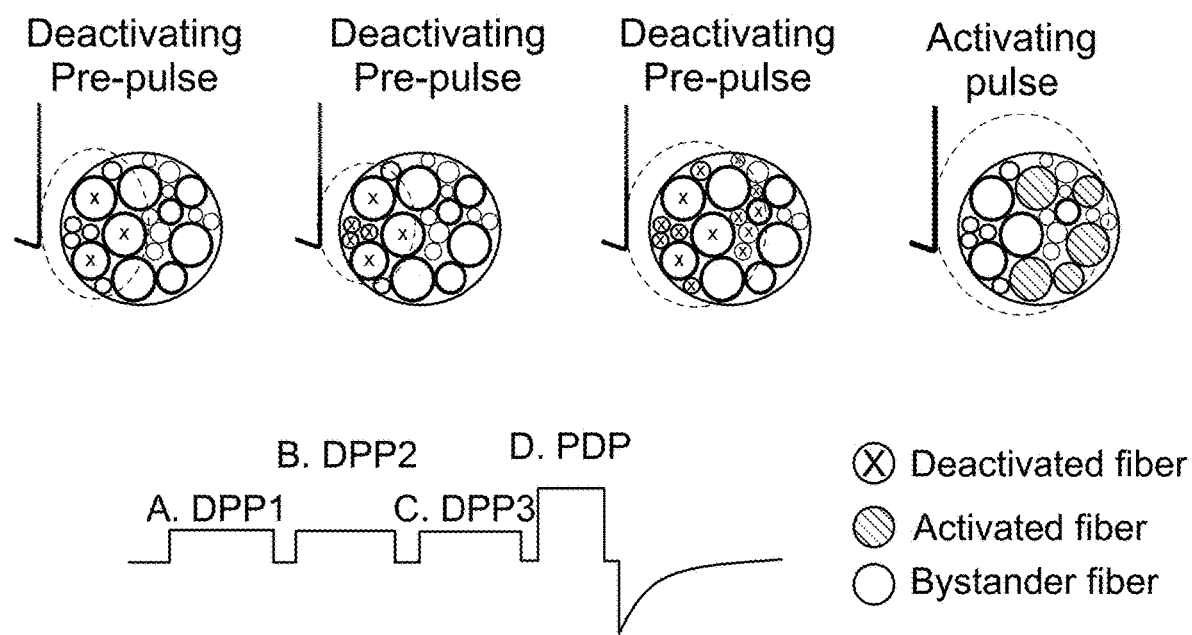
FIG. 26 is representation of a target nerve undergoing stimulation with a waveform consisting of a three subthreshold depolarizing pre-pulse (DPP) that deactivate non-target fibers, followed by a primary depolarizing stimulation pulse (PDP) that activates target fibers in the target nerve farther away from the electrode without activating bystander fibers.
Figure 27A:
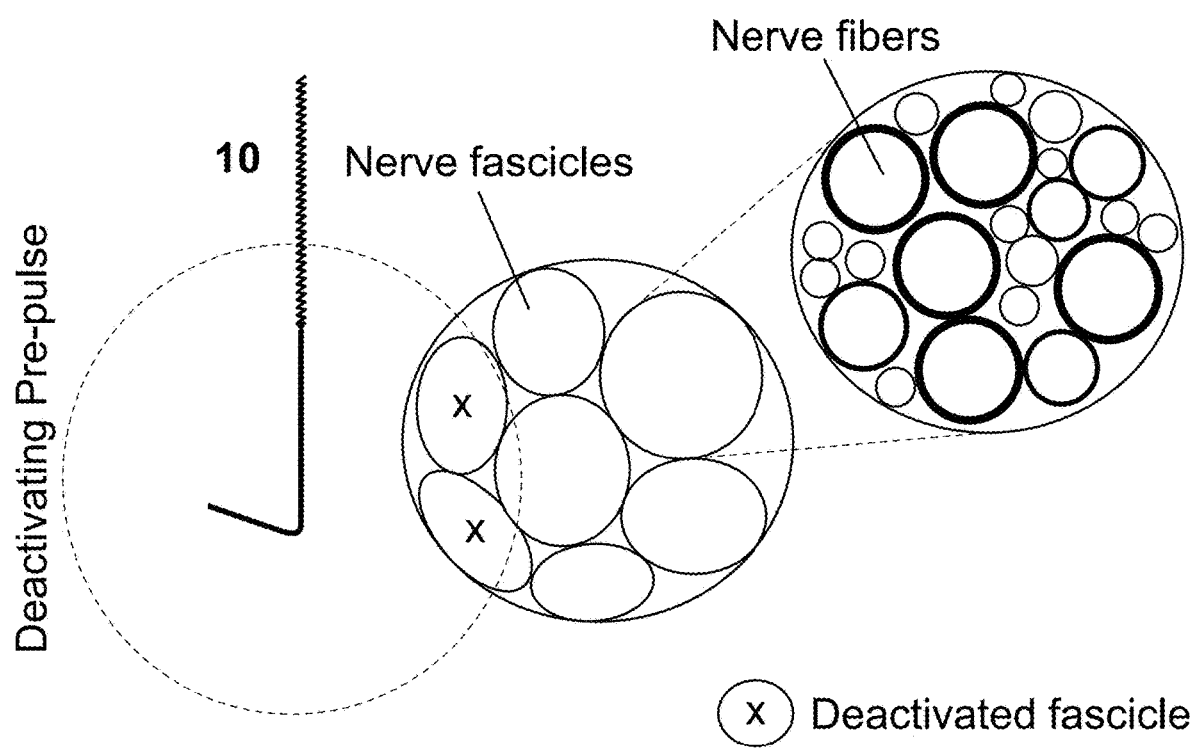
FIGS. 27A and 27B are representative views of electrodes that can form part of a peripheral nerve stimulation system to deliver activating pre-pulses that deactivate certain non-target fascicles within the target nerve without deactivating other target fascicles.
Figure 27B:
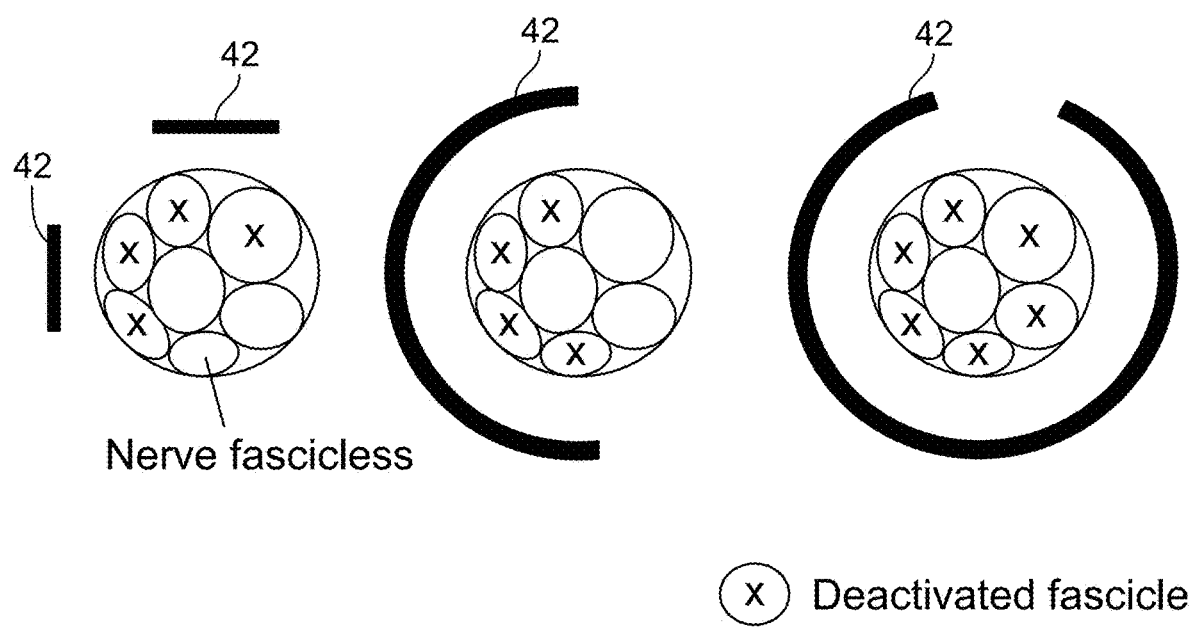

FIGS. 21A and 21B are representations of a target nerve undergoing stimulation with a waveform consisting of a subthreshold depolarizing pre-pulse (DPP) that deactivates fibers that are nearest to the electrode, followed by a primary depolarizing stimulation pulse (PDP) that activates fibers in the target nerve farther away from the electrode without activating the fibers nearest to the electrode. FIGS. 22A and 22B are representations of a target nerve undergoing stimulation with a waveform consisting of a subthreshold depolarizing pre-pulse (DPP) that deactivate non-target fibers, followed by a primary depolarizing stimulation pulse (PDP) that activates target fibers in the target nerve without activating bystander fibers. FIGS. 23A and 23B are representations of a target nerve undergoing stimulation with a waveform consisting of a subthreshold depolarizing pre-pulse (DPP) that deactivate non-target fibers, followed by a primary depolarizing stimulation pulse (PDP) that activates target fibers in the target nerve without activating bystander fibers. FIGS. 24A and 24B are representations of a target nerve undergoing stimulation with a waveform consisting of a subthreshold depolarizing pre-pulse (DPP) that deactivate non-target fibers, followed by a primary depolarizing stimulation pulse (PDP) that activates target fibers in the target nerve without activating bystander fibers in a different nerve. FIG. 25 is representation of a target nerve undergoing stimulation with a waveform consisting of a two subthreshold depolarizing pre-pulse (DPP) that deactivate non-target fibers, followed by a primary depolarizing stimulation pulse (PDP) that activates target fibers in the target nerve farther away from the electrode without activating bystander fibers. FIG. 26 is representation of a target nerve undergoing stimulation with a waveform consisting of a three subthreshold depolarizing pre-pulse (DPP) that deactivate non-target fibers, followed by a primary depolarizing stimulation pulse (PDP) that activates target fibers in the target nerve farther away from the electrode without activating bystander fibers. FIGS. 27A and 27B are representative views of electrodes, including stimulating electrodes 42, which can form part of a peripheral nerve stimulation system to deliver activating pre-pulses that deactivate certain non-target fascicles within the target nerve without deactivating other target fascicles.

In an embodiment, the present system may increase the likelihood, potential, or probability that the activation target fibers will be selectively or preferentially activated; decrease the likelihood, potential, or probability that the deactivation target fibers will be selectively or preferentially activated; and/or increase the likelihood, potential, or probability that the deactivation target fibers will be selectively or preferentially inactivated or deactivated to prevent or avoid deactivation target fiber activation in the same peripheral nerve or nerve trunk or nerve branch by using conditioning or pre-conditioning stimulation (e.g., one or more pre-pulses) to open selectively the h-gates of the activation target fibers while closing selectively the h-gates of the deactivation target fibers by using a tuned set of stimulation parameters (e.g., pulse amplitude, duration, polarity, pulse timing, etc.) to cause a sufficient number or proportion of h-gates to be or remain open in the activation target fibers and be or remain closed in the deactivation target fibers leading up to, during or throughout the delivery and/or duration of the activating or primary pulse(s) or depolarizing phase of the stimulation pulse or waveform (see FIG. 6). In a non-limiting example, the system may alter the excitability of one set of select or specific fibers in one way, while altering the excitability of a second set of select or specific fibers in a second way, while altering the excitability of a third set of select or specific fibers in a third way, while altering the excitability of another or other set(s) (such as three, four, five, six, seven, or more) of select or specific fibers in a another or other way(s), which enables the system to optimize the overall net effect and response. In a non-limiting example, the excitability of one set of (e.g., deactivation target) fibers (e.g. a first set of peripheral nerve fibers) may be decreased by delivering one or more subthreshold pre-pulse(s) and/or post-pulses that depolarizes (e.g., partially but not completely depolarizes, or subthreshold depolarizes, and does not activate) the fibers to increase the probability that the sodium channels in those select fibers are inactivated by closure of the h-gates, preventing, reducing, attenuating, and/or avoiding the unwanted and undesired (or undesirable) activation or generation of action potential(s) in one set (e.g., a first set) of peripheral nerve fibers (see FIGS. 21-24). Excitability of another set (e.g., activation target) fibers (e.g., a second set of peripheral nerve fibers in the same peripheral nerve) may be increased by delivering one or more subthreshold pre-pulse(s) and/or post-pulses that polarizes (or hyperpolarizes) the fibers to increase the probability that the sodium channels are activated and/or opened by the opening of the h-gates, enabling, facilitating, causing, increasing, augmenting, and/or leading to the wanted, desired, or desirable activation or generation of action potential(s) in another set (e.g., a second set, third set, fourth set, etc.) of peripheral nerve fibers (FIGS. 21-24).

The waveform(s) may consist of one or more depolarizing pre-pulses and/or post-pulses (e.g., increases the membrane potential such that the axon is more likely to fire an action potential upon stimulation or such that the axon requires less additional depolarization to fire an action potential compared to its resting state), one or more hyperpolarizing pre-pulses and/or post-pulses (e.g., decreases the membrane potential such that the axon is less likely to fire an action potential upon stimulation or such that the axon requires more depolarization to fire an action potential compared to its resting state), or a combination of one or more depolarizing and hyperpolarizing pre-pulses and/or post-pulses such that the excitability of one or more set or specific group of fibers is selectively increased and/or selectively decreased (see FIGS. 7, 25, 26). The one or more pre-pulses may have the same or different amplitudes and pulse widths, such that the pre-pulses are the same amplitude and/or pulse width and/or different sizes in one or more parameters (e.g., one pulse is taller and wider, shorter and wider, taller and narrower, shorter and narrower than another pre-pulse or another pulse in the waveform (e.g., a post-pulse or primary depolarizing or charge balancing pulse)) (FIG. 7). Similarly the one or more post-pulses may have the same or different amplitudes and pulse widths, such that the pre-pulses are the same amplitude and/or pulse width and/or different sizes in one or more parameters (e.g., one pulse is taller and wider, shorter and wider, taller and narrower, shorter and narrower than another post-pulse or another pulse in the waveform (e.g., a pre-pulse or primary depolarizing or charge balancing pulse)) (see FIG. 7). Each pre-pulse and post-pulse may be defined by one or more stimulation parameters including amplitude (e.g., 0.1 mA, 0.2 mA, 0.3 mA, 0.5 mA, 1 mA, 0.01-1 mA, 0.1-2 mA, 0.1-5 mA, 1-3 mA, 1-30 mA), pulse duration (e.g., 0.1 μs, 1 μs, 2 μs, 5 μs, 10 μs, 0.01-1 μs, 0.01-3 μs, 0.1-5 μs, 0.1-10 μs, 0.1-50 μs, 1-150 μs, 1-200 μs, 50-200 μs, 1-1000 μs), and are separated from preceding and subsequent pulses by interpulse intervals (e.g., 0.1 μs, 1 μs, 2 μs, 3 μs, 4 μs, 5 μs, 10 μs, 0.01-1 μs, 0.01-3 μs, 0.1-5 μs, 0.1-10 μs, 0.1-50 μs, 1-150 μs, 1-200 μs, 50-200 μs, 1-1000 μs). The system accounts for achieving maximal or optimal activation of target fibers and maximal or optimal avoidance of activation and/or deactivation of non-target fibers while taking into account the time constants of the h and m gates governing activation and deactivation of nerve fibers, and the interpulse intervals and pulse widths are selected such that targets for deactivation are deactivated (e.g., have not returned to baseline) during the activation of target fibers. In a non-limiting example, a depolarizing pre-pulse may be delivered to deactivate non-target fibers by closing the h-gates with defined or expected time constant or deactivation period (e.g., 0.1 ms, 0.2 ms, 0.5 ms, 1.0 ms, 0.1-2 ms), and the pre-pulse may be followed by an interpulse interval, one or more additional pre-pulses and interpulse intervals to deactivate additional non-target fiber(s), and a primary activating pulse that is delivered to activate target fibers, and the primary activating pulse is delivered within the time constant or deactivation period of the one or more non-target fiber(s) such that all the deactivated non-target fiber(s) remain deactivated at time of delivery of the primary activating pulse. Additionally, the relative excitability, inexcitability and/or levels of activation, inactivation, and/or deactivation may be adjusted and optimized by the present system to achieve the desired, wanted, or optimal response both in the near term (e.g. during stimulation, therapy, and/or treatment) and in the long term (e.g. after stimulation, therapy, and/or treatment) to maximize pain relief (e.g., relief from chronic pain or background pain) while avoiding stimulation induced or evoked pain or unwanted responses, such as unwanted muscle contraction or activation, and while enabling, facilitating, not preventing, or not blocking beneficial functions of the nerve, including beneficial acute, transient, and/or nociceptive pain or sensations that may serve as a warning of real, perceived, or potential tissue damage, injury, or danger.

The present system uses waveforms that enable the selective activation of target fibers (e.g., large diameter sensory fibers, A-alpha and/or A-beta fibers, and/or Type Ia, Ib, and/or II fibers) while avoiding activation of non-target fibers (e.g., small diameter sensory and/or opain fibers, C and/or A-delta fibers, and/or Type III and/or IV fibers) when stimulating electrode(s) are not placed far away or distant from the nerve, such as non-limiting examples in which the electrode(s) are placed in anatomical locations without sufficient surrounding tissue to enable placement distant from the nerve, the stimulating electrode(s) must be placed quickly without time to confirm placement distant from the nerve, the electrode(s) are placed by a physician with less experience or training in the placement of electrode(s) distant from the nerve, or imaging (e.g., ultrasound or fluoroscopy) is unavailable or image quality is poor so as to prevent visualization of the electrode(s) to confirm placement distant from the nerve, whereas previous systems and methods were unable to selectively and preferentially activate target fibers independent of distance from the nerve and required placement of the electrode remote from the target nerve to avoid activation of non-target fibers, preventing previous systems and methods from producing a desired, wanted, or optimal response in situations where the distance from the nerve cannot be confirmed or remote placement is not possible. In an embodiment the present system overcomes the challenges, barriers, and limitations of previous systems by selectively and preferentially activating target fibers (e.g., large diameter fibers) while deactivating or avoiding unwanted activation of non-target fibers (e.g. small or smaller diameter fibers) in the same peripheral nerve independent of distance of the electrode(s) from the nerve (e.g., the same peripheral nerve) by using depolarizing pre-pulses to deactivate nerve fibers that are near or very near or relatively close (or closer) to the electrode location (e.g., those that are most proximal, adjacent to, are <1 mm, <2 mm, <3 mm, <5 mm, <10 mm, etc., from the electrode) prior to delivery of the primary depolarizing stimulating pulse at an amplitude and/or pulse duration or width sufficient to selectively activate large diameter fibers throughout the nerve or in the remaining parts of the nerve that were not deactivated by the pre-conditioning pulse (e.g., in which the pre-conditioning pulse was designed, selected, and/or optimized to avoid deactivation or inactivation of the target fibers), achieving the goal of activating a sufficient number of target or large diameter fibers while avoiding activation of the non-target or small diameter fibers that previously limited electrode placement near, adjacent to, or touching the target nerve (e.g., <1 mm, <2 mm, <3 mm, <5 mm, <10 mm distant).

The devices, systems, methods, and instructions for use of devices, systems, and methods include waveforms and electrodes for stimulation of the target nerve(s) that consist of multiphasic pulses that enable selective activation of target fibers in one or more target fascicles (e.g., fascicles that innervate or partially innervate the region of pain) to selectively activate one or more target fibers or fiber populations within the target fascicles while avoiding activation of one or more second non-target fibers or fiber populations within the target fascicles and avoiding activation of fibers in one or more non-target fascicles, producing activation of a sufficient number or proportion, large number or proportion, or majority of the target fibers or fiber populations (e.g., in a non-limiting example, large diameter sensory fibers innervating the region of pain) that produces changes in the central nervous system (e.g., spinal cord, brain, etc.) that produce and sustain long term relief of chronic and/or background pain more effectively than previous systems and methods (FIG. 27). The present system overcomes the limitations of previous systems by selectively activating target fibers that innervate the region of pain while minimizing or eliminating the activation of target fibers innervating other anatomical structures or regions (e.g., because non-painful, physiological signals produced by stimulation of target nerves are most effective at producing sustained pain relief when focal and specific to the region of pain) by employing, in a non-limiting example, waveforms and electrodes that enable selective activation of target fibers in certain fascicles within the target nerve, such as the fascicles that innervate the region of pain, without activating all fascicles, fibers, or fibers within fascicles, such as those that do not innervate the region of pain (FIG. 27).

In a non-limiting example, if a target fascicle lies on the perimeter of the nerve (i.e., on the outside of the nerve adjacent to the external boundary of the nerve) the electrode is placed on that side of the nerve to preferentially stimulate the aspect of the nerve containing the target fascicle (FIG. 27A). In a non-limiting example, the electrode may be placed near the lateral, medial, superficial, deep, anterior, posterior, anterolateral, anteromedial, posterolateral, posteromedial, etc., of the target nerve to preferentially activate target fibers in one or more target fascicles that lie on the same, opposite, or different side of the nerve while deactivating or inactivating fibers in one or more non-target fascicles that lie in other locations in the nerve (e.g., adjacent to, opposite, remote from, near, or far from the target fascicles, and/or in between the electrode(s) and the target fascicles or fibers). Previous systems and methods were not designed to specifically or selectively activate target fibers innervating the region of pain, whereas the present system uses waveforms and electrodes that enable activation of fibers and fascicles that innervate the region of pain to produce focal, localized, and/or concentrated non-painful sensory information originating and/or being perceived to originate from the region of pain that produces sustained relief of chronic or background pain by causing, producing, initiating, or provoking beneficial functional plasticity in the somatosensory cortex in the brain. As a non-limiting example, if a target fascicle lies in the interior of the nerve (e.g., not adjacent to the external boundary of the nerve), a subthreshold depolarizing pre-pulse may be delivered to deactivate or prevent or reduce the likelihood of activation of fibers in non-target fascicles (e.g. non-target fibers) that are on the perimeter of the nerve and lie between the electrode(s) and the target fascicle to enable activation of target fibers in the target fascicle while avoiding activation of, inactivating, or deactivating fibers in the non-target fascicle(s) (FIG. 27A). The pre-pulse is sufficiently strong, large, tall, and/or wide enough to deactivate the fibers in non-target fascicles that are closer to the electrode than the target fascicle(s), while also sufficiently weak, small, short, and/or narrow enough to avoid activating the fibers in the target fascicle(s) before they are intended to be activated (e.g., by a subsequent pulse in the waveform, such as a primary activating or depolarizing pulse). The pre-pulse may be separated from the primary depolarizing pulse by an increment of time (e.g., 0.001 µs, 0.1 µs, 0.5 µs, 1 µs, 10 µs, 0.001-1 µs, 0.01-5 µs, 0.1-10 µs, 1-10 µs, 1-100 µs, 1-1000 µs, 1-100,000) shorter than the recovery period of the deactivated fibers such that the non-target fibers are still deactivated when the primary depolarizing pulse is delivered. After the pre-pulse, the primary depolarizing (e.g., cathodic or anodic depolarizing) pulse is delivered to activate the target fiber(s) in the interior of the nerve in the target fascicle(s) using the stimulation parameters (e.g., amplitude and/or pulse width) that are optimally tuned to activate target fiber(s) in the target fascicle(s) (e.g., large diameter sensory fibers) without activating non-target fibers (e.g., small diameter pain fibers) in the target fascicle(s). In a non-limiting example, the system may be used to activate large diameter fibers in one fascicle (e.g., the target fascicle) while avoiding activation of and/or deactivating large diameter fibers in a second fascicle (e.g., the non-target fascicle), and the waveform may include pre-pulses with amplitudes that are below the activation threshold of large diameter fibers in the second fascicle that are intended to be deactivated so as to remain sub-threshold (e.g., depolarize without activating), and of sufficient pulse duration to deactivate the large diameter fibers in the second fascicle independent of electrode distance from the nerve, and the waveform may then include subsequent pulse(s) within a relevant time after the pre-pulse(s) that activate the large diameter fibers in the first fascicle without activating large diameter fibers in the second fascicle because they remain deactivated. The present systems and methods overcome limitations of previous systems and enable selective activation of large diameter fibers even at distances that may or may not be far or remote from the nerve while also enabling specific and/or preferential and/or selective activation of target fibers that innervate the region of pain. The prepulse waveforms may provide a method to selectively stimulate while being closer to the nerve than some of the systems and/or methods described previously.

It is to be appreciated that the present system, in a non-limiting example of an embodiment, is different from and overcomes limitations of previous systems, devices, and or methods that use constant, variable, or varying high frequency stimulation (e.g., up to 1,000; 1,200; 1,300; 1,400; 1,500; 2,000; 5,000; 10,000; 20,000; 50,000, 100,000 Hz; and frequencies greater than 100,000 Hz). Although the present system can use or can be used in combination with high frequencies of stimulation (e.g., up to 1,000; 1,200; 1,300; 1,400; 1,500; 2,000; 5,000; 10,000; 20,000; 50,000, 100,000 Hz; and frequencies greater than 100,000 Hz), the mechanism, method, device, system, parameters, and/or configuration through which the present system achieves its effect in an embodiment is different from the mechanism, method, device, system, parameters, and/or configuration through which a constant, variable, or varying high frequency stimulation (e.g., up to 1,000; 1,200; 1,300; 1,400; 1,500; 2,000; 5,000; 10,000; 20,000; 50,000, 100,000 Hz; and frequencies greater than 100,000 Hz) operates or has its effect.

A non-limiting example of how the present system is different from high frequency stimulation (e.g., over 1000 Hz) is that high frequency stimulation is not designed, intended, and/or delivered to produce regular, consistent, or recurring action potentials in a nerve fiber (e.g., a high frequency pulse train may produce a short-term (e.g., 10 ms, 50 ms, 100 ms, 500 ms, 1 s, 10 s, or more than 10 s) onset response or burst of 2, 3, 4, 5, 10, 50, or more action potentials when the pulse train is initiated but does not produce a regular, irregular, stochastic, random, or bursting series of action potentials after the end of the onset response, such that a certain number of stimulus pulses (e.g., 2, 3, 5, or 10 stimulus pulses) during delivery of a high frequency pulse train after the onset response has ended would not be delivered with the intent of or expected to produce a corresponding number or approximate number of 2, 3, 5, or 10 action potentials in a nerve fiber). But, the present system can produce desirable effects that cannot be produced with high frequency stimulation and it can produce desirable effects in a way or method and with a system(s), device(s), parameter(s), and/or configuration that is different from that of high frequency stimulation. While the present system may employ multiple pulses, pre-pulse(s), and/or post-pulses that could be delivered in groups, sets, waves, multiples, waveforms, bursts, etc. that do not and are not required to each produce a corresponding action potential in the target peripheral nerve fiber(s), the pulses, pre-pulse(s), post-pulse(s), conditioning, and/or pre-conditioning stimulation are designed, intended, and delivered to generate or not generate action potentials in the target, non-target, and/or off-target nerve fibers at any time during the delivery of the pulse train (e.g., not limited or confined to a short-term onset response) in the same (or different) peripheral nerve at the same (or different) location along the nerve(s) and may furthermore control the timing of the action potential(s). In contrast to high frequency stimulation in which each pulse in the pulse train (e.g., following the end of the short-term onset period) does not generate a corresponding action potential such that no action potentials are produced by a series of multiple pulses, the present system is designed to deliver a group (or set, wave, multiple, waveform, burst, etc.) of pulses, pre-pulse(s), post-pulse(s) (or conditioning and/or pre-conditioning stimulation) such that each group of pulses produces, needs to, or is designed to produce one or more action potential within a single given nerve fiber within a nerve or nerve bundle per group while avoiding action potential(s) in other non-target or off-target nerve fibers. It is to be appreciated that a nerve or nerve bundle will typically have or encompass multiple or many nerve fibers within it (including targets for activation, targets for deactivation or inactivation, and/or off target nerve fibers) and the present system will evoke or cause action potentials in multiple target fibers (e.g. preferentially and in a sufficient number, proportion, or ratio of target fibers) and each of the target fibers that are stimulated or activated (e.g., in which an action potential is evoked by stimulation) will or may desirably have one or more action potential evoked per group of stimulation pulses and/or per primary (activating or stimulating) pulse per group of pulses and the other non-primary (non-activating or non-stimulating) pulses (e.g., the pre-pulse(s) and/or post-pulse(s)) will not generate or will avoid generating action potentials in the target fiber (e.g., in the same target nerve fiber) and will or may desirably condition the activation target, deactivation target, and/or off target fibers to increase or decrease their response to the primary pulse(s) (e.g., and increase or decrease the potential, probability, or likelihood that action potentials will be generated). In a non-limiting example of the present system, there may a group of primary pulse(s) and non-primary pulses (e.g., pre-pulse(s) and/or post-pulse(s)) that occur or are generated or delivered before and/or after the primary pulse(s) and the same, similar or different groups of primary pulse(s) and non-primary pulse(s) may be delivered with a regular, constant, irregular, nonconstant, varying, stochastic, random, or variable frequency, and the primary pulse(s) generate action potentials in the target fibers while the non-primary pulse(s) in the same group prevent the primary pulse(s) from having unwanted (undesirable and/or untoward) effects (e.g., in the non-target fiber(s) and/or off target fiber(s)) and/or enable, enhance, augment, and/or facilitate the primary pulse(s) to have or in having wanted (desirable and/or beneficial) effects (e.g., in the target fiber(s)), such that unwanted activation in non-target or off-target fiber(s) that would have been caused by the primary pulse(s) is avoided or prevented and/or wanted activation in target fiber(s) that would have otherwise not have been possible, caused, enabled, and/or evoked is now possible, caused, enabled, and/or evoked, enabling greater, more or more reliable activation of target fiber(s) while more reliably avoiding or preventing activation or unwanted changes of activation level of non-target and/or off-target fiber(s).

It is also to be appreciated that the present system, in a non-limiting example of an embodiment, may deliver stimulation, stimulus pulse(s), pre-pulse(s), and/or post-pulse(s), and/or groups, sets, waves, multiples, waveforms of pulse(s), pre-pulse(s), and/or post-pulse(s) in bursts, and it can be delivered in a way that is beneficially different from and advantageous relative to systems and methods (e.g., of the prior art) that use conventional burst stimulation. In a non-limiting example of an embodiment, the present system is or can be configured to deliver a pre-pulse(s), a post-pulse(s), a set or series of pre-pulse(s) and/or post-pulse(s), conditioning and/or preconditioning pulses and/or stimulation. The overall and/or instantaneous frequency does not need to be constant and/or can achieve an improved or better effect if it is not constant. The time or timing between the pulses (e.g. the pre-pulse(s), the primary pulse, and/or the post-pulse(s)) is different and/or can be desirably different from the timing between the pulses in the next, corresponding, or other set of pulses (e.g. the pre-pulse(s), the primary pulse, and/or the-post-pulse(s) in the next wave or set of pulses). The present system may deliver pulses or waveform shapes, including non-zero amplitude and multiple amplitude shapes and/or pulses in groups, sets, waves, multiples, waveforms, etc. and the groups, sets, waves, multiples, waveforms, etc., may be delivered in a way that is repeating, rhythmic, regular, irregular, non-rhythmic, with a constant, variable, and/or varying frequency.

The present system can produce desirable effects that cannot be produced with conventional burst stimulation and it can produce desirable effects in a way or method and with a system(s), device(s), parameter(s), and/or configuration that is different from that of conventional burst stimulation. While the present system may employ multiple pulses, pre-pulse(s), and/or post-pulses that could be delivered in groups, sets, waves, multiples, waveforms, bursts, etc., they do not and are not required to (e.g., and desirably should not) each produce a corresponding action potential in the target peripheral nerve fiber. Some aspects of the pulses, pre-pulse(s), post-pulse(s), conditioning, and/or pre-conditioning stimulation may be designed, intended, and delivered to do the opposite and/or avoid generation of action potentials in the target, non-target, and/or off-target nerve fibers in the same (or different) peripheral nerve at the same (or different) location along the nerve(s) and may furthermore control the timing of the action potential(s). In contrast to conventional burst stimulation in which each pulse in the burst can generate a corresponding action potential such that a burst of multiple pulses would produce the same number of action potentials (e.g., a burst of 4 pulses would produce 4 action potentials and 5 pulses would produce 5 action potentials within a single given nerve fiber within a nerve or nerve bundle). The present system is designed to deliver a group (or set, wave, multiple, waveform, burst, etc.) of pulses, pre-pulse(s), post-pulse(s) (or conditioning and/or pre-conditioning stimulation) such that each group of pulses only produces, needs to, or is designed to produce one action potential within a single given nerve fiber within a nerve or nerve bundle per group while avoiding action potential(s) in other non-target or off-target nerve fibers. It is to be appreciated that a nerve or nerve bundle will typically have or encompass multiple or many nerve fibers within it (including targets for activation, targets for deactivation or inactivation, and/or off target nerve fibers) and the present system will evoke or cause action potentials in multiple target fibers (e.g. preferentially and in a sufficient number, proportion, or ratio of target fibers) and each of the target fibers that are stimulated or activated (e.g., in which an action potential is evoked by stimulation) will or may desirably only have one action potential evoked per group of stimulation pulses and/or per primary (activating or stimulating) pulse per group of pulses and the other non-primary (non-activating or non-stimulating) pulses (e.g., the pre-pulse(s) and/or post-pulse(s)) will not generate or will avoid generating action potentials in the target fiber (e.g., in the same target nerve fiber) and will or may desirably condition the activation target, deactivation target, and/or off target fibers to increase or decrease their response to the primary pulse(s) (e.g., and increase or decrease the potential, probability, or likelihood that action potentials will be generated). In a non-limiting example of the present system, there may a group of primary pulse(s) and non-primary pulses (e.g., pre-pulse(s) and/or post-pulse(s)) that occur or are generated or delivered before and/or after the primary pulse(s) and the same, similar or different groups of primary pulse(s) and non-primary pulse(s) may be delivered with a regular, constant, irregular, nonconstant, varying, stochastic, random, or variable frequency, and the primary pulse(s) generate action potentials in the target fibers while the non-primary pulse(s) in the same group prevent the primary pulse(s) from having unwanted (undesirable and/or untoward) effects (e.g., in the non-target fiber(s) and/or off target fiber(s)) and/or enable, enhance, augment, and/or facilitate the primary pulse(s) to have or in having wanted (desirable and/or beneficial) effects (e.g., in the target fiber(s)), such that unwanted activation in non-target or off-target fiber(s) that would have been caused by the primary pulse(s) is avoided or prevented and/or wanted activation in target fiber(s) that would have otherwise not have been possible, caused, enabled, and/or evoked is now possible, caused, enabled, and/or evoked, enabling greater, more or more reliable activation of target fiber(s) while more reliably avoiding or preventing activation or unwanted changes of activation level of non-target and/or off-target fiber(s).

It is to be appreciated that in a non-limiting example of an embodiment, the present system overcomes challenges of previous and existing neurostimulation (or neuromodulation) systems that can be applied to, used in, or used for spinal cord stimulation (SCS), dorsal root ganglion (DRG) stimulation, and stimulation of the brain (including deep brain stimulation (DBS), cortical stimulation, and/or cortex stimulation) by being designed and adapted specifically for peripheral nerve stimulation (PNS) as there are challenges and opportunities unique to PNS (specific to the present systems and methods of PNS) that are not present or found in the aforementioned stimulation modalities (e.g., SCS, DRG, brain stimulation, etc.). Non-limiting examples of differences include differences in target, non-target, and/or off target nerve fiber(s), their presence and/or absence, their orientation, their organization, and/or the stimulation waveform(s), stimulation parameter(s), and electrode location, placement, positioning, geometry, composition, orientation, system programming, and stimulation methods to control neural activity, stimulate, activation, de-activate, avoid activation of, avoid blocking of, influence, and/or avoid influencing neural activity in the target, non-target, and/or off target nerve fiber(s). Thus, stimulation devices, systems, and methods that are or can be applied in, through, or delivered via a neurostimulation device or system (e.g., a general neurostimulation device) that can be applied in the same or similar way across multiple modalities (e.g., both SCS and PNS, both DRG stimulation and PNS, both DBS and PNS, both SCS and DRG stimulation, or other combinations of aforementioned neurostimulation systems or modalities) cannot achieve the same results as the present system because the current system overcomes challenges, obstacles and barriers unique to achieving the desired results via PNS, enabling it to produce results and outcomes that are unique through the use of systems and methods that are not possible during, with, or in the other modalities (such as SCS, DRG stimulation, DBS, etc.). As a non-limiting example, the present system has the opportunity to selectively or preferentially activate target fiber(s) that neurostimulation systems used to deliver SCS or DRG stimulation cannot activate. Moreover, the present system has the challenge of selectively or preferentially avoiding activation of or avoiding changing the neural activity in non-target and/or off-target fiber(s) that neurostimulation systems used to deliver SCS or DRG stimulation are not designed to overcome. These differences between SCS or DRG stimulation and the present system's features and methods for PNS affect and impact the specifics of stimulation parameters, the timing and characteristics of stimulus pulses, pre-pulses, and post-pulses, stimulation conditioning, electrode geometry, materials, and placement and add further distinction between the present system's features and methods for PNS and neurostimulation and/or neuromodulation systems used for stimulation of the central nervous system, such as SCS, as well as systems used for stimulation of the DRG. As a further example of a distinction of the present system from SCS or DRG stimulation, SCS has also been called dorsal column stimulation because the stimulation during SCS is applied to the dorsal aspect, portion, or side (e.g., the back or posterior side) of the spinal cord, similar in a way to how DRG stimulation applies stimulation to the dorsal (or posterior) root ganglion (e.g., both SCS and DRG apply or deliver stimulation to the dorsal aspect or side). The anatomy is such that the spinal cord nerve fibers are divided or can be categorized anatomically according to their function such that the dorsal aspect contains afferent (sensory) fibers (in the DRG and the dorsal column of the spinal cord) and the ventral aspect or side contains efferent (motor) fibers (which are not located in the DRG or dorsal column of the spinal cord) and thus neurostimulation techniques and devices that deliver stimulation to the spinal cord (e.g., SCS) or the DRG do not (as an example) by virtue of programming or stimulation waveform or parameter set selectively avoid stimulation, activation, deactivation, blocking, etc. of all of the same fiber(s) or fiber type(s) that are in peripheral nerves because not all of those peripheral nerve fiber(s) or peripheral nerve fiber type(s) are present in the dorsal column of the spinal cord or the DRG). On the other hand, the peripheral nerves are not divided and cannot be categorized in the same way because peripheral nerves contain both afferent (sensory) fibers and efferent (motor) fibers (e.g., a given or the same peripheral nerve will or may contain both afferent (sensory) and efferent (motor) fibers). Therefore the present system presents and has created the opportunity and overcomes the challenges of selectively activating and avoiding activation of combination(s) and grouping(s) of target peripheral nerve fiber(s), non-target peripheral nerve fiber(s), and/or off-target peripheral nerve fiber(s) (e.g., which exist and are located alongside of each other within the same peripheral nerve), which do not exist and are not present for existing systems and methods of dorsal column stimulation (e.g., SCS) and/or dorsal root ganglion (DRG) stimulation. As another example, existing neurostimulation systems and methods, such as SCS systems and methods, which may be stimulate the dorsal column (DC) nerve fibers and/or the dorsal root (DR) fibers, which are central nervous system fibers that are located in the dorsal (or posterior) aspect of the spinal cord are different from the present system as DC fibers and DR fibers are not peripheral nerve fibers. In a non-limiting example of an embodiment of the present system, the present system does not stimulate spinal cord nerve fibers directly and avoids stimulating spinal cord nerve fiber(s) (e.g., avoids stimulating, prevents stimulation of, and/or avoids or obviates the need for spinal cord stimulation and/or avoids stimulating, prevents stimulation of DC fibers and/or DR fibers in the spinal cord while also enabling, facilitating, delivering selective and/or preferential stimulation and/or activation of target peripheral nerve fiber(s) and/or fiber type(s); enabling and/or facilitating selective and/or preferential avoidance and/or prevention of stimulation and/or prevention and/or avoidance of activation of non-target peripheral nerve fiber(s) and/or fiber type(s); enabling and/or facilitating selective and/or preferential avoidance and/or prevention of influencing neural activity in off-target (e.g., bystander) peripheral nerve fiber(s) and/or fiber type(s); enabling and/or facilitating selective and/or preferential influencing of neural activity in another type and/or group of target peripheral nerve fiber(s); and/or enabling and/or facilitating preferential avoidance and/or prevention of unwanted, undesirable, inappropriate, detrimental, potentially detrimental, and/or untowards blocking of neural activity in peripheral nerve fiber(s) (e.g., specific peripheral nerve fiber(s) and/or fiber type(s) or group(s)).

In a non-limiting example of an embodiment, the present system overcomes limitations of previous and conventional neurostimulation systems that can be used to deliver SCS, DBS, DRG stimulation, cortical stimulation, and/or PNS but are not specifically designed to overcome the challenges unique to PNS in the way that the present system overcomes challenges unique to PNS. This may include the selection of (and the preferential and/or selective stimulation, activation, avoidance of activation, avoidance of blocking, and/or avoidance of influencing neural activity in) target, non-target, and/or off target peripheral nerve fibers when the relative, general and/or absolute orientation of, location of, position of, organization of, distance to and/or from one peripheral nerve fiber(s) or fiber type(s) and/or another peripheral nerve fiber(s) or fiber type(s) is not known, is seldom known, and/or is not consistent or reliable (e.g., in advance, from one patient to another patient, and/or from one nerve and/or electrode and/or lead placement to another). It is noted that the present devices, systems, and methods are different than those of existing systems (e.g., electrical stimulation and/or neurostimulation systems) including but not limited to systems with multiple contacts and/or electrodes per lead, such as system(s) that can deliver SCS, that can or are designed to selectively stimulate or avoid stimulation of different nerve fibers or regions in the central nervous system and/or nerve roots, such as DC fibers and/or DR fibers, the relative, general and/or absolute orientation of, location of, position of, organization of, distance to and/or from which is known, is typically or frequently known, and/or is consistent or reliable (e.g., in advance, from one patient to another patient, and/or from one nerve and/or electrode and/or lead placement to another). It is to be appreciated that while existing or conventional systems and methods related to the central nervous system (e.g., in the spinal cord, dorsal column, brain, nerve root(s), and/or nerve rootlets), are different from peripheral nerve fibers and target and non-target peripheral nerve fibers (e.g., where stimulation is applied or delivered outside of and/or not to the central nervous system). As an example, while some of the existing or conventional systems and methods may claim to stimulate fibers, such as DC, DR, and/or motor reflex nerve fibers, which are sometimes thought to be included in dorsal roots (or DR nerve fibers), the fibers that are stimulated by systems that can or are designed to deliver SCS or DRG stimulation are different from target, non-target, and/or off-target peripheral nerve fibers, such as efferent (or motor) peripheral nerve fibers that may connect to, come from, emanate from and/or be supplied by ventral roots or ventral nerve roots, which are present in peripheral nerves but not present in dorsal roots, the DRG, and/or the dorsal column of the spinal cord.

In a non-limiting example the present system enables selective stimulation and/or avoidance of stimulation, influence of activity in, and/or activation of target, non-target, and/or off-target peripheral nerve fiber(s), peripheral nerve fiber type(s) and/or group(s), which may or may not be located in the same region or peripheral nerve. It is to be appreciated that peripheral nerve fiber(s), peripheral nerve fiber type(s) and/or group(s) are different from regions of nerves, fibers, fiber type(s) and/or groups, and regions may contain one or more different peripheral nerve fiber(s), peripheral nerve fiber type(s) and/or group(s), and while the present system enables selective stimulation and/or avoidance of stimulation, influence of activity in, and/or activation of regions of fibers within a peripheral nerve (e.g., within the same or different peripheral nerve), it also can enable selective stimulation and/or avoidance of stimulation, influence of activity in, and/or activation of target, non-target, and/or off-target peripheral nerve fiber(s), peripheral nerve fiber type(s) and/or group(s) within the same and/or different regions (e.g., within the same or different peripheral nerve). The present system can achieve these goals by delivering stimulation from a single or multiple lead(s) that are comprised of a single or multiple electrode(s), electrode contact(s), and/or contact(s) which may be placed near, adjacent, close to, away from, not in contact with, and/or remote from the peripheral nerve or neural tissue and may provide the desired benefits independent of and/or adjustable to location and/or proximity or exact proximity to the peripheral nerve, thereby providing desirably robust and reliable outcomes regardless of electrode(s) or lead(s) placement and avoiding the need or requirement of exact placement, instruction of placement, and/or instruction of exact placement of the electrode(s) and/or lead(s). In a non-limiting example the present system enables selective stimulation and/or avoidance of stimulation, influence of activity in, and/or activation of target, non-target, and/or off-target peripheral nerve fiber(s) in the same region of a peripheral nerve, and it is to be appreciated that there is a difference between stimulating or avoiding stimulating fiber(s) and/or fiber type(s) within a region (e.g., target, non-target, and/or off-target fibers may all be present within the same region) and stimulating or avoiding stimulating regions of neural tissue which may or may not contain one or more of the same nerve fiber(s) and/or fiber type(s) (e.g., target, non-target, and/or off-target fibers may be separated in different regions and/or a region undergoing stimulation may include one or more, but not all, populations of target, non-target, and/or off-target fibers). By way of a non-limiting example, there are some regions where there are no non-target, or no off-target fibers. Embodiments of the system and method apply not only to situations where the target and non-target fiber types are segregated from each other (like the spinal cord), and in the periphery, but also when they are mixed together, which is a unique challenge to the present system that is not inherent to SCS systems/prior art. In a non-limiting example, the present system overcomes limitations of the existing systems that stimulate spinal cord tissue and SCS, which is different than neural tissue in the periphery in which target and non-target fibers are often mixed together, co-localized, and/or not in different and distinct regions but rather in the same region, creating a challenge and problem that is different from those encountered by and not solved by previous and existing systems. The present system address these issues by stimulating or avoiding stimulating peripheral nerve fiber(s), individual fiber(s), and/or fiber type(s) within the same region of the same peripheral nerve. Existing or conventional systems and methods, such as neurostimulation systems that can or are designed to deliver SCS or DRG stimulation are incapable of such.

The present system is able to change the timing or order (e.g., reverse the order or re-order) of how and/or when peripheral nerve fibers are stimulated, activated, and/or inactivated. The present system is able to do more than just change the timing or order (e.g., reverse the order or re-order) of how and/or when peripheral nerve fibers are stimulated, activated, and/or inactivated. It is able to create and/or widen (lengthen or enlarge) a therapeutic window (e.g., the difference between activation thresholds of different fibers and/or fiber types) that did not previously exist and that is made possible by the present system to cause the desired outcomes and cause the desired outcome(s) and/or effect(s) where the electrode(s) and/or lead(s) is/are placed and avoid the need for precise placement or instruction of precise placement (e.g., achieving the desired outcomes regardless and/or independent of precise placement, without and/or avoiding placing (or instruction of placement of) the device or portion of the device such as the electrode(s) and/or lead(s) remote or away from (and/or close, nearby, adjacent, or on) the peripheral nerve or nerve fiber(s)). The present system overcomes limitations of existing systems and methods that require placement of electrode(s) and/or lead(s) remote from the peripheral nerve to achieve selective or preferential stimulation, activation, and/or avoidance of stimulation or activation of target and/or non-target peripheral nerve fibers. The present system enables selective or preferential stimulation, activation, and/or avoidance of stimulation, activation, and/or influencing of neural activity of target, non-target, and/or off-target (e.g., bystander) peripheral nerve fibers independent of electrode(s) and/or lead(s), meaning that the system achieves these outcomes and goals whether it is placed close, near, adjacent to, on, or far, remote, away from, and/or distant to the peripheral nerve(s) and/or peripheral nerve fiber(s). The present system may achieve these goals by effectively creating and/or causing effect(s) similar to having created a virtual peripheral nerve stimulation electrode(s) and/or contact(s) through the use of a stimulation waveform, parameter set, stimulation conditioning, pre-pulse(s), primary pulse(s), and/or post-pulse(s) such that the changes in activation, neural activity, and/or avoidance of changes in neural activity of the target, non-target, and/or off-target peripheral nerve fibers is the same or similar to what it would be and/or would have been if the electrode(s), contact(s), and/or lead(s) were placed in different, other, or additional location or orientation, such that electrode(s) or lead(s) that are placed close, in, on, near, or adjacent to peripheral nerve(s) and/or peripheral nerve fiber(s) have effect(s) that are the same as, similar to, simulate, emulate, mimic, and/or improve upon those of electrode(s) or lead(s) that are placed far, remote, away from, and/or distant to the peripheral nerve(s) and/or peripheral nerve fiber(s), and vice versa (e.g., electrode(s) or lead(s) that are placed far, remote, away from, and/or distant to the peripheral nerve(s) and/or peripheral nerve fiber(s) have effect(s) that are the same as, similar to, simulate, emulate, mimic, and/or improve upon those of that electrode(s) or lead(s) that are placed close, in, on, near, or adjacent to peripheral nerve(s) and/or peripheral nerve fiber(s)). Thus, the present system enables PNS devices, such as lead(s) and/or electrode(s) that are placed inappropriately, sub-optimally, and/or in places or orientations (e.g., too close or too far away) that would have previously been ineffective with existing or previous systems to now be effective (e.g., lead(s) or electrode(s) that are placed in ways that are would have previously been too close to now perform as if they are a sufficient distance away from the nerve and/or lead(s) or electrode(s) that are placed in, on, near, sufficiently near, or too near to tissue, such as muscle tissue, adipose tissue, connective tissue, neural tissue, and/or other tissue are capable with the present system of achieving the desired outcomes as if there were placed in a different location and/or in different tissue, meaning that the present system enables placement in muscle tissue which may have previously been limiting and undesirably caused activation of non-target or off-target nerve fibers not in the intended, target, or named peripheral nerve leading to untoward effects such as unwanted muscle activation to now avoid the undesired effects and avoid causing unwanted neural activation and avoid causing unwanted muscle activation. This means that electrode(s) or lead(s) placement in muscle tissue can now perform as electrode(s) or lead(s) placement in adipose or connective tissue, or vice versa, which may create a virtual peripheral nerve stimulation electrode(s)).

It is to be appreciated that the systems and methods of some embodiments of the present system are designed for use in, and/or delivered to and/or inside a body (e.g., a patient or of a patient) are different than existing systems designed and used for electrophysiology experiments, tests, assays, setups, etc. (e.g., tests performed outside of a body such as in vitro, in vivo in animals or animal models, and/or performed in non-normal conditions for humans, such as in a dish, animal, and/or preclinical study such as a patch clamp configuration or test or protocol), such as what may be used to monitor, record, change, or observe performance caused, influenced, or changed by drugs, medications, and/or pharmaceutical compounds). The present system may reduce or enable the reduction of use or intake of medications, drugs, or pharmaceutical compounds, including pain medications, opioid medications, non-opioid medications, anti-depression medications, anti-seizure medications, etc. This reduction(s) may be facilitated by the reduction of pain caused by the present system. The present system does not require drugs, medications, and/or pharmaceutical compounds to work or be effective and the present system avoids the need for drugs, medications, and/or pharmaceutical compounds.

In a non-limiting example of an embodiment, the present system can be designed or configured to desirably selectively avoid stimulating and/or activating a certain type, class, or group of peripheral nerve fiber(s) in or at one time, scenario, or setting in which, where, or when it is advantageous to avoid stimulating it and then in or at another time, scenario, or setting desirably selectively stimulating and/or activating a certain type, class, or group of peripheral nerve fiber(s) (e.g., by using, selecting, outputting, or delivering differentiating or different stimulation waveform(s), stimulation parameter(s), electrode location, placement, positioning, geometry, composition, orientation, system programming, and/or stimulation method(s)). In a non-limiting example, it may be desirable in the same patient with the same system to stimulate or activate efferent (motor) nerve fiber(s) during one portion of a day or time period and during a different portion of the day avoid stimulation or activation of efferent (motor) nerve fiber(s) and/or stimulate afferent (sensory) nerve fiber(s). Thus, in the same patient what is considered a target, non-target, and/or off-target peripheral nerve fiber(s) may change (or be changed by the present system) and the present system enables the selective or preferential activation and/or avoidance of activation of target, non-target, and/or off-target fibers to be changed to accommodate the goals and needs of the user and/or patient. It is to be appreciated that there may be one, two, three, or more portions of a day or time period in which the target, non-target, and/or off-target fiber(s) may change or be changed and the present system may be designed, configured, programmed, and/or adjusted to accommodate or cause this change(s) as needed or desired. In a non-limiting example, one or more portions of the day or time period may partially or completely overlap, and the present system enables multiple goals to be achieved simultaneously, at the same time, at almost the same time, or sufficiently close in time as to have the same or similar effect as if the goals were achieved at the same time. It is to be appreciated that the present system may instruct or provide instructions to achieve the desired goals and outcomes.

In a non-limiting example, the present system may deliver or output, be designed to deliver or output, or be capable of delivering or outputting stimulation, or a first stimulation waveform or a first set of stimulation parameters, that desirably activates a first type or set of peripheral nerve fiber(s), considered to be the target peripheral nerve fiber(s) for the first stimulation waveform and avoids activation of a second set of peripheral nerve fiber(s), considered to be the non-target peripheral nerve fiber(s) for the first stimulation waveform. The present system may also deliver, be designed to deliver, or be capable of delivering stimulation, or a second stimulation waveform or a second set of stimulation parameters, that desirably activates a third type or set of peripheral nerve fiber(s), considered to be the target peripheral nerve fiber(s) for the second stimulation waveform and avoids activation of a fourth set of peripheral nerve fiber(s), considered to be the non-target peripheral nerve fiber(s) for the second stimulation waveform. Additional stimulation or other stimulation waveform(s) or set(s) of stimulation parameters may be delivered, added, or used as need to achieve the desired goals. Stimulation, stimulation waveform(s), and/or set(s) of stimulation parameters may be delivered on, through, or by the same or different electrode(s), lead(s), and/or channel(s). The non-target fiber(s) for one stimulation waveform may be the target fiber(s) for another stimulation waveform, and vice versa. In a non-limiting example, the present system may deliver or output, be designed to deliver or output, programmed to deliver or output, instruct or provide instructions to program and/or deliver or output stimulation, a first stimulation waveform(s), and/or a first set(s) of stimulation parameters to produce a first goal or outcome such as long-term or long-acting pain relief, lasting pain relief, relief of chronic pain, which may be produced through a first set of changes, such as long-term, long-lasting, and/or permanent changes in the peripheral and/or central nervous system, and the present system may deliver, be designed to deliver, programmed to deliver, instruct or provide instructions to program and/or deliver additional or other stimulation, a second stimulation waveform(s), and/or a second set(s) of stimulation parameters to produce a second goal or outcome such as short-term, quick or fast-acting pain relief, immediate pain relief, relief of acute, post-surgical, and/or chronic pain, which may be produced through a second set of changes, such as temporary, quick, fast, short-term, near-term changes in the peripheral and/or central nervous system). Multiple and more than two (e.g. three or more) stimulation waveforms or sets of stimulation parameters may be used at the same time and/or by the same device to achieve multiple goals and outcomes, which may be synergistic or different and distinct, such as selectively activating and avoiding activation and/or blocking of different types, groups, populations, and/or sizes of peripheral nerve fiber(s) within the same peripheral nerve, where the different types, groups, populations, and/or sizes of peripheral nerve fiber(s) within the same peripheral nerve may be considered or designated target, non-target, and/or off-target peripheral nerve fiber(s) and the designation may change or be changed, such as for example, through the stimulation waveform applied. Multiple stimulation waveforms and/or sets of stimulation parameters may be combined into fewer stimulation waveforms and/or sets of stimulation parameters or even a single stimulation waveform and/or set of stimulation parameters that is composed of, has, or is made up of multiple components, characteristics, features, and/or attributes that enable(s) the same device to achieve multiple goals and outcomes, which may be synergistic or different and distinct.

In a non-limiting example, a first stimulation waveform may be configured and/or delivered to selectively activate peripheral efferent (motor) nerve fibers (such as alpha motor neurons, designated or selected as target nerve fibers for the first stimulation waveform), avoid blocking of other peripheral nerve fibers (designated as off-target nerve fibers for the first stimulation waveform) and avoid activation of another set of peripheral nerve fibers (such as type III and/or type IV peripheral nerve fibers, designated as non-target nerve fibers for the first stimulation waveform) and a second stimulation waveform may be configured and/or delivered to selectively activate peripheral afferent (sensory) nerve fibers (such as type I, type Ia, and/or type Ib peripheral nerve fibers, designated or selected as target nerve fibers for the second stimulation waveform), avoid blocking of other peripheral nerve fibers (designated as off-target nerve fibers for the second stimulation waveform) and avoid activation of efferent (motor) nerve fibers (e.g., alpha motor neurons) designated or selected as target nerve fibers for the first stimulation waveform and also designated as non-target nerve fibers for the second stimulation waveform) and avoid activation of non-target peripheral nerve fibers (such as type III and/or type IV peripheral nerve fibers, designated as non-target nerve fibers for both the first stimulation waveform and the second stimulation waveform). The first stimulation waveform may be delivered for all of or for a portion or up to a portion of a day or a time period (e.g., up to 3, 4, 5, 6, 7, 8, 9, 10, 11, 12, 15, 18, 20, 22, and/or 24 hours per day) and the second stimulation waveform may be delivered for all of or for a portion or up to a portion of a day or a time period (e.g., up to 20 minutes, 30 minutes, 1 hour, 3 hours, 4, 5, 6, 7, 8, 9, 10, 11, 12, 15, 18, 20, 22, and/or 24 hours per day), and the time period or portions of a time period or day for which each stimulation waveform is delivered may be overlapping, non-overlapping, partially overlapping, complementary or non-complementary. In a non-limiting example, the first waveform may be delivered, designed, configured or instructed to be delivered up to a portion of a day or time period (e.g., 20 minutes, 30 minutes, 1 hour, 3 hours, 6 hours, 12 hours, and/or 18 hours) and the second waveform may be delivered, designed, configured or instructed to be delivered for up to and/or including the remaining to a portion of a day or time period (e.g., the first waveform may be delivered for up to 6, 12, and/or 18 hours per day and the second waveform may delivered for the remaining 18, 12, and/or 6 hours per day, respectively). Alternatively, the first waveform may be delivered, designed, configured or instructed to be delivered up to a portion of a day or time period (e.g., 20 minutes, 30 minutes, 1 hour, 3 hours, 6 hours, 12 hours, and/or 18 hours) and the second waveform may be delivered, designed, configured or instructed to be delivered continuously (e.g., up to 24 hours per day), nearly continuously, for the majority (e.g., more than 12 hours) of the day, and/or as needed. As a non-limiting example, the first waveform may be used to produce long-term pain relief that continues to increase in benefit over time (e.g., on the order of days to weeks to months to years) and the second waveform may be used to produce near-term or immediate pain relief that produces substantial and/or clinically meaningful benefit quickly (e.g., on the order of seconds to minutes to hours), such that the time scale or time period over which the first waveform produces benefit is longer than the time scale or time period over which the second waveform produces benefit and/or the second waveform produces benefit that is faster (or addresses a need that is different) than the first waveform.

In a non-limiting example, the first waveform may deliver, be designed, and/or be configured to deliver stimulation that is intermittent with gaps and bursts at a stimulation parameter set that produces comfortable activation of peripheral efferent (motor) nerve fiber(s), producing non-functional tension and/or activation in the muscle(s) innervated or supplied by the peripheral efferent (motor) nerve fiber(s) at a stimulation frequency or frequency range (e.g., 1-35, 4-30, 5-25, 6-20, 8-20, 8-12, 10-20, 10-12, 12-20, 12, and/or 20 Hz) that is lower than the stimulation frequency or frequency range (e.g., >35, 36-200, 50-150, 50-100, 80-100, >99, 100-20,000, 10-100,000, 100, 200, 1,000, 1,200, and/or 50-1,200 Hz) of the second waveform that may deliver, be designed, and/or be configured to deliver stimulation that is continuous or intermittent (e.g., with or without gaps and/or bursts) at a stimulation parameter set that produces comfortable activation of peripheral afferent (sensory or type I, Ia, Ib, and/or II) nerve fiber(s) while the second waveform also avoids activation of peripheral efferent (motor) nerve fiber(s) such that the only non-functional tension and/or activation in the muscle(s) that is produced by the system is produced solely by the first waveform (e.g., ensuring that the effect is comfortable, non-exhausting, and/or non-fatiguing) and both the first and second waveforms avoid unwanted or undesired activation of type III and/or IV non-target peripheral nerve fibers and both the first and second waveforms avoid unwanted or undesired blocking (e.g., complete, discriminate, and/or indiscriminate blocking) of target, non-target, and/or off-target peripheral nerve fibers.

It is to be appreciated that the present system, in a non-limiting example of an embodiment, may utilize two, three, or more different waveforms and that all of the waveforms are intended to target and/or stimulate nerve fibers (e.g., neuronal cells, axons, etc.) and not to directly target or optimize the stimulation, activation, or modulation of non-neuronal cells (e.g., glial cells, astrocytes, Schwann cells, oligodendrocytes, microglia, etc.), and the present system is therefore different from previous systems that target non-neuronal cells independently or in addition to targeting neuronal cells and/or target the interactions between neuronal and non-neuronal cells.

It is to be appreciated that in an embodiment of the present system, the use of conditioning stimulation, pre-pulse(s), post-pulse(s), and/or other stimulation parameters in the present system may be used as a non-limiting example in a way that is different than priming stimulation, priming neurostimulation, and/or priming neuromodulation that may be used to accelerate or speed up the wash-in of a response to neurostimulation.

In an embodiment, the present system achieves desirable selective activation of target peripheral nerve fiber(s), avoids undesirable activation of non-target peripheral nerve fiber(s), avoids undesirable influencing of neural activity in off-target peripheral nerve fiber(s), and/or avoids undesirable blocking of peripheral nerve fiber(s). In one example, all of the peripheral nerve fiber(s) are in (or part of) the same peripheral nerve (or bundle, fascicle, or grouping of peripheral nerve fibers). In another example, the peripheral nerve fiber(s) are in (or part of) multiple (e.g., two, three, four, or more than four) different peripheral nerves (or bundles, fascicles, or groupings of peripheral nerve fibers). In another example, some or a portion of the target, non-target, and off-target nerve fibers are in the same peripheral nerve and some or another portion of the target, non-target, and off-target nerve fibers are in the another or other peripheral nerve(s).

It is to be appreciated that in an embodiment, the present system can enable selective activation (and/or avoidance of activation) of specific fibers and/or fiber types in the same nerve and overcomes limitations of previous systems that attempted to be selective through different means such as stimulating a (whole) target nerve and avoiding stimulating another (whole) nerve or pain nerve (as opposed to the present system's capability to selectively activate target pain-relieving fibers and avoid activation of pain-causing fibers within the same peripheral nerve).

It is to be appreciated that the present system can achieve its desired effects while avoiding damage to tissue, including avoiding damage to nerve or neural tissue, and avoids ablation, heating, cooling, freezing, cutting, lesioning, and/ or otherwise intentionally and/or unintentionally damaging nerve, nervous, and/or neural tissue. The present system avoids and overcomes the challenges associated with radio frequency ablation (e.g., RF, RFA and/or variations thereof such as cooled RF or cooled RFA, pulse or pulsed RFA, etc.), cryolysis, and/or cryoanalgesia. It is to be appreciated that in an embodiment the present system can provide therapeutic benefit beyond the avoidance of temporary pain and/or discomfort associated with another therapeutic intervention intended to treat pain (e.g., the present system is not the same as and is different from stimulation intended to provide relief (e.g., transient or temporary relief) during the delivery of another pain modality, pain treatment, or other treatment, such as RF, RFA, painful stimulation to rehabilitate and/or strengthen muscles, functional electrical stimulation, etc.

It is to be appreciated that in a non-limiting example of an embodiment, the present system enables the placement, insertion, and/or implantation of the electrode(s) and/or lead(s) in the body but outside of (and not inside of) vasculature, blood vessels (e.g., including veins, arteries, and/or capillaries), and/or cardiac tissue. It desirably avoids (and avoids the need for) placement, insertion, and/or implantation of the electrode(s) and/or lead(s) in vasculature, blood vessels (e.g., including veins, arteries, and/or capillaries), and/or cardiac tissue. The challenges of stimulating nerves with electrode(s) placed in vasculature are different from the challenges of stimulating nerves with electrode(s) not placed in (or placed outside of) vasculature, and the present system overcomes the challenges of stimulating across the walls of blood vessels and it also overcomes the need for a catheter or the use of a catheter system.

It is to be appreciated that the use of electrical prepulse(s), conditioning stimulation, waveform(s), and/or parameter set(s) delivered in an embodiment of the present system through peripheral nerve stimulation is different from prepulse inhibition and/or changes in the prepulse inhibition of reflex(es) and/or other response(s), such as the startle response that may be associated with the inability of a person and/or animal to filter out unnecessary information and may be associated with abnormalities of sensorimotor gating and/or disorders, diseases, and/or illnesses like schizophrenia and Alzheimer's disease.

In a non-limiting example of an embodiment, the present system minimizes and/or avoids the need for programming, complex programming, instruction, education, and/or training for programming, complex programming, and/or advanced programming of stimulation parameters. The present system may use predetermined algorithm(s), step-sizes and/or selections in stimulation parameter(s) and/or waveform(s), be pre-programmed, and/or use an adjustable algorithm such that the user needs minimal to no knowledge of (or advanced knowledge, education, or training of or in) neurostimulation and/or electrophysiology and the system enables or facilitates the use of the device with intuitive control, which may appear to the user as an increase or decrease in a limited set of stimulation parameters (e.g., which may be limited to as few as a two, or one or a single parameter such as intensity and/or frequency), while the device adjusts the stimulation waveform and or parameter set to facilitate the selective activation of target fibers, avoidance of activation of non-target fibers, avoidance of blocking of fibers, and/or avoidance of influencing off-target fibers (e.g., bystander peripheral nerve fibers). It is also to be appreciated that while adjustments such as these can also be made by complex and complete control of parameters (e.g., in an advanced user control mode), it is desirable in most circumstances for most users to be able to provide the intended effects without the need to understand or perform complex programming since the present system can provide the same effect and benefit for the user without the need for the user to spend the time to perform the complex programming and/or in practice less need for programming by the end user also limits and/or avoids the potential for user error.

In a non-limiting example of an embodiment, the present system avoids the need to perform monitoring of responses during the delivery of therapy, which may be particularly desirable once the implantation procedure is complete and the patient and/or end user is in their home environment as the avoidance of the need for monitoring limits potential for complexity, failure, and/or error should the monitoring fail or present additional challenges and/or complications. While closed loop stimulation may be performed, it avoids the need or requirement for closed loop (e.g., recording and) stimulation for the device to function properly which facilitates use and implantation of the device by a more diverse group of users.

In a non-limiting example, while the net current and/or charge may be balanced or net zero, it may also be unbalanced or imbalanced and not be net or total zero overall and/or within a certain time period or time frame. While conditioning stimulation, pre-pulse(s), and/or post-pulse(s) may restore balance or balance the net charge or current, they may also do more than just restore balance or balance the net charge or current and may enable selective stimulation, avoidance of stimulation, avoidance of blocking, and/ or avoidance of unwanted changes in neural activity of peripheral nerve fiber(s).

The electrode contact configuration may include one or more shapes on one or more separate leads that enable stimulation on one or more sides of a target nerve to enable the delivery of waveforms that selectively activate target fibers in one or more target fascicles without activating fibers in one or more non-target fascicles. In a non-limiting example, the electrode configuration may consist of one or more electrodes arrayed circumferentially around and/or along the lead (e.g., of a multiple electrode contact lead) and/or the nerve at a location remote from the nerve (e.g., <1, ≥1, ≥2, ≥3, ≥4, ≥5, ≥10 mm, ≥20 mm, ≥30 mm, and/or 1-50 mm, 1-40 mm, 1-30 mm, 2-50 mm, 2-40 mm, 2-30 mm, 3-50 mm, 3-40 mm, 3-30 mm, 5-50 mm, 5-40 mm, 5-30 mm, etc., distant from the target nerve). In a non-limiting example, the one or more electrodes may consist of a curved contact or multiple curved contacts that encircle some or all of the target nerve to enable deactivation of non-target fascicles around the perimeter of the nerve, up to the entire circumference of the nerve while enabling activation of target fascicles deeper in the nerve (e.g., in the center of the nerve). In a non-limiting example, the electrode configuration may consist of one or more electrodes arrayed circumferentially around and/or along the lead (e.g., of a multiple electrode contact lead) and/or the nerve at a location that is close to, near, adjacent to, and not remote from the nerve.

The present system in a non-limiting example of an embodiment is different from and overcomes limitations of previous systems, devices, and or methods that use a cuff or other apparatus that completely, almost completely, or partially encompasses, encircles, surrounds, wraps, wraps around the peripheral nerve, nerve branch, or nerve trunk. Although the present system can use or can be used in combination with a cuff or other apparatus that completely, almost completely, or partially encompasses, encircles, surrounds, wraps, or wraps around the peripheral nerve, the method, device, system, and/or configuration through which the present system achieves its effect in an embodiment is different from the mechanism, method, device, system, parameters, and/or configuration through which a cuff or other encircling apparatus is used, and the present system avoids invasiveness and the risks of surgery to place, use, and/or remove cuff electrode(s) and/or lead(s), reduces the training or skill level of surgeons or physicians that treat patients needed to place a cuff or other encircling apparatus, avoids the use of cuffs or other encircling apparatuses that cannot be reversibly placed (e.g., are not designed or intended for removal and/or require additional surgical procedures for removal), and avoids unwanted fibrous encapsulation that can attach to a cuff and/or the neural tissue causing loss of effect of stimulation, increasing impedance and/or stimulation intensity requirements, and damaging nerves or neural tissue by causing pressure, impingement, pinching, deformation, or other physiological consequences of fibrous encapsulation and/or growth of tissue on, around, adjacent to, or attached to the nerve or neural tissue.

The present system avoids issues of MR and/or MRI compatibility and is designed to be MR and/or MRI compatible and/or conditional (e.g., conditionally safe or safe under certain or specified conditions). The present system achieves its desired effects while using a design and set of systems, devices, and methods that avoid the challenges and limitations (e.g., of the prior art) that could cause unwanted effects (e.g., unwanted device and/or tissue heating, device and/or tissue damage, etc.) that could or would otherwise limit MR and/or MRI compatibility, conditionality, conditions of use, and/or safety. For example, the present system avoids use of unnecessary circles or circular shapes (e.g., that are made unnecessary by the present system), such as circles or circular shapes of metal, which could cause or lead to unwanted and/or increased risk of heating, tissue heating, damage to the device and/or damage to tissue (e.g., damage to neural and/or nerve tissue, specifically risk damage or further damage to the nerve that is intended to be treated or to which the intended electrical stimulation treatment is intended to be delivered) when exposed to MR and/or MRI. As a non-limiting example, the lead design of the present system enables it to achieve the desired effect while avoiding the need to use a nerve cuff that encircles or surrounds (partially or completely in circular or approximately circular shape) the nerve and in avoiding this circular design, avoid, limits or reduces the risk of unwanted damage to device, tissue, and/or nerve and enables the present system and/or its component(s), such as the lead, to be MR and/or MRI compatible, conditional, safe, conditionally safe, etc. and avoid unwanted heating and/or damage to tissue and/or nerve tissue.

Those skilled in the art will recognize that, for simplicity and clarity, the full structure and operation of all devices and processes suitable for use with the present teachings are not being depicted or described herein. The present disclosure contemplates combining the various features described above in any manner and is not limited solely to the combinations described above.

Example of Use in a Randomized Placebo-Controlled Trial

Amputation results in pain in up to 95% of amputees. Amputation can become necessary for a variety of reasons. Post-amputation pain may include pain in the residual limb, also called the stump, and/or pain in the phantom limb, which is the experience of sensations in a representation of the portion of the limb that is no longer present. Both acute and persistent post-amputation pains are commonly managed with opioids that are associated with undesirable adverse effects.

A multicenter, randomized, double-blind, placebo-controlled trial was conducted to evaluate changes in chronic pain and functional outcomes following amputation up to 12 months after a 60-day PNS treatment.

Participants were traumatic lower extremity amputees ≥18 years of age with residual limb pain (RLP) and/or phantom limb pain (PLP) ≥4 on a 0-10 pain rating scale. Other than requiring a healed residual limb without comorbidities, there were no constraints on time since amputation. Continued use of all baseline pain medications was permitted at or below the documented baseline dosages.

A seven-day baseline pain diary was completed to determine average daily RLP and PLP scores and document baseline dosage of pain medications. Qualifying participants were then randomized 1:1 in blocks of two to one of two groups, stratified by enrolling institution, using a masked allocation sequence generated by the study's data capture system. Treating physicians were unmasked, while participants and outcomes assessors were masked to group assignment. Group 1 (PNS) received active stimulation for four weeks, while Group 2 (Placebo) received sham stimulation. After the first four weeks, Group 1 received four additional weeks of stimulation (up to 60 days total) and Group 2 crossed over to receive active stimulation for four weeks. After the eight-week treatment period all leads were withdrawn and both groups were followed monthly for up to 12 months from the initial implantation.

Fine-wire, open coil, percutaneous PNS leads were implanted under ultrasound guidance targeting the femoral and sciatic nerves. Each introducer entry site was prepped using aseptic technique, and cutaneous local anesthesia was administered, taking care to not deliver anesthetic to the deeper target nerve where it may affect the stimulation response. The femoral nerve was target with the participant supine using a lateral approach approximately 1-2 cm distal to the inguinal crease. The lead was implanted remote (0.5-3 cm) from the nerve to enable selective activation of large diameter sensory fibers. The sciatic nerve was target with the participant prone or in the lateral decubitus position. Ultrasonic landmarks included the greater trochanter, ischial tuberosity, femur, and/or popliteal artery to guide location of the lead remote from the nerve proximal to the level of amputation. Modifications to these approaches were made at the discretion of the investigator based on patient-specific anatomy.

In the PNS group, a monopolar needle electrode was typically inserted to within 0.5-3 cm of the target nerve. Test stimulation (asymmetric charge-balanced biphasic pulse train, 100 Hz, 1-30 mA, 10-200 µs) was delivered to confirm that comfortable stimulation-evoked sensations could be induced in the regions of RLP and/or PLP. The test needle was redirected in small increments to optimize the coverage of comfortable sensations and minimize or avoid undesired sensations (e.g., local or distal motor activation, local or distal discomfort). Once the location was optimized, the needle electrode was removed and a fine wire coiled lead preloaded in a 20-gauge introducer needle was directed to the same location. Correct lead location was confirmed by again testing stimulation through the lead to evoke comfortable sensations in the regions of RLP and/or PLP, and the introducer needle was withdrawn to deploy the lead. The lead was coiled outside the skin, trimmed, and the exit site was covered with an occlusive bandage. Leads were connected to external, wearable pulse generators mounted on the body using an adhesive hydrogel pad that also served as the return electrode. Group 1 received stimulation that was programed to evoke comfortable sensations in the regions of RLP and PLP using the same waveform and parameter range as the test stimulation, and participants were permitted to adjust stimulation intensity during the 60-day treatment within a range set for them by the study staff.

In the Group 2, test needles and percutaneous leads were placed under ultrasound guidance to a location a similar distance from the target nerve, but no stimulation was delivered during the procedure or at any time during the first four weeks of the treatment period. The PNS system was equipped with a sham mode in which the stimulator appeared to operate normally (e.g., the screen indicated that stimulation was on, intensity values on the screen could be increased or decreased, and the battery life indicator decreased at a predetermined rate requiring regular battery changes consistent with actual use and battery life in the PNS group), but the pulse generator did not deliver any stimulation. Mock stimulation testing during the procedure could therefore be applied by turning on the stimulator, increasing the intensity value shown, and soliciting feedback from the patient to simulate the procedural experience of participants in Group 1.

All participants were instructed to use the stimulation continuously and were assessed weekly during the eight-week treatment period. After four weeks, Group 2 crossed over and began receiving active stimulation for the remaining four weeks of the treatment period. Leads were electively replaced at the time of crossover if it was determined one or more of the original leads implanted without active stimulation testing did not produce comfortable sensations in the regions of pain or clinically significant pain relief when stimulation was turned on. In addition, in both groups leads were replaced if grossly dislodged. At the end of the eight-week treatment period (up to 60 days total), investigators withdrew all leads. Participants were followed monthly for 10 additional months (12 months from the time of lead implantation).

The primary outcome was the proportion of participants in each group who were treatment responders, which was defined as a ≥50% reduction in average daily pain score during weeks 1-4 of the treatment period in all areas of post amputation pain (RLP and/or PLP) that had baseline average pain scores ≥4. The primary safety outcome was the occurrence of device- and procedure-related adverse event rates assessed at all visits.

The present disclosure focuses on several key secondary outcomes through the 12-month follow-up period. Reductions in RLP, PLP, and pain interference during follow-up were assessed for the week prior to each time point using questions 5 and 9 of the Brief Pain Inventory Short Form (BPI-SF) and comparing these results to baseline BPI-SF values. Patient Global Impression of Change (PGIC) and BDI-II scores were also assessed throughout the study follow-up period. Data on primary and secondary efficacy outcomes were collected by a disinterested assessor blinded to treatment allocation.

All participants meeting eligibility criteria at the time of lead placement were included in a Full Analysis Set evaluating primary and secondary efficacy endpoints. Responder rates for reductions in pain and pain interference in the follow-up period were evaluated in a Long-Term Analysis population in which participants were considered treatment failures if they terminated early due to a return of pain. Missing pain and pain interference data was handled by multiple imputation using a regression model that included age, gender, ethnicity, race, time since amputation, level of amputation (above or below knee), and baseline average residual and phantom pain intensities as co-variates. Primary safety endpoint analysis was performed on a population consisting of all participants that underwent a study procedure.

Proportional and categorical data were compared between groups using a two-sided Fisher's Exact Test with $\alpha=0.05$. Continuous data were compared between groups using a two-sample Wilcoxon Test with $\alpha=0.05$. Proportional and continuous data were compared within Group 2 (post-crossover vs. placebo) using an exact McNemar's Test and a Wilcoxon Signed Rank test, respectively. Secondary outcomes were not adjusted for multiple comparisons. Summary statistics are presented as average (SD). Predefined statistical analyses were performed by an independent biostatistician. Adverse events were adjudicated by an independent medical monitor.

A total of 28 participants were randomized to Group 1 (n=14) or Group 2 (n=14) (FIG. 1). Two participants, both in Group 1, were excluded from efficacy analyses due to changes in eligibility prior to implantation. The Full Analysis Set therefore included 26 participants (Group 1 n=12, Group 2 n=14). Nine participants in Group 1 and six in Group 2 completed the 12-month follow-up period.

Participants were lower extremity amputees due to trauma (e.g., motor vehicle accident, gunshot, fall injury) with an average of 7.0 (SD 6.6) years since the time of amputation, and an average of 7.0 and 7.1 years since onset of RLP and PLP (Table 2). The distribution of participants with amputations above the knee versus below the knee was significantly different between groups (Table 2). Two participants were bilateral amputees, but each qualified for lead implantation (i.e., had baseline RLP and/or PLP ≥4 at baseline) on only one side. The average baseline RLP score among qualifying participants was 6.4 (SD 1.0) in Group 1 (n=7) and 6.4 (SD 1.3) in Group 2 (n=11). The average baseline PLP score among qualifying participants was 6.9 (SD 1.7) in Group 1 (n=11) and 6.8 (SD 1.7) in Group 2 (n=13). Participants previously used or were currently using a wide range of opioid, non-opioid, and other therapies for their post-amputation pain, most notably opioid oral medications (92%), non-opioid oral medications (92%), and physical therapy (85%).

TABLE 2

Demographics and baseline characteristics in the Full Analysis Set.

|  | Overall (n = 26) | Group 1 (n = 12) | Group 2 (n = 14) | P-value |
|---|---|---|---|---|
| Age, Mean (SD), y | 46.5 (12.7) | 48.3 (12.3) | 45.0 (13.2) | 0.571 |
| Female, % | 23 | 17 | 29 | 0.652 |
| Time since amputation, Mean (SD), y | 7.0 (6.6) | 6.4 (4.6) | 7.5 (8.1) | 0.877 |
| Time since onset of RLP, Mean (SD), y | 7.1 (6.9) | 5.9 (4.4) | 8.2 (8.6) | 0.735 |
| Timesince onset of PLP, Mean (SD), y | 7.0 (6.8) | 6.3 (4.9) | 7.5 (8.1) | 0.978 |
| Level of Amputation |  |  |  |  |
| Above knee, n (%) | 15 (58) | 10 (83) | 5 (36) | 0.021 |
| Below knee, n (%) | 11 (42) | 2 (17) | 9 (64) |  |
| Treatment History (% Currently in use, % Previously in use) |  |  |  |  |
| Opioid medication | 42, 50 | 42, 50 | 43, 50 | >0.999 |
| Non-opioid medications | 65, 27 | 67, 25 | 64, 29 | >0.999 |
| Surface stimulation | 0, 31 | 0, 33 | 0, 29 | >0.999 |
| Spinal cord stimulation | 0, 0 | 0, 0 | 0, 0 | — |
| Physical therapy | 4, 81 | 0, 83 | 7, 79 |  |
| Acupuncture | 0, 8 | 0, 8 | 0, 7 | >0.999 |
| Steroid injection | 0, 15 | 0, 8 | 0, 21 | 0.598 |
| Botulinum toxin injection | 0, 0 | 0, 0 | 0, 0 | — |
| Nerve block | 0, 19 | 0, 17 | 0, 21 | >0.999 |
| Other | 4, 8 | 0, 17 | 7, 0 | 0.337 |

SD = standard deviation; RLP = residual limb pain; PLP = phantom limb pain

A significantly greater proportion of subjects receiving PNS (n=7/12, 58%, p=0.037) demonstrated ≥50% reductions in average post-amputation pain during weeks 1-4 compared with subjects receiving placebo (n=2/14, 14%). Two subjects were excluded from efficacy analysis due to eligibility changes. In the second half of the therapy period (weeks 5-8), the proportion of subjects in the PNS group reporting ≥50% reductions in pain continued to be significantly greater compared with the proportion in the placebo group at the end of the 4-week placebo period in the full analysis set (67% [8 of 12] vs 14% [2 of 14], p=0.014).

Figure 28A:
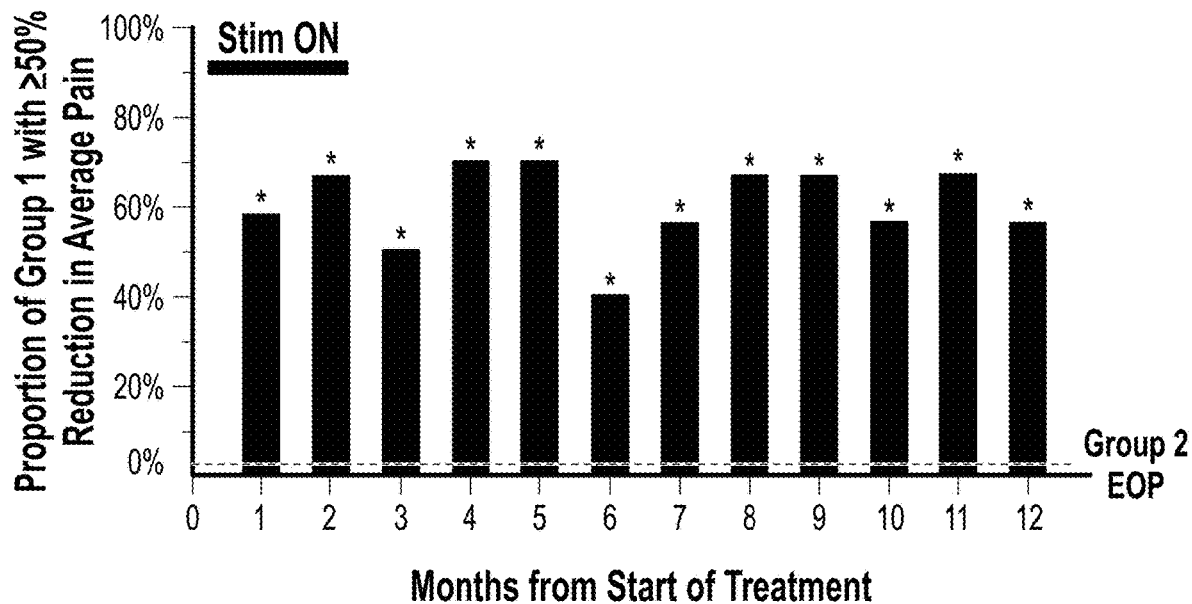
FIGS. 28A and 28B are diagrammatic views of the sustained reductions in pain that were reported by subjects in an example randomized controlled trial using the present system disclosed herein.
Figure 28B:
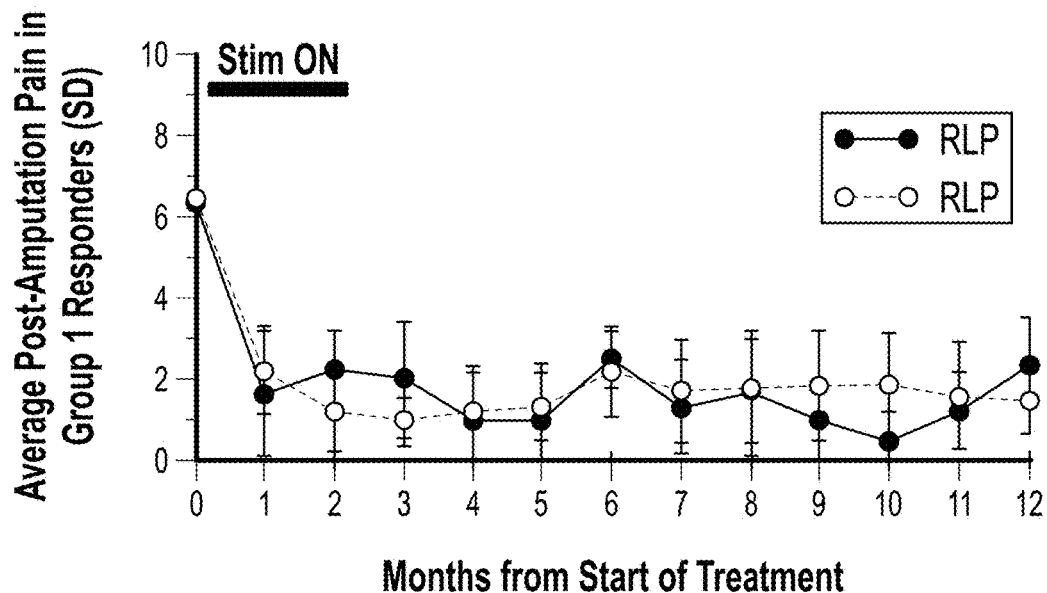

A total of 67% (6/9, p=0.001) of participants in Group 1 at 12 months had sustained reductions of ≥50% in all qualifying regions of RLP and PLP over the prior week, as reported on the BPI-SF (FIG. 28). No participants in Group 2 (0%, 0/14) reported ≥50% reductions in pain over the prior week on the BPI-SF at the end of the placebo period. The proportion of participants in Group 1 reporting ≥50% pain relief was significantly greater at each month through 12 months compared to the proportion in Group 2 at the end of the placebo period (FIG. 28). FIGS. 28A and 28B are diagrammatic views of the sustained reductions in pain that were reported by subjects in an example randomized controlled trial using the present system disclosed herein.

The primary endpoint evaluated pain in all areas (RLP and/or PLP) that qualified with pain ≥4 at baseline. Some patients qualified to be evaluated for RLP, PLP, or both. The reductions among those that qualified for RLP (Table 3) or PLP (Table 4) were significantly greater in Group 1 during follow-up compared to Group 2 during the placebo period. The average reduction in RLP at 12 months was 64% among Group 1 responders (100%, 3/3), and the average reduction in PLP at 12 months was 77% among Group 1 responders (56%, 5/9) (FIG. 2).

TABLE 3

Average Residual Limb Pain

|  | Group 1 | | Group 2[1] | |
|---|---|---|---|---|
|  | Avg. RLP (SD, N) | Avg. Reduction from BL (SD) | Avg. RLP (SD, N) | Avg. Reduction from BL (SD) |
| Baseline | 6.4 (1.0, 7) | n/a | 6.4 (1.3, 11) | n/a |
| Week 4 | 4.2 (2.6, 7) | 2.1 (2.6) | 4.8 (1.7, 11) | 1.7 (1.6) |
| Week 8 (EOT) | 3.9 (1.7, 7) | 2.5 (2.2) | 4.8 (2.2, 11) | 1.7 (1.8) |
| Month 3 | 2.4 (1.5, 5) | 4.0 (1.2)* | 4.8 (3.4, 8) | 1.0 (2.9) |
| Month 12 | 2.3 (1.2, 3) | 4.3 (1.5)* | 3.2 (2.5, 4) | 1.0 (2.0) |

[1]Group 2 crossed over at Week 4 to receive four weeks of active stimulation.
*p < 0.05 compared to Group 2 at the end of the placebo period.
Avg. = average; RLP = residual limb pain; BL = baseline; SD = standard deviation; EOT = end of treatment.

TABLE 4

Average Phantom Limb Pain

|  | Group 1 | | Group 2[1] | |
|---|---|---|---|---|
|  | Avg. PLP (SD, N) | Avg. Reduction from BL (SD) | Avg. PLP (SD, N) | Avg. Reduction from BL (SD) |
| Baseline | 6.9 (1.7, 11) | n/a | 6.8 (1.7, 13) | n/a |
| Week 4 | 3.6 (2.6, 11) | 3.3 (1.9) | 5.4 (2.3, 13) | 1.5 (1.4) |
| Week 8 (EOT) | 3.1 (2.8, 11) | 3.8 (2.2)* | 4.7 (2.4, 13) | 2.2 (1.7)* |
| Month 3 | 2.9 (2.8, 10) | 3.5 (2.3)* | 5.3 (2.6, 10) | 1.7 (2.4) |
| Month 12 | 3.8 (3.8, 8) | 2.6 (3.7) | 3.5 (2.6, 4) | 2.0 (2.2) |

[1]Group 2 crossed over at Week 4 to receive four weeks of active stimulation.
*p < 0.05 compared to Group 2 at the end of the placebo period.
Avg. = average; SD = standard deviation; PLP = phantom limb pain; BL = baseline; EOT = end of treatment.

Figure 29A:
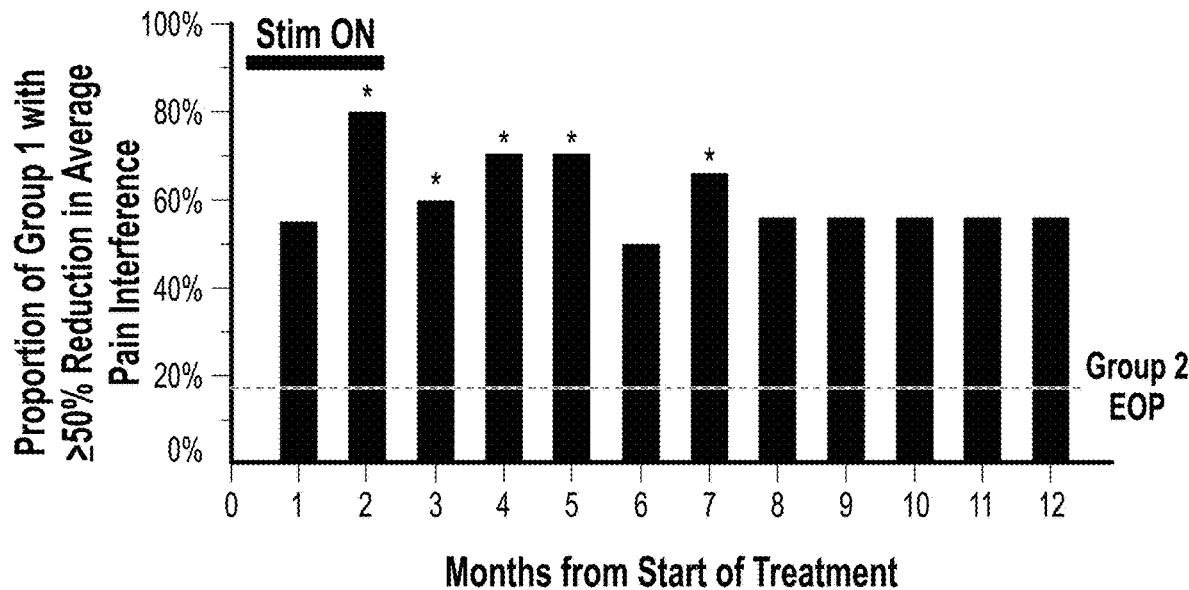
FIGS. 29A and 29B are diagrammatic views of the sustained reductions in pain interference that were reported by subjects in an example randomized controlled trial using the present system disclosed herein.
Figure 29B:
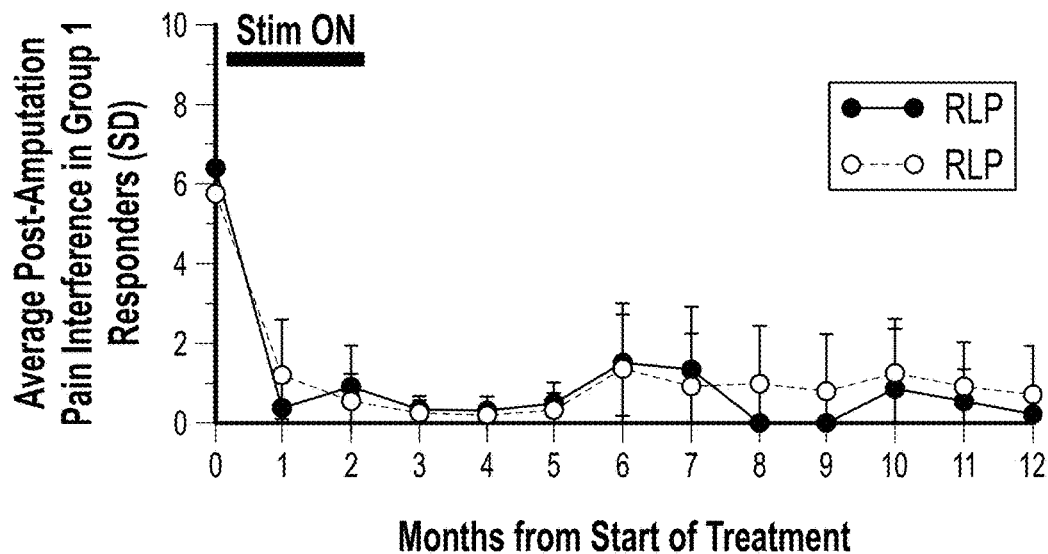

A statistically significantly greater proportion of subjects receiving PNS therapy experienced ≥50% reductions in average pain interference in all qualifying regions of RLP and PLP at the end of the treatment period (80%, 8 of 10 p=0.003), compared with the placebo control group at the end of the placebo period (15%, 2 of 13) (FIG. 29). Fifty-six percent (5/9) of participants in Group 1 reported ≥50% reductions in pain interference in all qualifying regions of RLP and PLP at the end of the 12-month follow-up, compared to 18% (2/11, p=0.074) in Group 2 at the end of the placebo period (FIG. 3). The average reductions in RLP and PLP interference in Group 1 were clinically meaningful and sustained from the end of treatment through the 12-month follow-up (FIG. 29). FIGS. 29A and 29B are diagrammatic views of the sustained reductions in pain interference that were reported by subjects in an example randomized controlled trial using the present system disclosed herein.

Participants in Group 1 reported clinically and statistically significant reductions in average BDI-II score throughout the treatment period and the 12-month follow-up period compared to the average reduction in Group 2 at the end of the placebo period (Table 5). In Group 1, the average BDI-II score was 55% lower than baseline at the end of eight weeks of PNS and remained 33% lower than baseline at 12 months (Table 5). Similarly, the average global improvement reported by Group 1 was largely sustained through the 12-month follow-up period (Table 6).

TABLE 5

Beck Depression Inventory II Scores

| | Group 1 | | Group 2[1] | |
|---|---|---|---|---|
| | Avg. BDI-II (SD, N) | Avg. Reduction from BL (SD) | Avg. BDI-II (SD, N) | Avg. Reduction from BL (SD) |
| Baseline | 7.6 (6.0, 12) | n/a | 12.6 (5.0, 14) | n/a |
| Week 4 | 6.1 (5.0, 11) | 1.8 (4.4)* | 13.0 (8.2, 13) | −0.2 (7.3) |
| Week 8 (EOT) | 4.0 (4.3, 10) | 4.2 (6.5)* | 14.0 (12.6, 11) | −1.7 (9.8) |
| Month 3 | 6.1 (8.7, 10) | 1.3 (8.3)* | 15.2 (11.6, 10) | −2.4 (9.7) |
| Month 12 | 5.8 (6.0, 8) | 2.5 (6.1)* | 10.0 (16.2, 4) | 2.2 (17.8) |

[1]Group 2 crossed over at Week 4 to receive four weeks of active stimulation.
*p < 0.05 compared to Group 2 at the end of the placebo period.
BDI-II = Beck Depression Inventory II; BL = baseline; SD = standard deviation; EOT = end of treatment.

TABLE 6

Patient Global Impression of Change

| | Group 1 Avg. PGIC (SD, N) | Group 2[1] Avg. PGIC (SD, N) |
|---|---|---|
| Week 4[1] | 1.4 (1.1, 11) | 0.6 (1.3, 13) |
| Week 8 (EOT) | 2.2 (0.9, 10)* | 1.3 (1.0, 11) |
| Month 3 | 1.9 (0.9, 10)* | 1.0 (0.8, 10) |
| Month 12 | 1.8 (1.3, 8) | 1.2 (1.5, 4) |

[1]Group 2 crossed over at Week 4 to receive four weeks of active stimulation.
*p < 0.05 compared to Group 2 at the end of the placebo period.
PGIC = Patient Global Impression of Change; SD = standard deviation; EOT = end of treatment.

This multicenter, randomized, double-blinded, placebo-controlled, partial crossover study is an example of the present system providing sustained clinically significant relief of chronic pain following amputation and, from the relief of pain, subsequent improvements in quality of life and depression. Coupled with the strong safety profile both in this system and method, these results suggest that patients with pain, such as the neuropathic and non-neuropathic pain that follows amputation, may receive significant benefit from this minimally invasive, reversible percutaneous PNS treatment without the invasiveness and accompanying complications, costs, and risks of a permanently implanted system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to provide relief of pain, the method comprising:
   inserting at least one percutaneous lead having at least one stimulating electrode and at least one recording electrode formed integrally on the lead, wherein the stimulating electrode is positioned on an anchor of the at least one percutaneous lead;
   stimulating at least one peripheral nerve that innervates a region of pain using an electrical stimulation device operatively coupled to the lead to create comfortable sensations in the region of pain;
   positioning the stimulating electrode to within a therapeutically effective distance from at least one target peripheral nerve independent of a distance from a nerve using analysis of recorded neural and/or muscle feedback, wherein the therapeutically effective distance comprises 0.5 to 3 cm; and
   applying stimulation parameters to optimize activation of a sufficient number of target peripheral nerve fibers to produce relief of pain, wherein the stimulation parameters are informed by analysis of recorded peripheral neural and/or muscle feedback, wherein the recorded neural and/or muscle activity indicates an optimal or non-optimal response to stimulation;
   wherein the neural activity is a compound action potential and the optimal response is a compound action potential of magnitude that indicates activation of a sufficient number of large diameter sensory afferent fibers.

2. The method of claim 1, wherein the at least one target peripheral nerve is a peripheral nerve, or a nerve trunk located in a nerve plexus, or a division and/or a cord of a nerve trunk, or a nerve branch, or a nerve plexus, that innervates some or all of a region of pain.

3. The method of claim 1, wherein the at least one target peripheral nerve is selected from a group consisting of: Sciatic nerve, Iliohypogastric nerve, Ilioinguinal nerve, Lateral femoral cutaneous nerve, Obturator nerve, Femoral nerve, Common peroneal nerve, Tibial nerve, Saphenous nerve, Sural nerve, Median nerve, Ulnar nerve, Radial nerve, Musculocutaneous nerve, Axillary nerve, Intercostal nerve, Intercostobrachial nerve, Brachial plexus, Lumbar plexus, Sacral plexus, Medial branch of dorsal ramus, Intercostal nerve, Trigeminal nerve, Occipital nerves, Cranial nerves.

4. The method of claim 1, wherein the stimulation parameters are selected from one or more of the following: amplitude, pulse duration, frequency, waveform shape, waveform polarity, pulse shape, pulse polarity, or pattern of stimulus pulses.

5. The method of claim 1, wherein the muscle activity is an electromyogram (EMG) and the optimal response is an EMG of magnitude that indicates activation of a muscle or muscles innervated by the at least one target nerve.

6. The method of claim 1, wherein the positioning of the at least one stimulating electrode is adjusted based on analysis of the recorded neural and/or muscle activity to enable stimulation from the at least one stimulating electrode to produce an optimal neural and/or muscle response.

7. The method of claim 6, wherein the electrode is placed adjacent to the at least one target nerve to produce the optimal neural and/or muscle response.

8. The method of claim 6, wherein the electrode is placed remote from the at least one target nerve to produce the optimal neural and/or muscle response.

9. The method of claim 1, wherein the stimulation parameters are modified to elicit an optimal recorded nerve and/or muscle response.

10. The method of claim 9, wherein the optimal recorded nerve and/or muscle response is the activation of the sufficient number of large diameter sensory afferent fibers innervating the region of pain while avoiding activation of small diameter pain afferent fibers.

11. The method of claim 10, wherein the sufficient number of large diameter fibers in the target nerve is a majority of large diameter fibers in the target nerve that innervate the region of pain such that a non-painful sensory information reaching a brain causes expansion of non-painful representations in a somatosensory cortex, contraction of painful representations in a somatosensory cortex, and/or functional remapping of the somatosensory cortex that reduces chronic pain.

12. A method to provide relief of pain, the method comprising:
  inserting at least one percutaneous lead having at least one stimulating electrode and at least one recording electrode formed integrally on the lead, wherein the stimulating electrode is positioned on an anchor of the at least one percutaneous lead;
  stimulating at least one peripheral nerve that innervates a region of pain using an electrical stimulation device operatively coupled to the lead to create comfortable sensations in the region of pain;
  positioning the stimulating electrode to within a therapeutically effective distance from at least one target peripheral nerve independent of a distance from a nerve using analysis of recorded neural and/or muscle feedback, wherein the therapeutically effective distance comprises 0.5 to 3 cm; and
  applying stimulation parameters to optimize activation of a sufficient number of target peripheral nerve fibers to produce relief of pain, wherein the stimulation parameters are informed by analysis of recorded peripheral neural and/or muscle feedback, wherein the recorded neural and/or muscle activity indicates an optimal or non-optimal response to stimulation;
  wherein the positioning of the at least one stimulating electrode is adjusted based on analysis of the recorded neural and/or muscle activity to enable stimulation from the at least one stimulating electrode to produce an optimal neural and/or muscle response.

13. The method of claim 12, wherein the electrode is placed adjacent to the at least one target nerve to produce the optimal neural and/or muscle response.

14. The method of claim 12, wherein the electrode is placed remote from the at least one target nerve to produce the optimal neural and/or muscle response.

* * * * *